US010384732B2

(12) United States Patent
Steben et al.

(10) Patent No.: US 10,384,732 B2
(45) Date of Patent: Aug. 20, 2019

(54) TRACKED VEHICLE

(71) Applicant: Prinoth Ltd., St. John (CA)

(72) Inventors: Eric Steben, Bromont (CA); Benoit Marleau, Granby (CA)

(73) Assignee: Prinoth Ltd., St. John (CA)

( * ) Notice: Subject to any disclaimer, the term of this patent is extended or adjusted under 35 U.S.C. 154(b) by 50 days.

(21) Appl. No.: 15/463,072

(22) Filed: Mar. 20, 2017

(65) Prior Publication Data

US 2017/0190366 A1 Jul. 6, 2017

Related U.S. Application Data

(63) Continuation of application No. 14/342,143, filed as application No. PCT/CA2012/000815 on Aug. 30, (Continued)

(51) Int. Cl.
*B62D 55/06* (2006.01)
*B62D 55/08* (2006.01)
(Continued)

(52) U.S. Cl.
CPC ............ *B62D 55/06* (2013.01); *B62D 33/06* (2013.01); *B62D 55/08* (2013.01); *B62D 55/12* (2013.01);
(Continued)

(58) Field of Classification Search
CPC ..... A01B 63/11; A01B 59/069; A01B 63/145; A01B 63/108; A01B 63/10; A01B 59/064; G01L 5/0009
(Continued)

(56) References Cited

U.S. PATENT DOCUMENTS 1,344,353 A 6/1920 Preble
1,987,688 A * 1/1935 Lamb ................. A01G 23/006
180/9.23
(Continued)

FOREIGN PATENT DOCUMENTS

CA 2211050 1/1998
CN 2015 34577 U 11/2008
(Continued)

OTHER PUBLICATIONS

Tank Encyclopedia: Panzer VI Tiger. [retrieved Aug. 7, 2017]. 23 pages. Retrieved from the Internet: <URL: http://www.tanks-encyclopedia.com/ww2/nazi_germany/Panzer-VI_Tiger.php>.
(Continued)

*Primary Examiner* — Joseph M Rocca
*Assistant Examiner* — Felicia L. Brittman
(74) *Attorney, Agent, or Firm* — Woodard, Emhardt, Henry, Reeves & Wagner, LLP

(57) ABSTRACT

A tracked vehicle, such as tracked carrier to carry and enable use of work equipment (e.g., a crane, an aerial work platform, a drill rig, etc.) on various terrains, is provided. The tracked vehicle may comprise a frame comprising an equipment mounting area for mounting work equipment above the frame. The frame may comprise a pair of side rails that have a spacing in a widthwise direction of the tracked vehicle which corresponds to a standard truck frame side rail spacing (e.g., 34 inches). An operator cabin comprises a seating area which may comprise a single seat for an operator or a first seat for the operator and a second seat for a second person next to the operator. At least part of a power plant of the tracked vehicle may be mounted above the frame and behind the operator cabin. The tracked vehicle comprises a plurality of track assemblies for traction of the tracked vehicle.

30 Claims, 49 Drawing Sheets

Related U.S. Application Data 2012, now Pat. No. 9,616,947, application No. 15/463,072, which is a continuation of application No. 14/194,270, filed on Feb. 28, 2014, now Pat. No. 9,604,679, which is a continuation of application No. PCT/CA2012/000815, filed on Aug. 30, 2012.

(60) Provisional application No. 61/542,551, filed on Oct. 3, 2011, provisional application No. 61/529,639, filed on Aug. 31, 2011.

(51) Int. Cl.
    *B62D 55/12*     (2006.01)
    *B62D 55/14*     (2006.01)
    *E02F 9/16*     (2006.01)
    *B66C 23/44*     (2006.01)
    *B62D 33/06*     (2006.01)
    *B62D 55/24*     (2006.01)

(52) U.S. Cl.
    CPC ........... *B62D 55/14* (2013.01); *B62D 55/244* (2013.01); *B66C 23/44* (2013.01); *E02F 9/16* (2013.01)

(58) Field of Classification Search
    USPC ....................................................... 180/9.23
    See application file for complete search history.

(56) References Cited

U.S. PATENT DOCUMENTS

| | | | |
|---|---|---|---|
| 2,587,751 A | 3/1952 | Murphy | |
| 3,216,520 A | 11/1965 | Blonsky | |
| 3,841,429 A | 10/1974 | Falcone et al. | |
| 4,184,431 A | 1/1980 | Goel | |
| 4,221,272 A | 9/1980 | Kell | |
| 4,273,214 A | 6/1981 | Grove | |
| 4,790,711 A | 12/1988 | Calaway | |
| 4,836,318 A * | 6/1989 | Tonsor .................. | B62D 55/08 180/9.5 |
| 4,961,395 A | 10/1990 | Coast | |
| 5,020,614 A | 6/1991 | Gilbert | |
| 5,226,497 A | 7/1993 | Beaton | |
| 5,954,148 A | 9/1999 | Okumura et al. | |
| 6,068,277 A | 5/2000 | Magnussen et al. | |
| 6,135,220 A | 10/2000 | Gleasman et al. | |
| 6,371,577 B1 | 4/2002 | Hasselbusch et al. | |
| 6,394,204 B1 | 5/2002 | Haringer | |
| 6,499,556 B1 | 12/2002 | Koyama | |
| 7,147,425 B2 | 12/2006 | Holt | |
| 7,338,080 B2 | 3/2008 | Urase et al. | |
| 7,338,081 B2 | 3/2008 | Urase et al. | |
| 7,506,774 B2 | 3/2009 | Willim | |
| 7,987,942 B2 | 8/2011 | Lee | |
| D686,252 S | 7/2013 | Urase et al. | |
| 8,579,057 B2 | 11/2013 | Wagger | |
| 2002/0030397 A1* | 3/2002 | Tamura .................... | B60K 5/04 298/17 R |
| 2005/0199402 A1 | 9/2005 | Moses | |
| 2007/0068722 A1 | 3/2007 | Miyake | |
| 2010/0295367 A1* | 11/2010 | Kim ...................... | B62D 55/244 305/177 |
| 2010/0300796 A1 | 12/2010 | Ryan et al. | |
| 2014/0103705 A1 | 4/2014 | Delisle et al. | |
| 2014/0224941 A1 | 8/2014 | Gitter et al. | |

FOREIGN PATENT DOCUMENTS

| | | | |
|---|---|---|---|
| DE | 2 254 276 | | 5/1974 |
| DE | 2 254 276 A1 | | 5/1974 |
| DE | 26 40 128 A1 | | 7/1977 |
| DE | 2640128 A1 * | | 7/1977 ......... B62D 55/0842 |
| DE | 196 29 454 A1 | | 1/1998 |
| DE | 199 27 829 C1 | | 1/2001 |
| DE | 20 2009 001 764 U1 | | 4/2010 |
| EP | 1 767 486 A2 | | 3/2007 |
| EP | 1 995 161 A1 | | 11/2008 |
| GB | 10314 | | 3/1916 |
| GB | 131981 A | | 7/1917 |
| JP | S61-150207 U | | 9/1986 |
| JP | H03-224876 A | | 10/1991 |
| JP | H05-319325 A | | 12/1993 |
| JP | H09-309468 A | | 12/1997 |
| JP | 2002-532324 A | | 10/2002 |
| JP | 2006-056375 | | 3/2006 |
| JP | 2080-174087 A | | 7/2008 |
| JP | 2008-247260 A | | 10/2008 |
| JP | 2012-092864 A | | 5/2012 |
| NL | 2004954 | | 12/2011 |
| WO | WO 2000/035739 A1 | | 6/2000 |
| WO | WO 2007/070638 A2 | | 6/2007 |
| WO | WO 2011/067652 A1 | | 6/2011 |
| WO | WO 2011/152709 A2 | | 12/2011 |

OTHER PUBLICATIONS

European Patent Application 12828771.7, Extended European Search Report dated Oct. 23, 2014. 7 pages.
European Patent Application 14176668.3, Extended European Search Report dated Oct. 24, 2014. 7 pages.
IHI Compact Excavator IC-120 Crawler Carrier. [retrieved Aug. 3, 2015]. 2 pages. Retrieved from the Internet: <URL: http://http://www.ihicompactexcavator.com/crawler-carrier/ic-120/>.
International Patent Application PCT/CA2012/000815 Search Report dated Dec. 20, 2012.
International PatentApplication PCT/CA2012/000815 Written Opinion dated Dec. 20, 2012.
Komatsu CD110R-1 Crawler Carrier. [retrieved Aug. 3, 2015]. 4 pages. Retrieved from the Internet: <URL: http:// http://www.erbequipment.com/uespecs/285.pdf/>.
Marl Technologies IHI IC120. [retrieved Aug. 3, 2015]. 1 page. Retrieved from the Internet: <URL: http://www.marltechnologies.com/s/IHI-IC120-specs.pdf>.
Morooka/MST-800E Crawler Carrier Dumper w/ 2.5 TOn Crane / 1990.
U.S. Appl. No. 14/194,270 to Eric Steben et al., Final Office Action dated May 12, 2015. 17 pages.
U.S. Appl. No. 14/194,270 to Eric Steben et al., Office Action dated Feb. 5, 2015. 15 pages.
U.S. Appl. No. 14/342,143 to Steben et al., Office Action dated May 21, 2015
European Patent Application 12828771.1, Office Action dated Dec. 12, 2016, 6 pages.
European Patent Application 14176668.3, Office Action dated Sep. 15, 2016, 7 pages.
European Patent Application No. 14176668.3, Office Action dated Sep. 15, 2016, 7 pages.
Japan Patent Application No. 2014-527445 Office Action with translation, dated Dec. 26, 2016.
Japanese Patent Application No. 2014-527445 , Office Action (translation) dated May 26, 2016. 2 pages.
U.S. Appl. No. 14/194,270 to Eric Steben et al., Final Office Action dated May 16, 2016. 21 pages.
U.S. Appl. No. 14/194,270 to Eric Steben et al., Office Action dated Oct. 22, 2015, 17 pages.
U.S. Appl. No. 14/342,143 to Steben et al., Office Action dated Jan. 6, 2016.
U.S. Appl. No. 14/342,143 to Steben et al., Office Action dated Jul. 15, 2016, 15 pages.
https://web.archive.org/web/20021122205521/http://www.softtracksupply.com/. Retrieved Oct. 28, 2016.
https://web.archive.org/web/20021209185647/http://www.softtracksupply.com/index.asp?page=st10t. Retrieved Oct. 28, 2016 from Internet Archive Wayback Machine.

(56) References Cited

OTHER PUBLICATIONS https://web.archive.org/web/20030217165537/http://www.softtracksupply.com/index.asp?page=st15t. Retrieved Oct. 28, 2016 from Internet Archive Wayback Machine.

\* cited by examiner

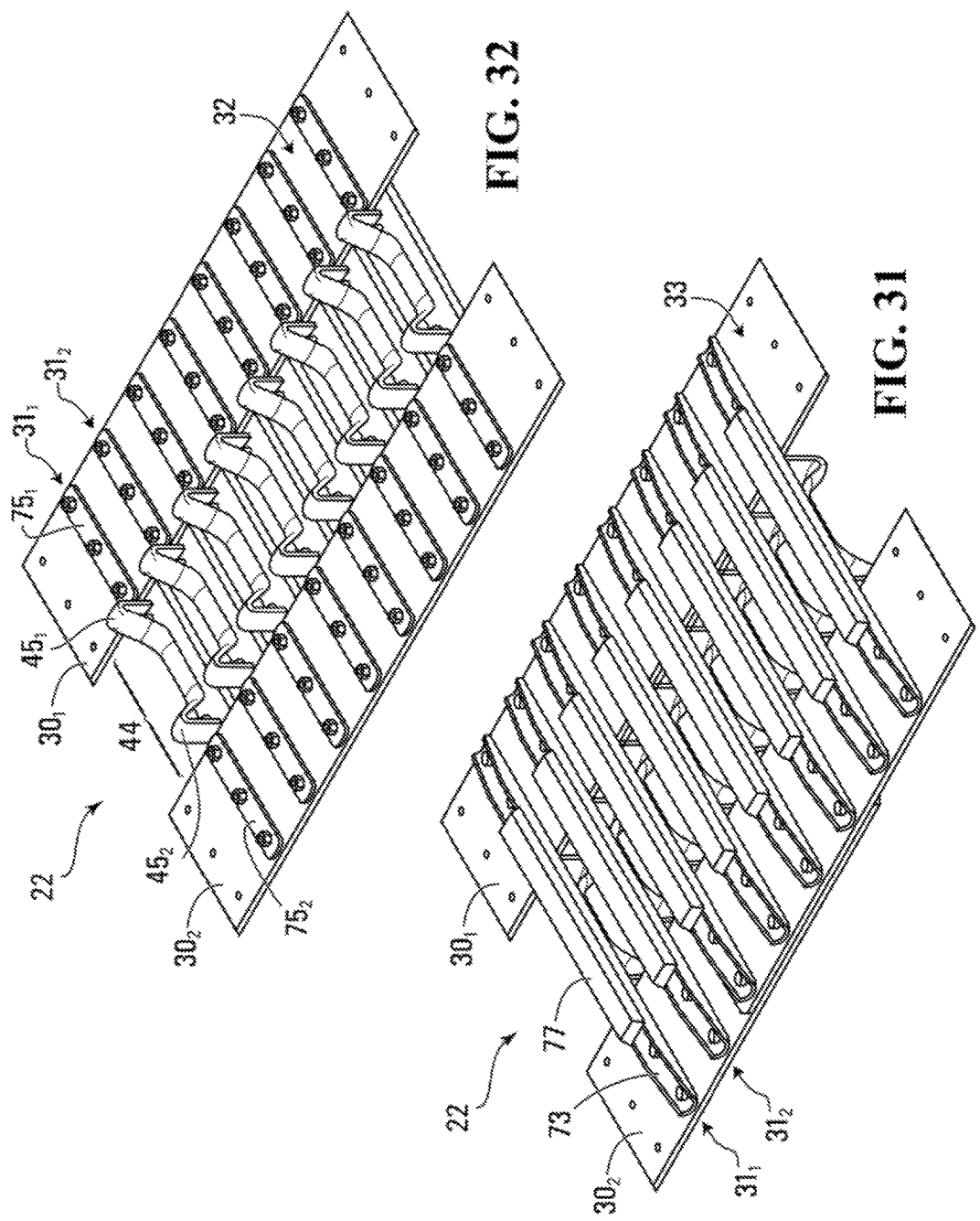

TRACKED VEHICLE

CROSS-REFERENCE TO RELATED APPLICATIONS

This application is a continuation of U.S. patent application Ser. No. 14/342,143 filed Jul. 28, 2014, which is a national stage of International Application No. PCT/CA2012/000815 filed Aug. 30, 2012, which claims the benefit of U.S. Provisional Patent Application No. 61/542,551 filed on Oct. 3, 2011 and U.S. Provisional Patent Application No. 61/529,639 filed on Aug. 31, 2011. This application is also a continuation of U.S. patent application Ser. No. 14/194,270 filed Feb. 28, 2014, now U.S. Pat. No. 9,604,679, which is a continuation of International Application No. PCT/CA2012/000815 filed Aug. 30, 2012, which claims the benefit of U.S. Provisional Patent Application No. 61/542,551 filed on Oct. 3, 2011 and U.S. Provisional Patent Application No. 61/529,639 filed on Aug. 31, 2011. All of the above-identified applications and patents are hereby incorporated by reference.

FIELD OF THE INVENTION

The invention relates to tracked vehicles designed to travel on various terrains, including rugged terrain, and, in particular, to tracked utility vehicles carrying work equipment.

BACKGROUND

One type of tracked vehicle is a tracked utility vehicle, sometimes referred to as a "tracked carrier" or "tracked equipment carrier" vehicle, which carries and enables use of work equipment, such as a crane, an aerial device, a drill rig, a digger derrick, and/or any other industrial apparatus, on various terrains, including rugged terrain (e.g., with mud, steep hills, swamps, rocks, mud, and/or snow).

It is often desirable for a tracked utility vehicle to have a tarrying capacity as large as possible but yet be sized such that the vehicle can fit a public road infrastructure. For example, it may be desirable that the vehicle be low enough to fit below an underpass or otherwise respect a vehicle height limit of the public road infrastructure (e.g., when transported on a truck's deck trailer). This typically imposes certain limitations on components of the vehicle. For instance, this may limit a size of an operator cabin of the vehicle, to avoid interference with the work equipment carried by the vehicle.

The work equipment carried by a tracked utility vehicle is normally mounted to the vehicle's frame. This can often present issues or challenges. For example, the work equipment is often designed to be installed on a truck's frame. Since the tracked utility vehicle's frame is typically very different from a truck's frame, the work equipment cannot be mounted as readily to the tracked utility vehicle's frame than to a truck's frame. Rather, modifications may have to be made to the work equipment and/or to the tracked utility vehicle to allow the work equipment to be installed on the tracked utility vehicle's frame. For instance, in some cases, an intermediate support structure may need to be installed between the work equipment and the tracked utility vehicle's frame to support and anchor the work equipment.

Each track assembly of a tracked utility vehicle comprises an endless track disposed around a set of wheels and engaging the ground to generate traction. Installing the endless track around the set of wheels can sometimes be difficult. For instance, in some case, the endless track's inner side may have guide projections which may interfere with some of the wheels during installation of the track around the set of wheels. Also, tension in the endless track may be maintained by an independent tensioner (e.g., a hydraulic accumulator and cylinder or a spring-loaded actuator) which may cause certain issues (e.g., difficulties in maintaining constant tension over displacement of the cylinder or actuator).

Challenges similar to those discussed above in respect of a tracked utility vehicle may be encountered in other types of industrial tracked vehicles.

Accordingly, there is a need for improvements in tracked utility vehicles and other tracked vehicles.

SUMMARY OF THE INVENTION

In accordance with an aspect of the invention, there is provided a tracked vehicle. The tracked vehicle comprises a chassis comprising a frame extending along a longitudinal direction of the tracked vehicle. The frame comprises an equipment mounting area for mounting work equipment above the frame. The tracked vehicle comprises an operator cabin mounted to the frame. The tracked vehicle also comprises a power plant mounted to the frame and comprising a prime mover. At least part of the power plant is mounted above the frame and behind the operator cabin. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises: (i) a plurality of wheels including: a drive wheel; an end wheel spaced apart from the drive wheel in the longitudinal direction of the tracked vehicle; and a plurality of support wheels arranged in an inline configuration between the drive wheel and the end wheel; and (ii) an endless track disposed around the plurality of wheels for engaging the ground. The endless track comprises a top run extending between the drive wheel and the end wheel over the support wheels and a ground-engaging bottom run extending under the support wheels. The drive wheel is in driving engagement with the endless track to impart motion to the endless track.

In accordance with another aspect of the invention, there is provided a tracked vehicle. The tracked vehicle comprises a chassis comprising a frame extending along a longitudinal direction of the tracked vehicle. The frame comprises an equipment mounting area for mounting work equipment above the frame. The tracked vehicle comprises an operator cabin mounted to the frame. The operator cabin comprises a seating area for allowing an operator to sit. The seating area defines a first seat position and a second seat position along a widthwise direction of the tracked vehicle. The tracked vehicle also comprises a power plant mounted to the frame and comprising a prime mover. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises: (i) a plurality of wheels including: a drive wheel; an end wheel spaced apart from the drive wheel in the longitudinal direction of the tracked vehicle; and a plurality of support wheels arranged in an inline configuration between the drive wheel and the end wheel; and (ii) an endless track disposed around the plurality of wheels for engaging the ground. The endless track comprises a top run extending between the drive wheel and the end wheel over the support wheels and a ground-engaging bottom run extending under the support wheels. The drive wheel is in driving engagement with the endless track to impart motion to the endless track. The tracked vehicle, with the work equipment mounted to the frame, respects a vehicle height limit for travel on a public road infrastructure.

In accordance with another aspect of the invention, there is provided a tracked vehicle. The tracked vehicle comprises a chassis comprising a frame extending along a longitudinal direction of the tracked vehicle. The frame comprises an equipment mounting area for mounting work equipment above the frame. The tracked vehicle comprises an operator cabin mounted to the frame. The operator cabin comprises a first seat for allowing an operator to sit and a second seat for allowing a second person to sit next to the operator in a widthwise direction of the tracked vehicle. The tracked vehicle also comprises a power plant mounted to the frame and comprising a prime mover. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises: (i) a plurality of wheels including: a drive wheel; an end wheel spaced apart from the drive wheel in the longitudinal direction of the tracked vehicle; and a plurality of support wheels arranged in an inline configuration between the drive wheel and the end wheel; and (ii) an endless track disposed around the plurality of wheels for engaging the ground. The endless track comprises a top run extending between the drive wheel and the end wheel over the support wheels and a ground-engaging bottom run extending under the support wheels. The drive wheel is in driving engagement with the endless track to impart motion to the endless track.

In accordance with another aspect of the invention, there is provided a tracked vehicle. The tracked vehicle comprises a chassis comprising a frame extending along a longitudinal direction of the tracked vehicle. The frame comprises an equipment mounting area for mounting work equipment above the frame. The tracked vehicle comprises an operator cabin mounted to the frame. The operator cabin comprises a seating area for allowing an operator to sit. The seating area defines a first seat position and a second seat position along a widthwise direction of the tracked vehicle. The operator cabin comprises a roof defining a height of the tracked vehicle. The height of the tracked vehicle is no more than 2.8 m. The tracked vehicle also comprises a power plant mounted to the frame and comprising a prime mover. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises: (i) a plurality of wheels including: a drive wheel; an end wheel spaced apart from the drive wheel in the longitudinal direction of the tracked vehicle; and a plurality of support wheels arranged in an inline configuration between the drive wheel and the end wheel; and (ii) an endless track disposed around the plurality of wheels for engaging the ground. The endless track comprises a top run extending between the drive wheel and the end wheel over the support wheels and a ground-engaging bottom run extending under the support wheels. The drive wheel is in driving engagement with the endless track to impart motion to the endless track.

In accordance with another aspect of the invention, there is provided a tracked vehicle. The tracked vehicle comprises a chassis comprising a frame extending along a longitudinal direction of the tracked vehicle. The frame comprises an equipment mounting area for mounting work equipment above the frame. The tracked vehicle comprises an operator cabin mounted to the frame. The operator cabin comprises a seating area for allowing an operator to sit and a user interface for enabling the operator to control the tracked vehicle. The user interface comprises an accelerator for controlling a speed of the tracked vehicle and a steering device for steering the tracked vehicle. The operator cabin is configurable in a plurality of cabin configurations including: a first cabin configuration in which the operator sits in a first seat position of the seating area along a widthwise direction of the tracked vehicle and the steering device is in a first steering device position along the widthwise direction of the tracked vehicle; and a second cabin configuration in which the operator sits in a second seat position of the seating area along the widthwise direction of the tracked vehicle and the steering device is in a second steering device position along the widthwise direction of the tracked vehicle. The tracked vehicle also comprises a power plant mounted to the frame and comprising a prime mover. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises: (i) a plurality of wheels including: a drive wheel; an end wheel spaced apart from the drive wheel in the longitudinal direction of the tracked vehicle; and a plurality of support wheels arranged in an inline configuration between the drive wheel and the end wheel; and (ii) an endless track disposed around the plurality of wheels for engaging the ground. The endless track comprises a top run extending between the drive wheel and the end wheel over the support wheels and a ground-engaging bottom run extending under the support wheels. The drive wheel is in driving engagement with the endless track to impart motion to the endless track.

In accordance with another aspect of the invention, there is provided a tracked vehicle. The tracked vehicle comprises a chassis comprising a frame extending along a longitudinal direction of the tracked vehicle. The frame comprises an equipment mounting area for mounting work equipment above the frame. The tracked vehicle comprises an operator cabin mounted to the frame. The operator cabin comprises a seating area for allowing an operator to sit and a user interface for enabling the operator to control the tracked vehicle. The user interface comprises an accelerator for controlling a speed of the tracked vehicle and a steering device for steering the tracked vehicle. The operator cabin is configurable in a plurality of cabin configurations including: a first cabin configuration in which the operator sits in a first seat position of the seating area along a widthwise direction of the tracked vehicle and the steering device is in a first steering device position along the widthwise direction of the tracked vehicle; and a second cabin configuration in which the operator sits in a second seat position of the seating area along the widthwise direction of the tracked vehicle and the steering device is in a second steering device position along the widthwise direction of the tracked vehicle. The tracked vehicle also comprises a power plant mounted to the frame and comprising a prime mover. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises a plurality of wheels including: a drive wheel; an end wheel spaced apart from the drive wheel in the longitudinal direction of the tracked vehicle; and a plurality of support wheels arranged in an inline configuration between the drive wheel and the end wheel. Each support wheel occupies a majority of a height of the track assembly and comprises a first support wheel member rotatable on an axle of the support wheel and having a circumference of the support wheel and a second support wheel member rotatable on the axle of the support wheel and having the circumference of the support wheel. The second support wheel member is installable in and removable from the track assembly separately from the first support wheel member. The track assembly also comprises an endless track disposed around the plurality of wheels for engaging the ground. The endless track comprises a top run extending between the drive wheel and the end wheel over the support wheels and a ground-engaging bottom run extending under the support wheels. The drive wheel is in driving engagement with the endless track to impart motion to the endless track.

In accordance with another aspect of the invention, there is provided a tracked vehicle. The tracked vehicle comprises a chassis comprising a frame extending along a longitudinal direction of the tracked vehicle. The frame comprises a pair of side rails spaced apart in a widthwise direction of the tracked vehicle for mounting work equipment carried by the tracked vehicle to the side rails. A spacing of the side rails in the widthwise direction of the tracked vehicle corresponds to a standard truck frame side rail spacing. The tracked vehicle comprises an operator cabin mounted to the frame. The tracked vehicle also comprises a power plant mounted to the frame and comprising a prime mover. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises: (i) a plurality of wheels including: a drive wheel; an end wheel spaced apart from the drive wheel in the longitudinal direction of the tracked vehicle; and a plurality of support wheels arranged in an inline configuration between the drive wheel and the end wheel; and (ii) an endless track disposed around the plurality of wheels for engaging the ground. The endless track comprises a top run extending between the drive wheel and the end wheel over the support wheels and a ground-engaging bottom run extending under the support wheels. The drive wheel is in driving engagement with the endless track to impart motion to the endless track.

In accordance with another aspect of the invention, there is provided a tracked vehicle. The tracked vehicle comprises a chassis comprising a frame extending along a longitudinal direction of the tracked vehicle. The frame comprises a pair of side rails spaced apart in a widthwise direction of the tracked vehicle for mounting work equipment carried by the tracked vehicle to the side rails. A spacing of the side rails in the widthwise direction of the tracked vehicle being no greater than 34 inches. The tracked vehicle also comprises a power plant mounted to the frame and comprising a prime mover. The tracked vehicle comprises an operator cabin mounted to the frame. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises: (i) a plurality of wheels including: a drive wheel; an end wheel spaced apart from the drive wheel in the longitudinal direction of the tracked vehicle; and a plurality of support wheels arranged in an inline configuration between the drive wheel and the end wheel; and (ii) an endless track disposed around the plurality of wheels for engaging the ground. The endless track comprises a top run extending between the drive wheel and the end wheel over the support wheels and a ground-engaging bottom run extending under the support wheels. The drive wheel is in driving engagement with the endless track to impart motion to the endless track.

In accordance with another aspect of the invention, there is provided a tracked vehicle. The tracked vehicle comprises a chassis comprising a frame extending along a longitudinal direction of the tracked vehicle. The frame comprises an upper frame structure including a pair of side rails spaced apart in a widthwise direction of the tracked vehicle for mounting work equipment carried by the tracked vehicle to the side rails. The frame also comprises a lower frame structure below the upper frame structure. The frame defines a vertical gap between the upper frame structure and the lower frame structure. The tracked vehicle also comprises a power plant mounted to the frame and comprising a prime mover. The tracked vehicle comprises an operator cabin mounted to the frame. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises: (i) a plurality of wheels including: a drive wheel; an end wheel spaced apart from the drive wheel in the longitudinal direction of the tracked vehicle; and a plurality of support wheels arranged in an inline configuration between the drive wheel and the end wheel; and (ii) an endless track disposed around the plurality of wheels for engaging the ground. The endless track comprises a top run extending between the drive wheel and the end wheel over the support wheels and a ground-engaging bottom run extending under the support wheels. The drive wheel is in driving engagement with the endless track to impart motion to the endless track.

In accordance with another aspect of the invention, there is provided a tracked vehicle. The tracked vehicle comprises a chassis comprising a frame extending along a longitudinal direction of the tracked vehicle. The tracked vehicle also comprises a power plant mounted to the frame and comprising a prime mover and a hydraulic drive system connected to the prime mover. The tracked vehicle comprises an operator cabin mounted to the frame. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises: (i) a plurality of wheels including a drive wheel; an end wheel spaced apart from the drive wheel in the longitudinal direction of the tracked vehicle; and a plurality of support wheels arranged in an inline configuration between the drive wheel and the end wheel; (ii) an endless track disposed around the plurality of wheels for engaging the ground; and iii) a track tensioner for maintaining tension in the endless track. The track tensioner comprises a hydraulic actuator hydraulically connected to the hydraulic drive system. The endless track comprises a top run extending between the drive wheel and the end wheel over the support wheels and a ground-engaging bottom run extending under the support wheels. The drive wheel is in driving engagement with the endless track to impart motion to the endless track.

In accordance with another aspect of the invention, there is provided a tracked vehicle. The tracked vehicle comprises a chassis comprising a frame extending along a longitudinal direction of the tracked vehicle. The tracked vehicle also comprises a power plant mounted to the frame and comprising a prime mover. The tracked vehicle comprises a plurality of track assemblies for traction of the tracked vehicle. A first one of the track assemblies is on a first lateral side of the tracked vehicle and a second one of the track assemblies is on a second lateral side of the tracked vehicle. Each track assembly of the plurality of track assemblies is mounted to the frame and comprises a plurality of wheels including: a drive wheel; a rear wheel spaced apart from the drive wheel in the longitudinal direction of the tracked vehicle; and a plurality of support wheels arranged in an inline configuration between the drive wheel and the end wheel.

The rear wheel and a rearmost one of the support wheels overlap in the longitudinal direction of the tracked vehicle. The track assembly also comprises an endless track disposed around the plurality of wheels for engaging the ground. The endless track comprises a top run extending between the drive wheel and the end wheel over the support wheels and a ground-engaging bottom run extending under the support wheels. The drive wheel is in driving engagement with the endless track to impart motion to the endless track.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 31 and 32 show a perspective view of a ground-engaging outer side, and a perspective view of an inner side, of an endless track in accordance with another embodiment of the invention;

Figure 1:
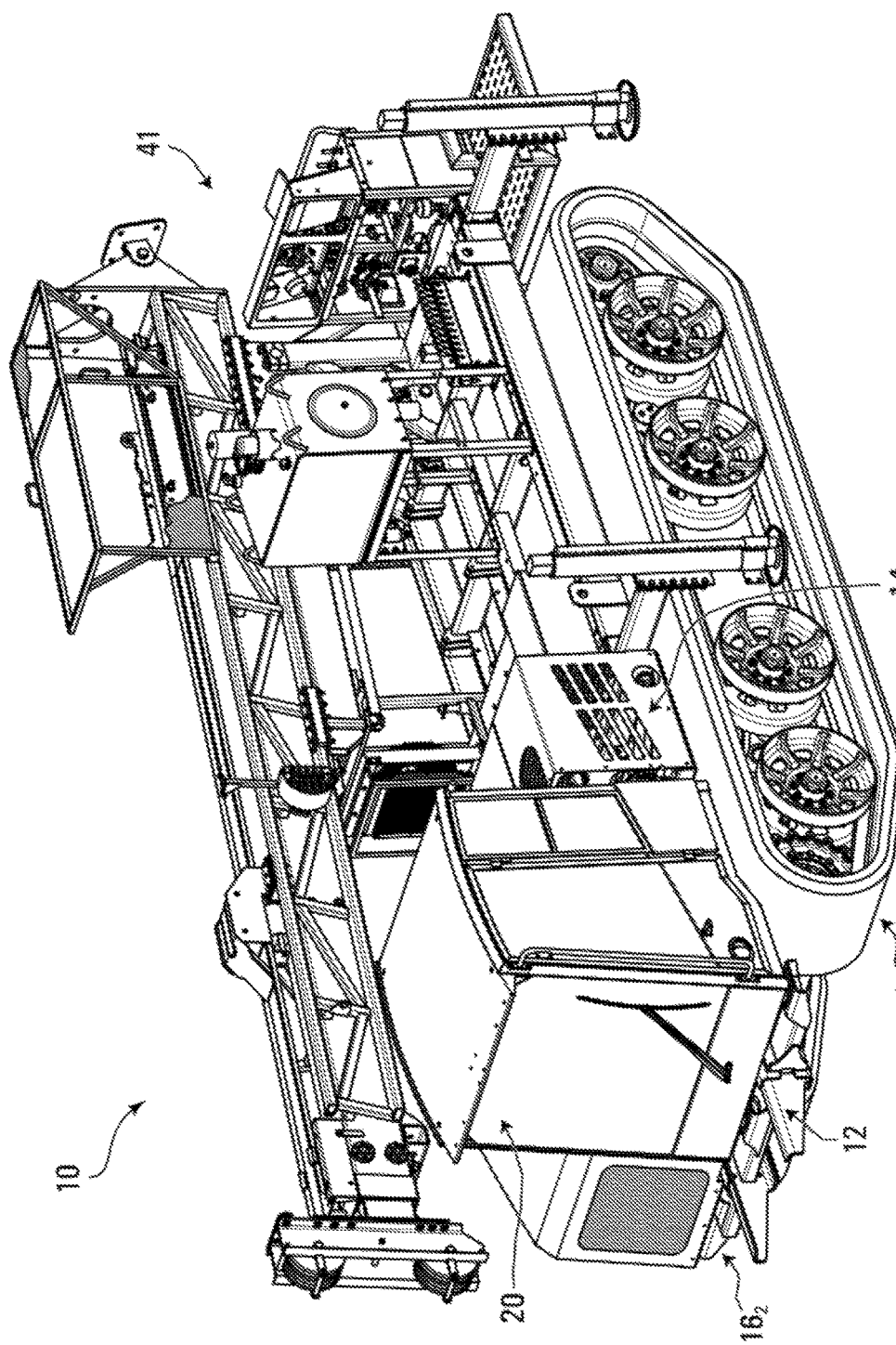
FIGS. 1 to 6 show a first perspective view, a second perspective view, a side view, a front view, a rear view, and a top view of an example of a tracked vehicle equipped with work equipment in accordance with an embodiment of the invention.
Figure 2:
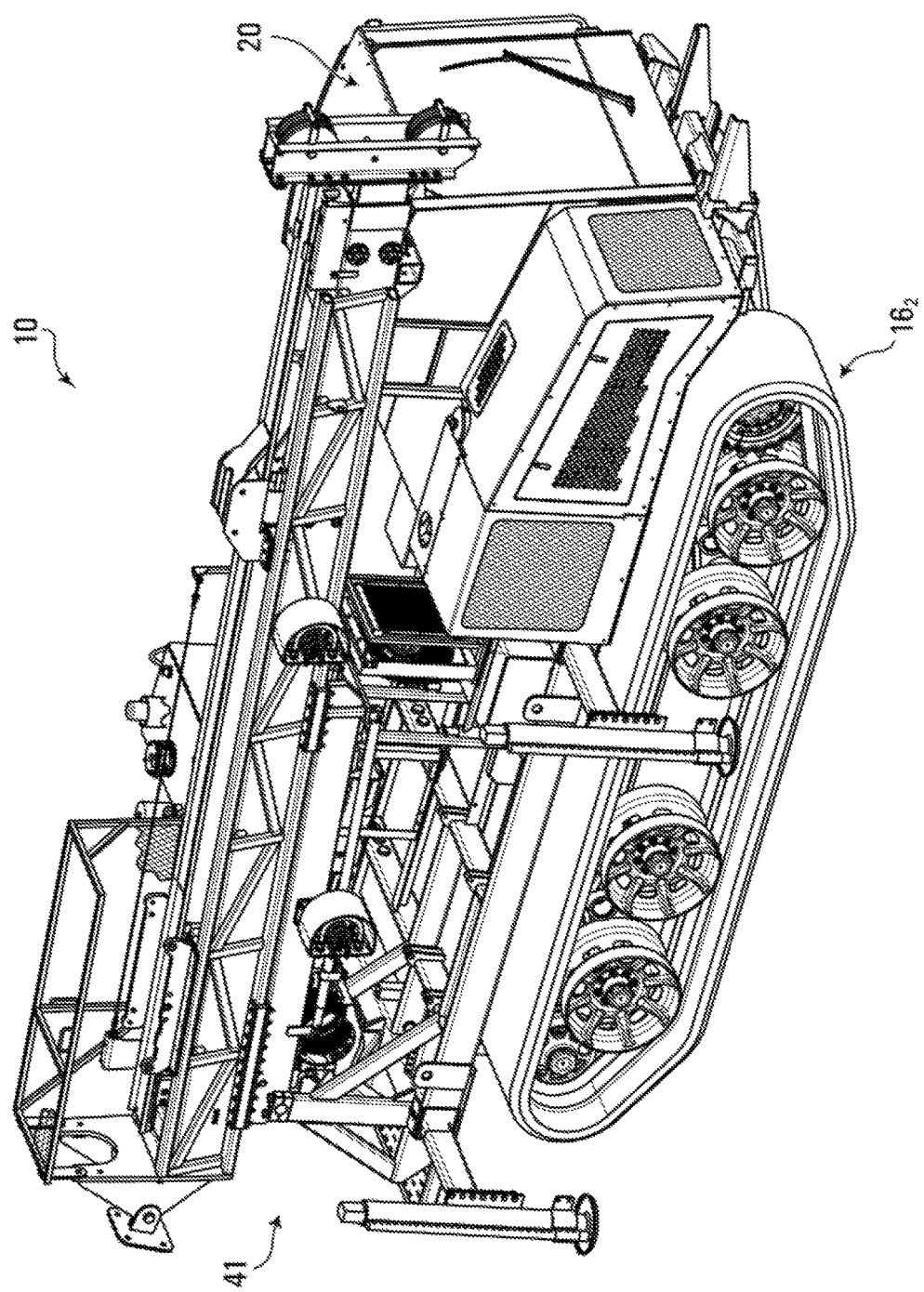
Figure 3:
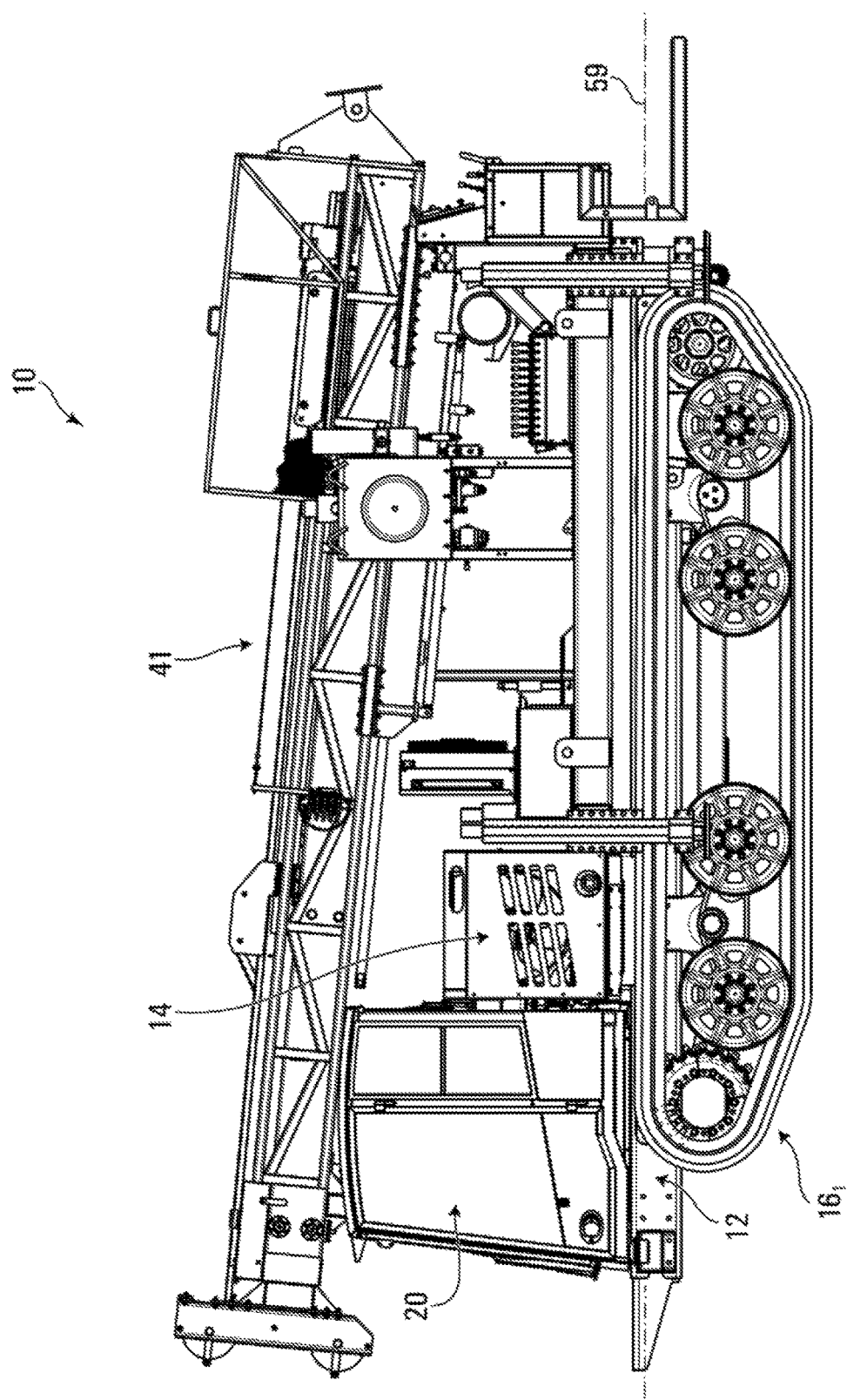
Figure 4:
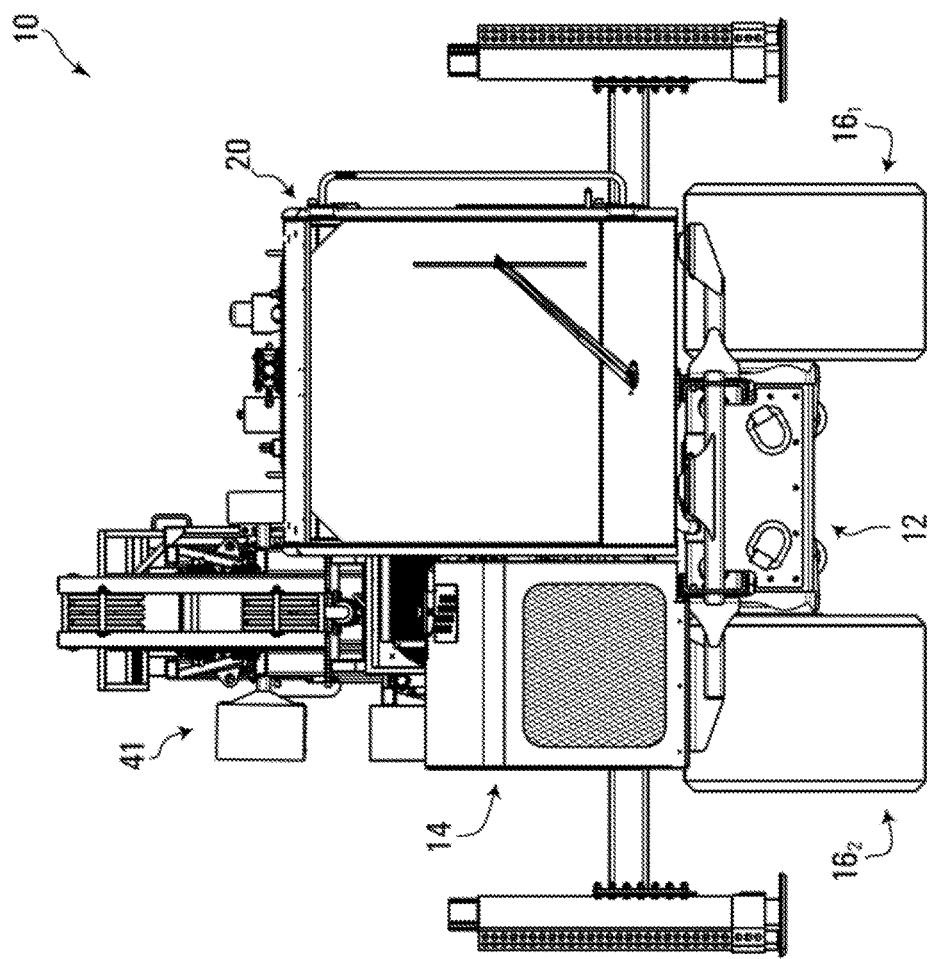
Figure 5:
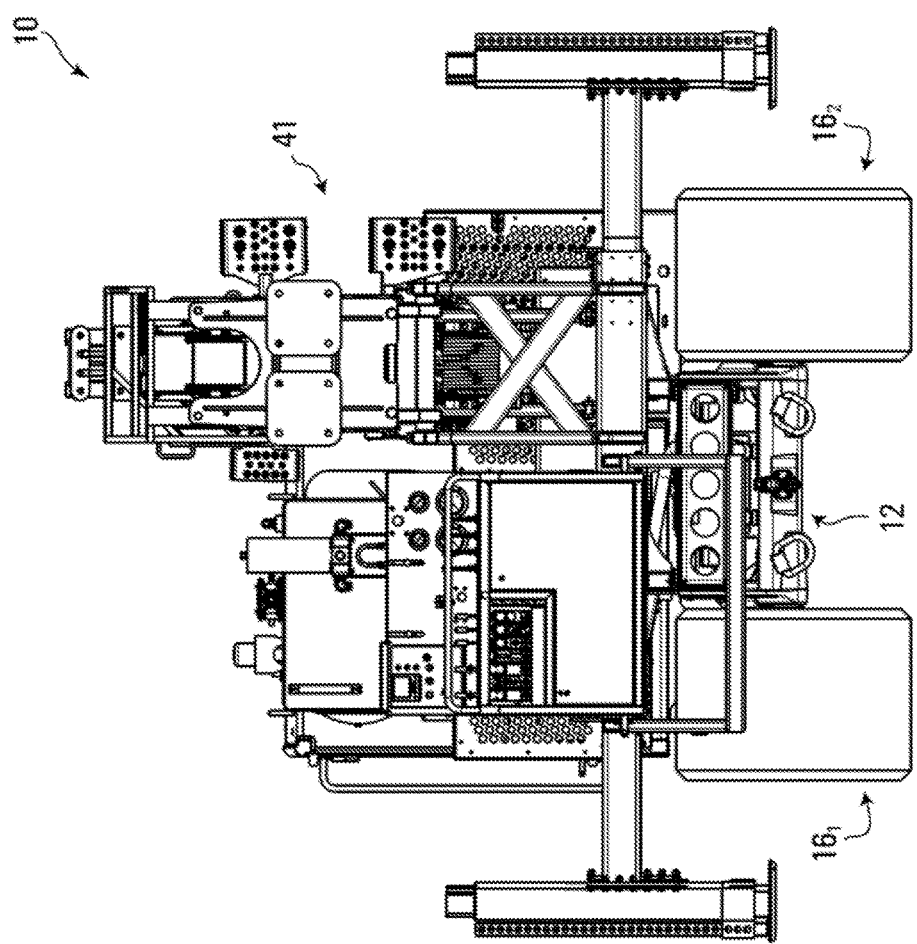
Figure 6:
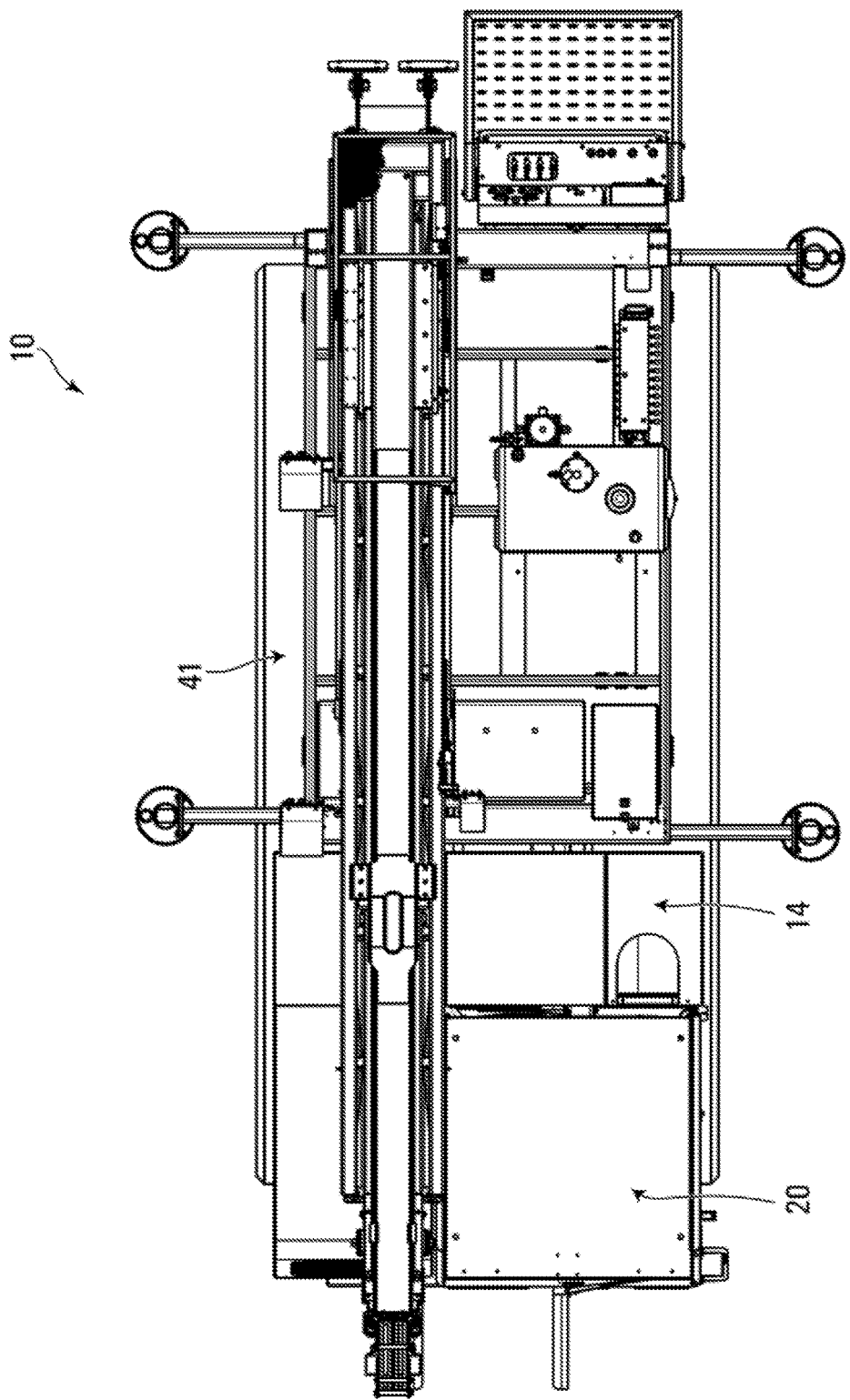
Figure 7:
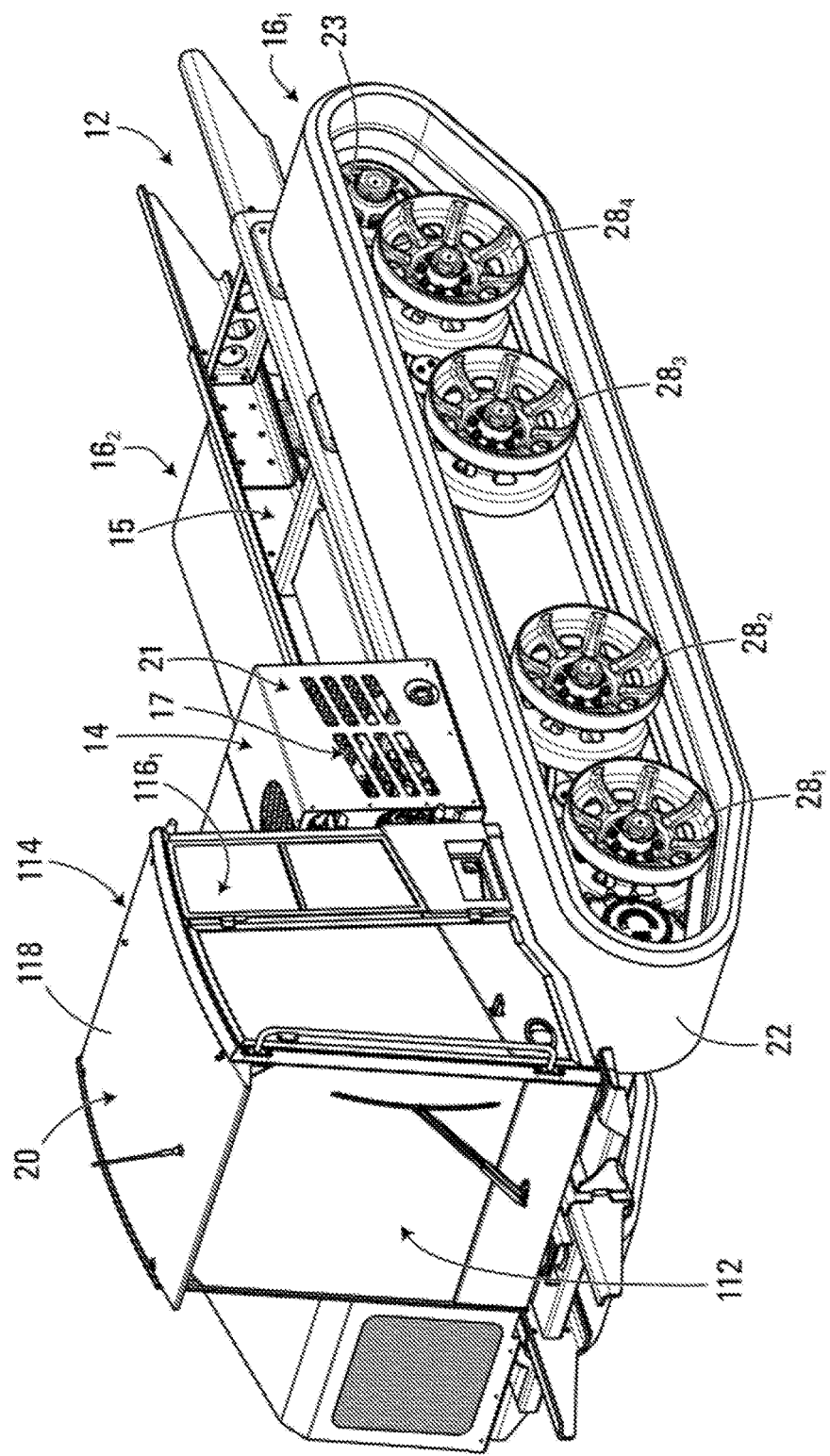
FIGS. 7 to 13 show a first perspective view, a second perspective view, a side view, a front view, a rear view, a top view, and a bottom view of the tracked vehicle without the work equipment.
Figure 8:
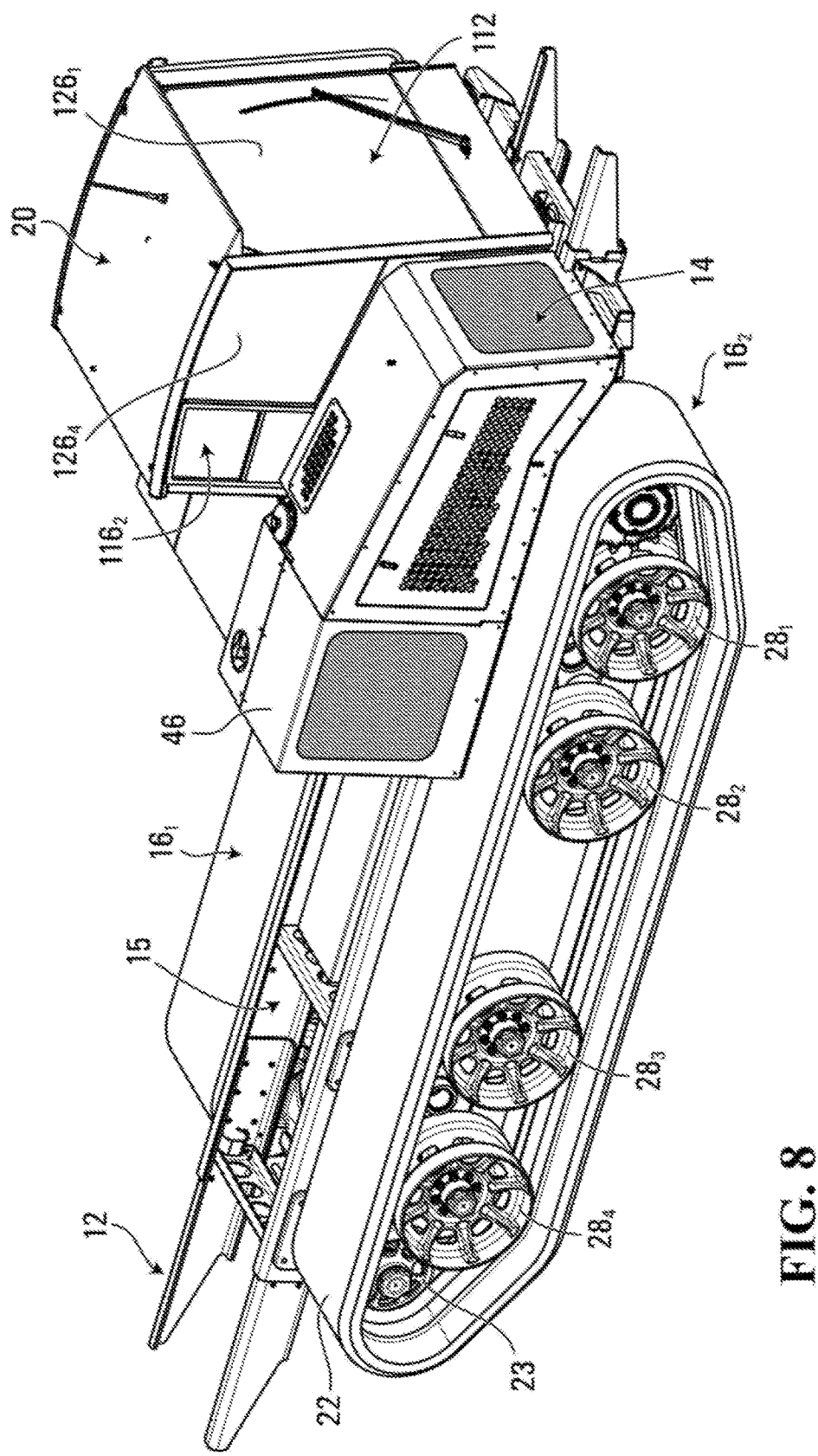
Figure 9:
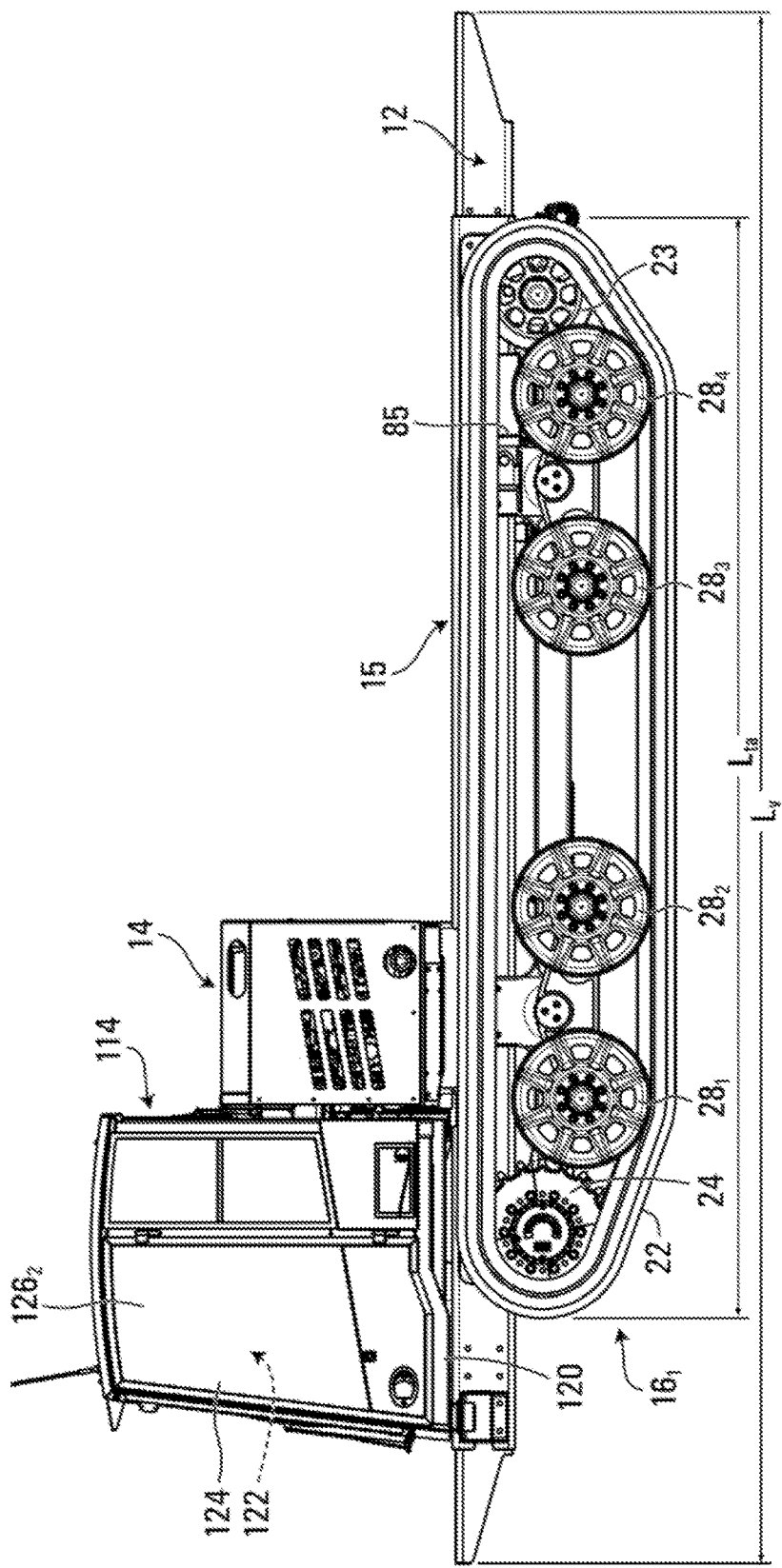
Figure 10:
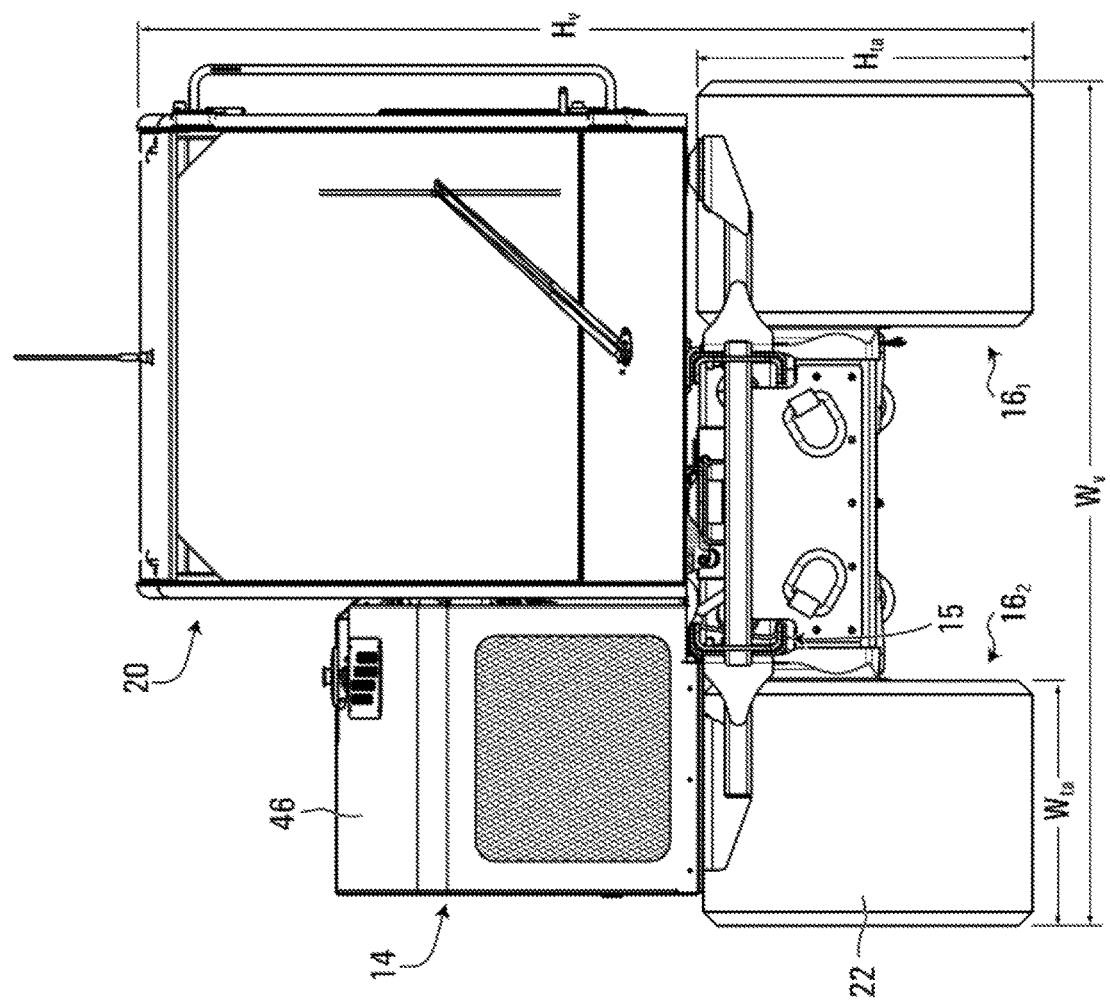
Figure 11:
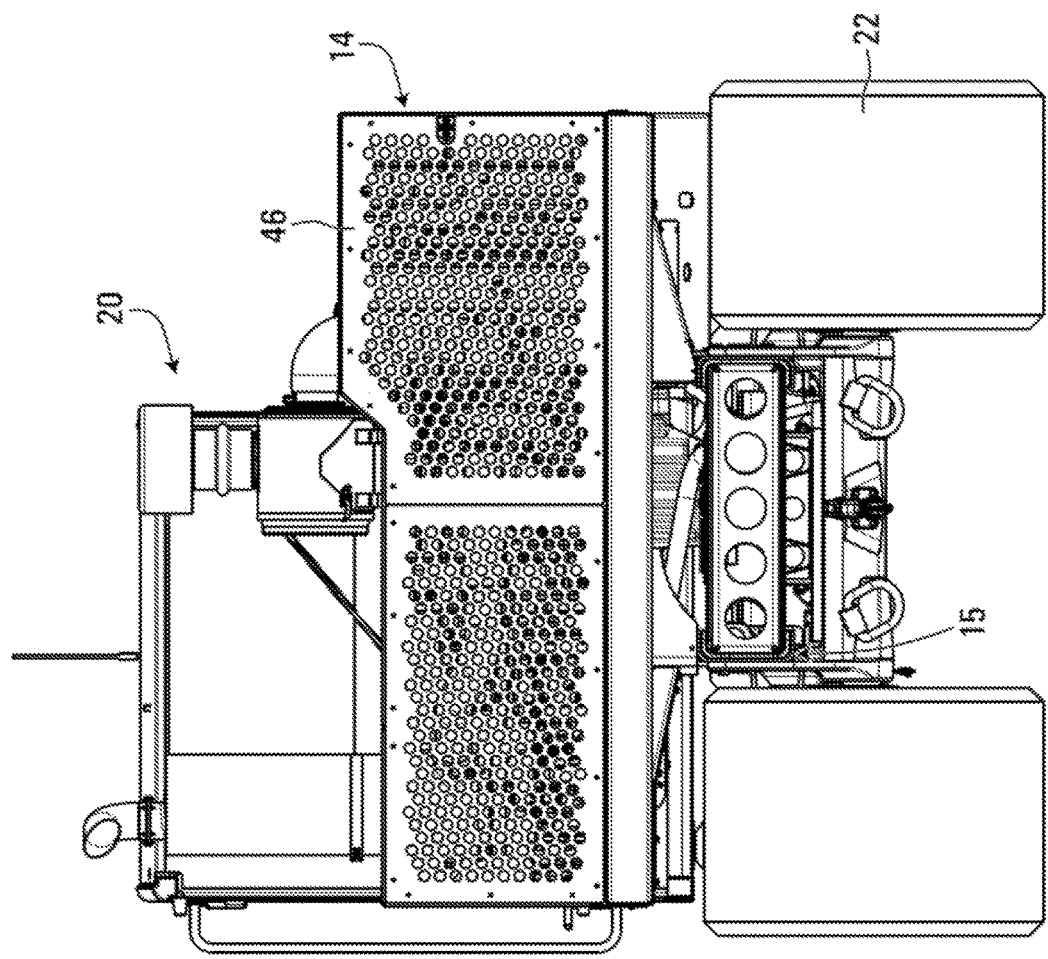
Figure 12:
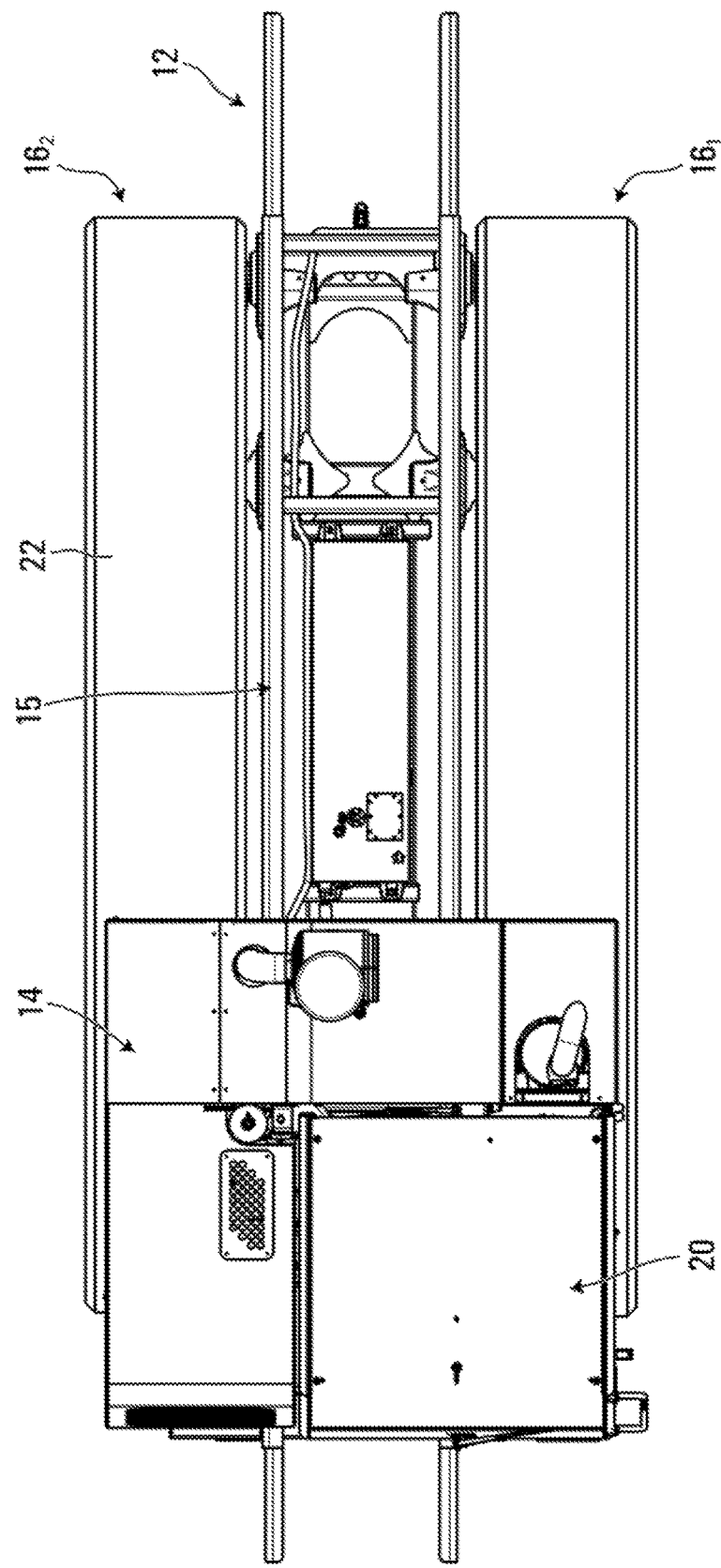
Figure 13:
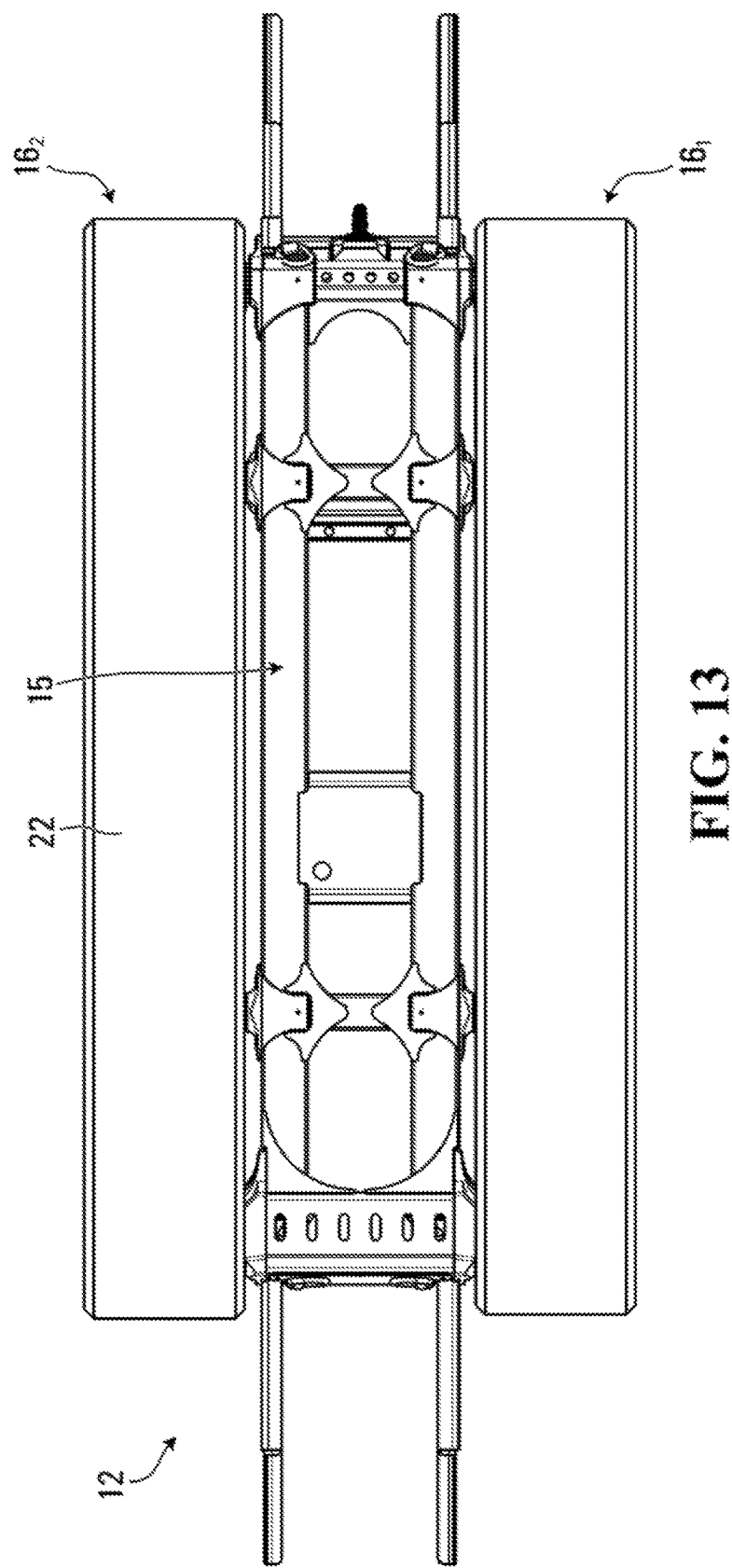
Figure 14:
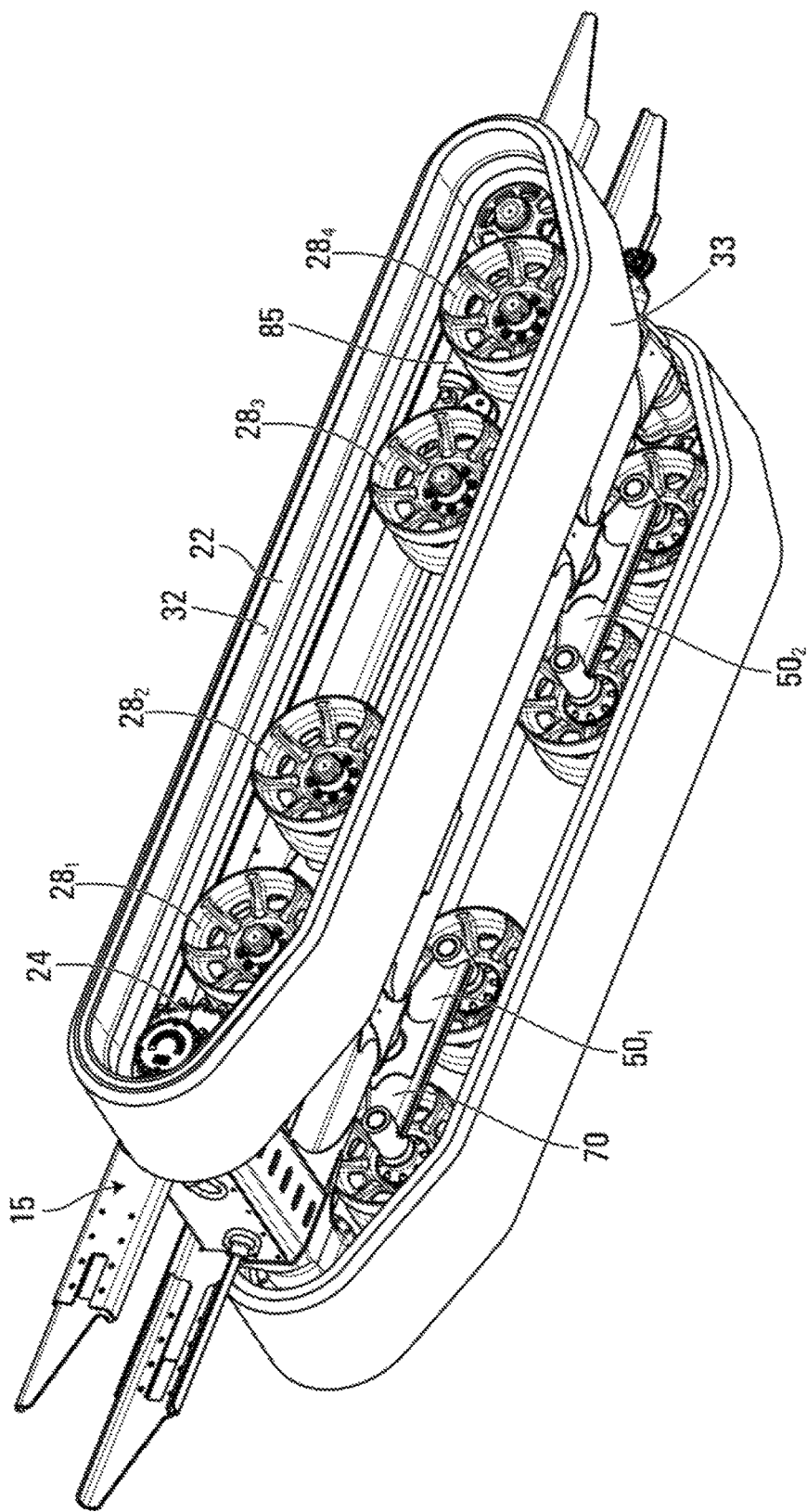
FIGS. 14 to 18 show a perspective view, a side view, a top view, a front view, and a rear view of a chassis including a frame and track assemblies of the tracked vehicle.
Figure 15:
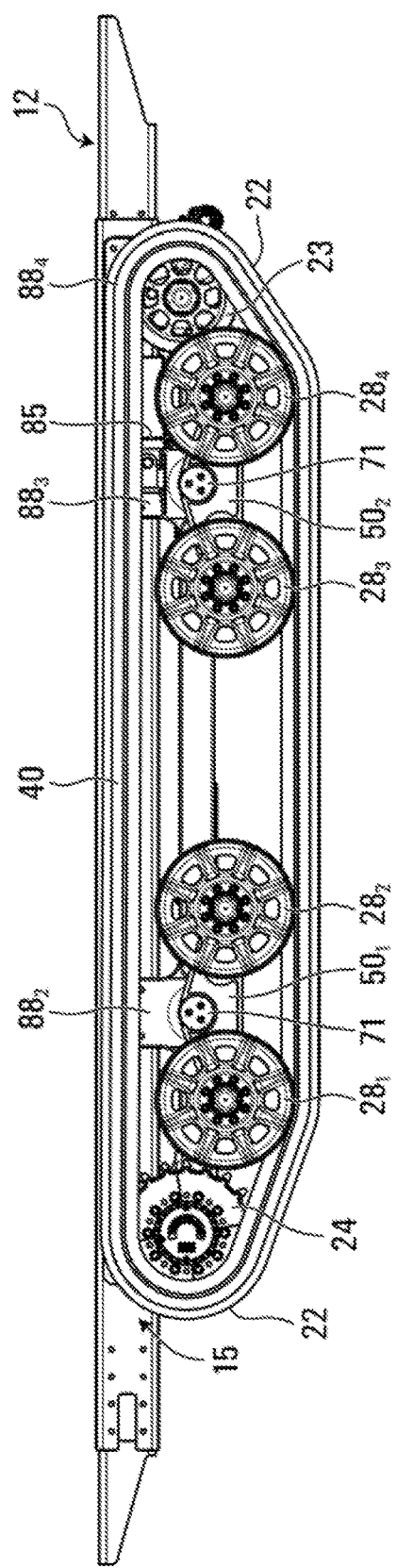
Figure 16:
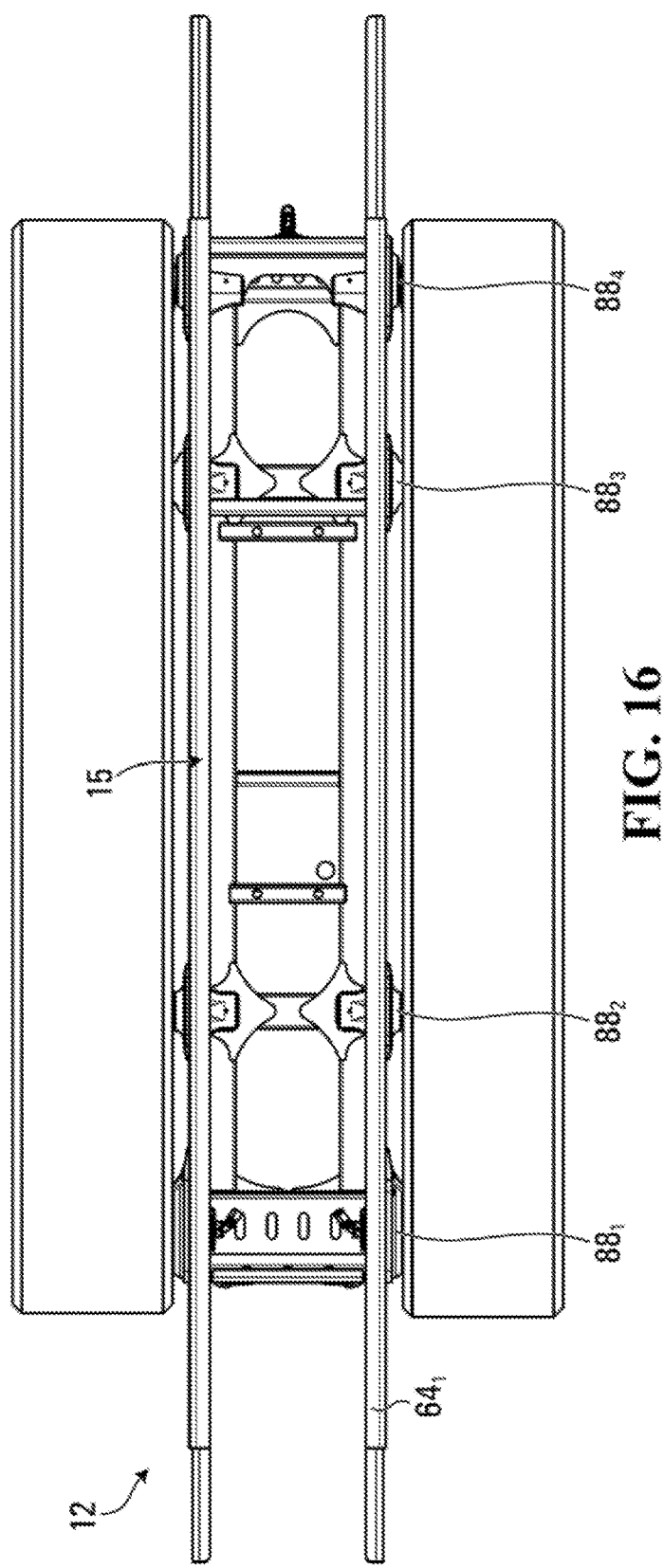
Figure 17:
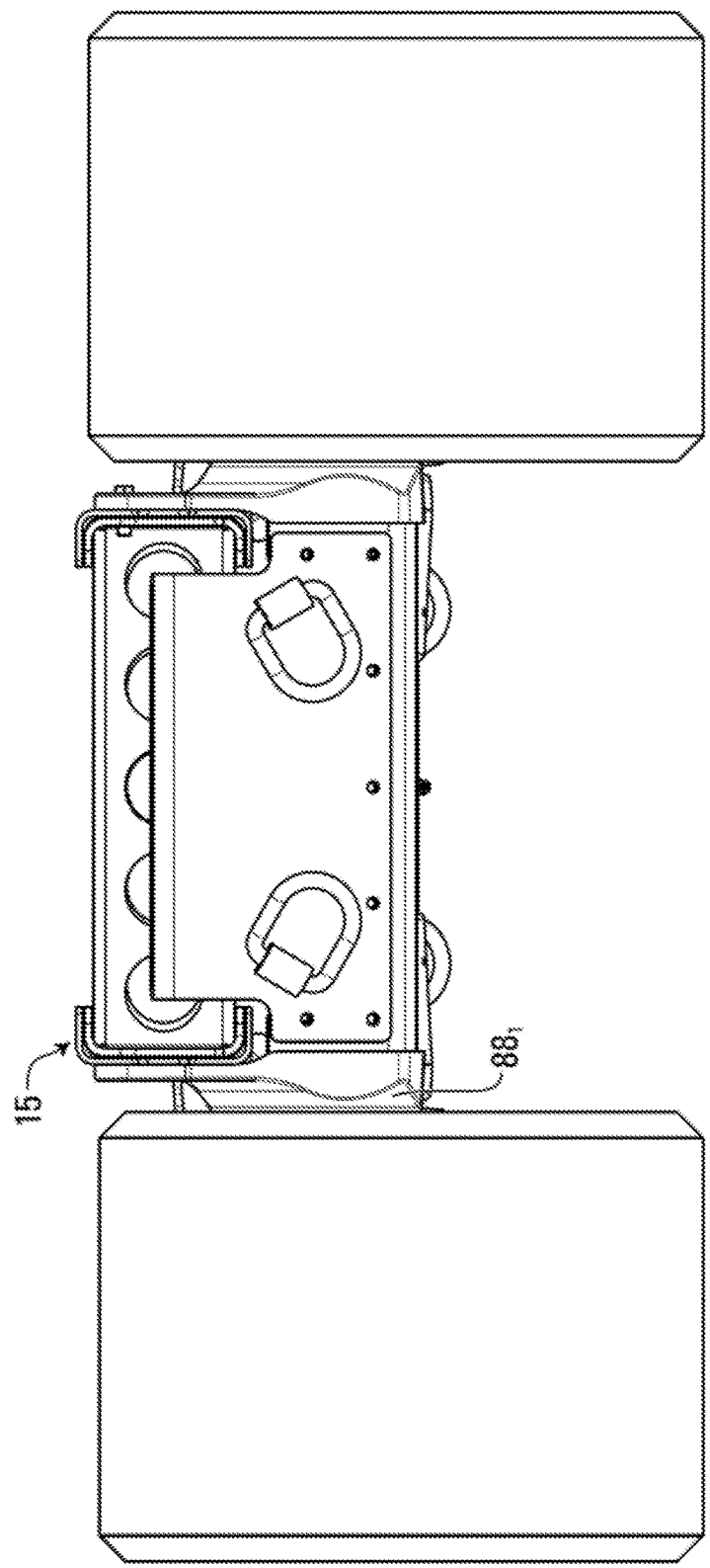
Figure 18:
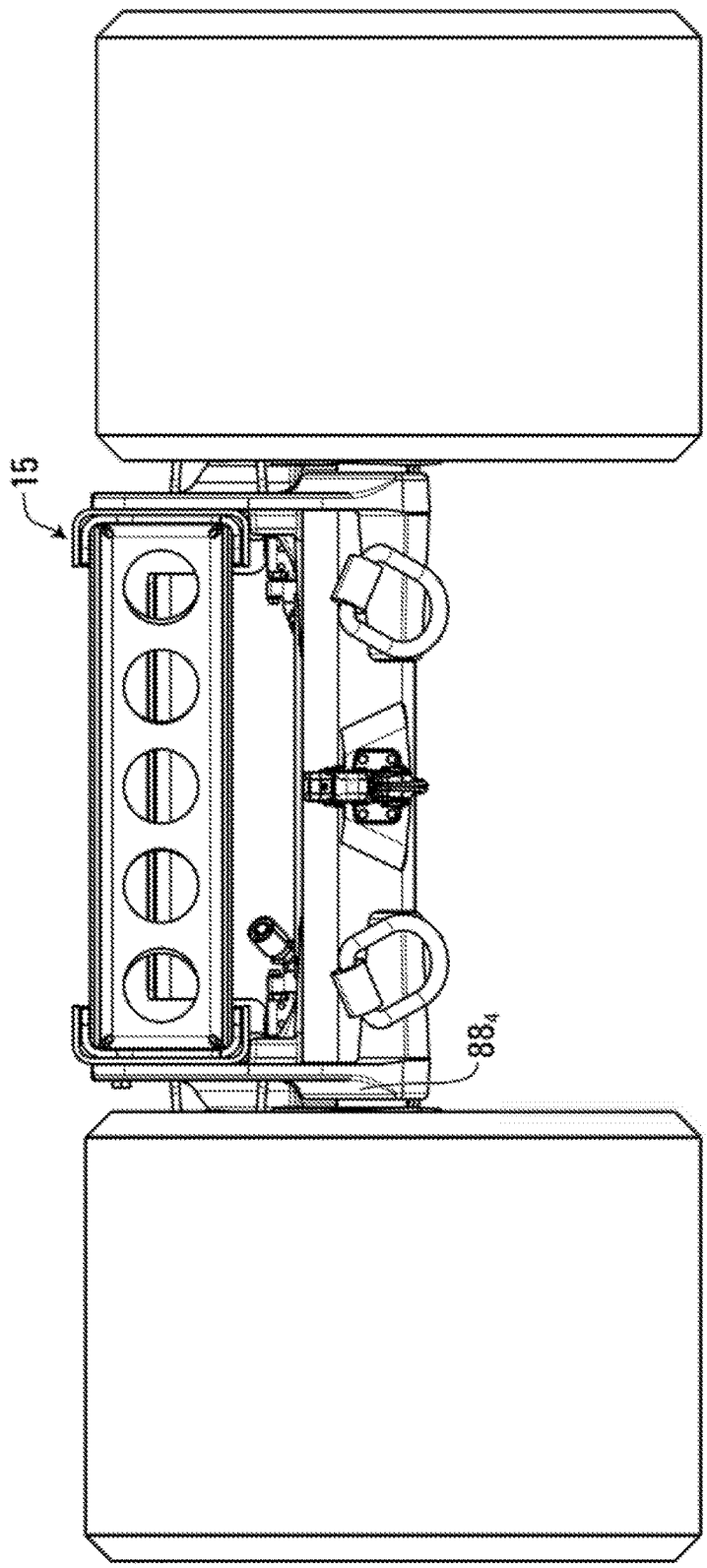
Figure 19:
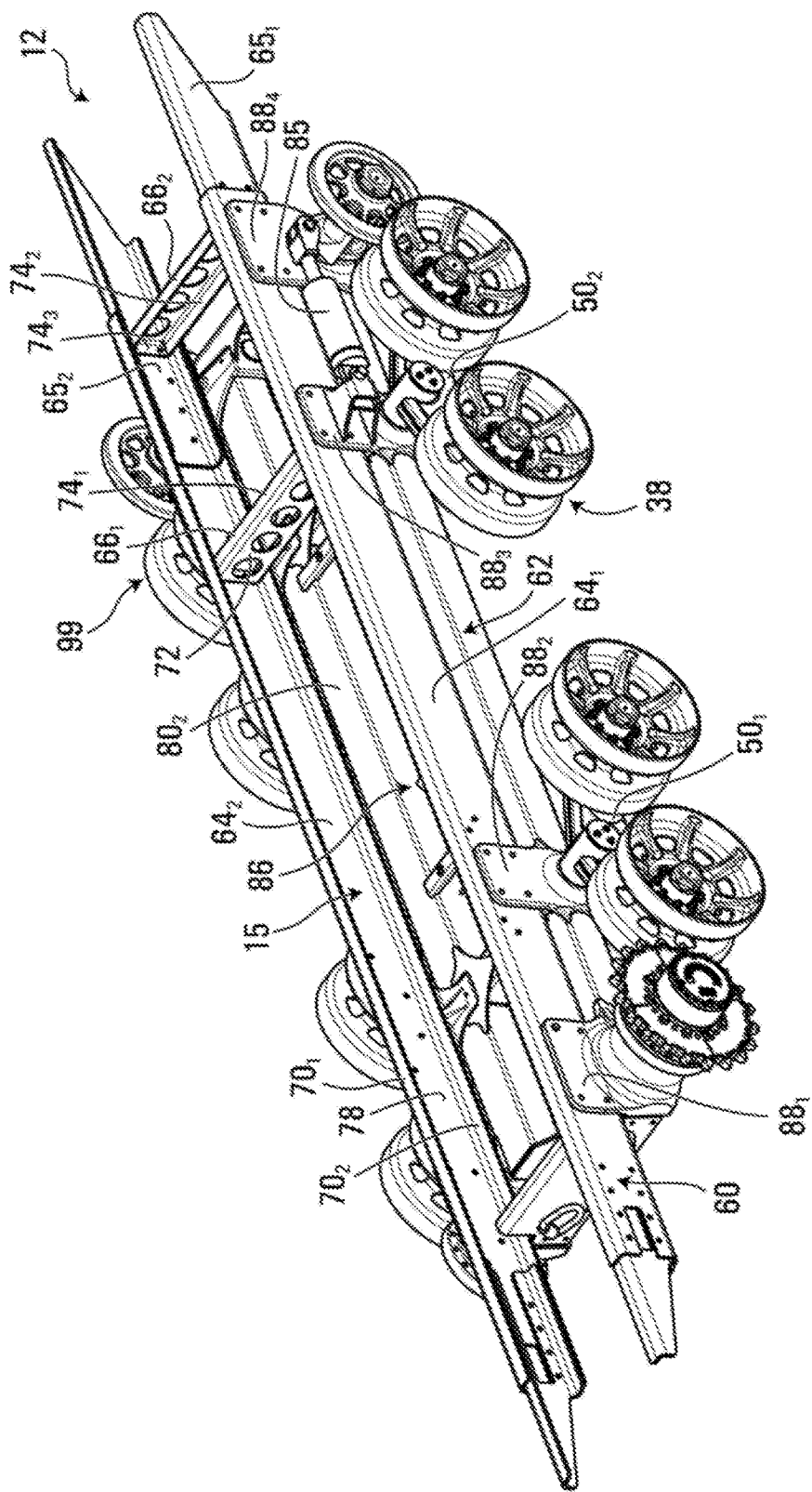
FIGS. 19 to 25 show a perspective view, a side view, a top view, a bottom view, a front view, a rear view, and a cross-sectional view of the frame and the track assemblies without endless tracks of the track assemblies.

In the drawings, embodiments of the invention are illustrated by way of example. It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

FIGS. 1 to 13 show an example of a tracked utility vehicle 10 in accordance with an embodiment of the invention. The tracked utility vehicle 10 is designed to carry and enable use of work equipment 41, which includes one or more work implements such as, for example, a crane, a ladder, an aerial device, an aerial work platform, a lift, a drill rig, a digger derrick, a material handler, and/or any other industrial apparatus, on various terrains, including rugged terrain (e.g., with mud, steep hills, swamps, rocks, mud, and/or snow). This type of vehicle can sometimes be referred to as a "tracked carrier" or "tracked equipment carrier" vehicle.

The tracked utility vehicle 10 has a length $L_v$, a width $W_v$, and a height $H_v$ (measured without taking into account the work equipment 41). These dimensions may allow the vehicle 10 to have a large payload capacity while being able to be used in a public road infrastructure. For example, in some embodiments, the length $L_v$ may be at least 5 m, such as between 5 m and 10 m, in some cases between 6 m and 9 m, and in some cases between 7 m and 8 m; the width $W_v$ may be at least 2 m, such as between 2 m and 5 m, in some cases between 2.5 m and 4.5 m, and in some cases between 3 m and 4 m; and the height $H_v$ may be no more than 4 m, in some cases no more than 3.5 m, and in some cases no more than 3 m. The length $L_v$, width $W_v$, and height $H_v$ may take on various other values in other embodiments.

The tracked utility vehicle 10 has a payload capacity which carp be quite larger. For example, in some embodiments, the payload capacity of the vehicle 10 may be at least 10000 lbs (about 4536 kg), in some cases at least 15000 lbs (about 6804 kg), in some cases at least 20000 lbs (about 9072 kg), in some cases at least 30000 lbs (about 13608 kg), and in some cases at least 40000 lbs (18144 kg). The payload capacity may take on various other values in other embodiments.

In this embodiment, the tracked utility vehicle 10 comprises a chassis 12, a power plant 14, a plurality of track assemblies $16_1$, $16_2$, and an operator cabin 20. The vehicle 10 has a longitudinal axis 59 defining a longitudinal direction of the vehicle 10 (i.e., a direction generally parallel to its longitudinal axis 59) and transversal directions (i.e., directions transverse to its longitudinal axis 59), including a widthwise direction (i.e., a lateral direction generally perpendicular to its longitudinal axis 59). The vehicle 10 also has a height direction which is normal to both its longitudinal direction and its widthwise direction.

a) Power Plant

The power plant 14 generates power to move the tracked utility vehicle 10. To that end, the power plant 14 comprises a prime mover 17. For example, the prime mover 17 may comprise an internal combustion engine and/or one or more other types of motors (e.g., electric motors, etc.) for generating motive power to move the vehicle 10.

Figure 33:
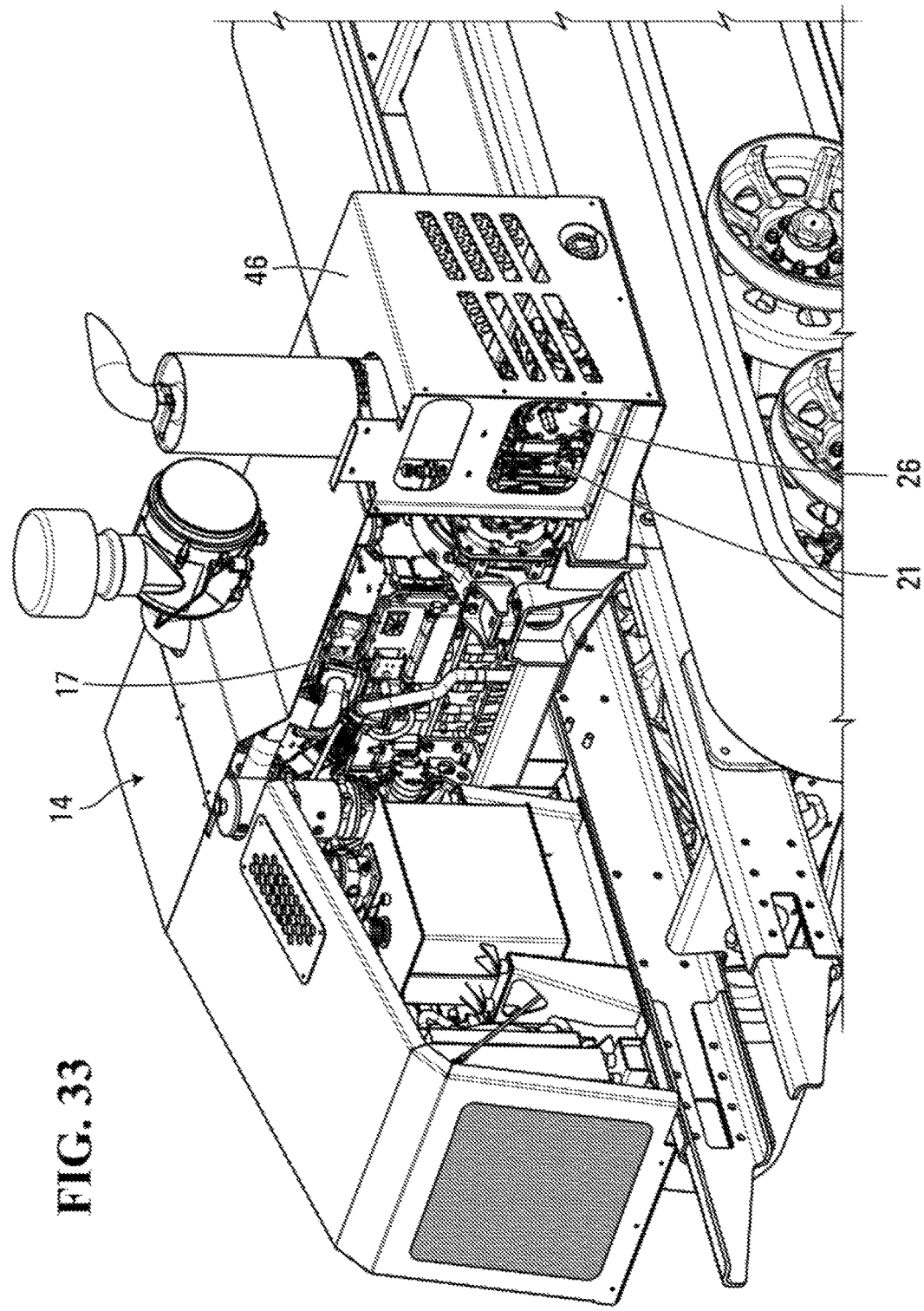
FIGS. 33 and 34 show front and rear perspective views of a power plant of the tracked vehicle with panels of a housing of the power plant removed.
Figure 34:
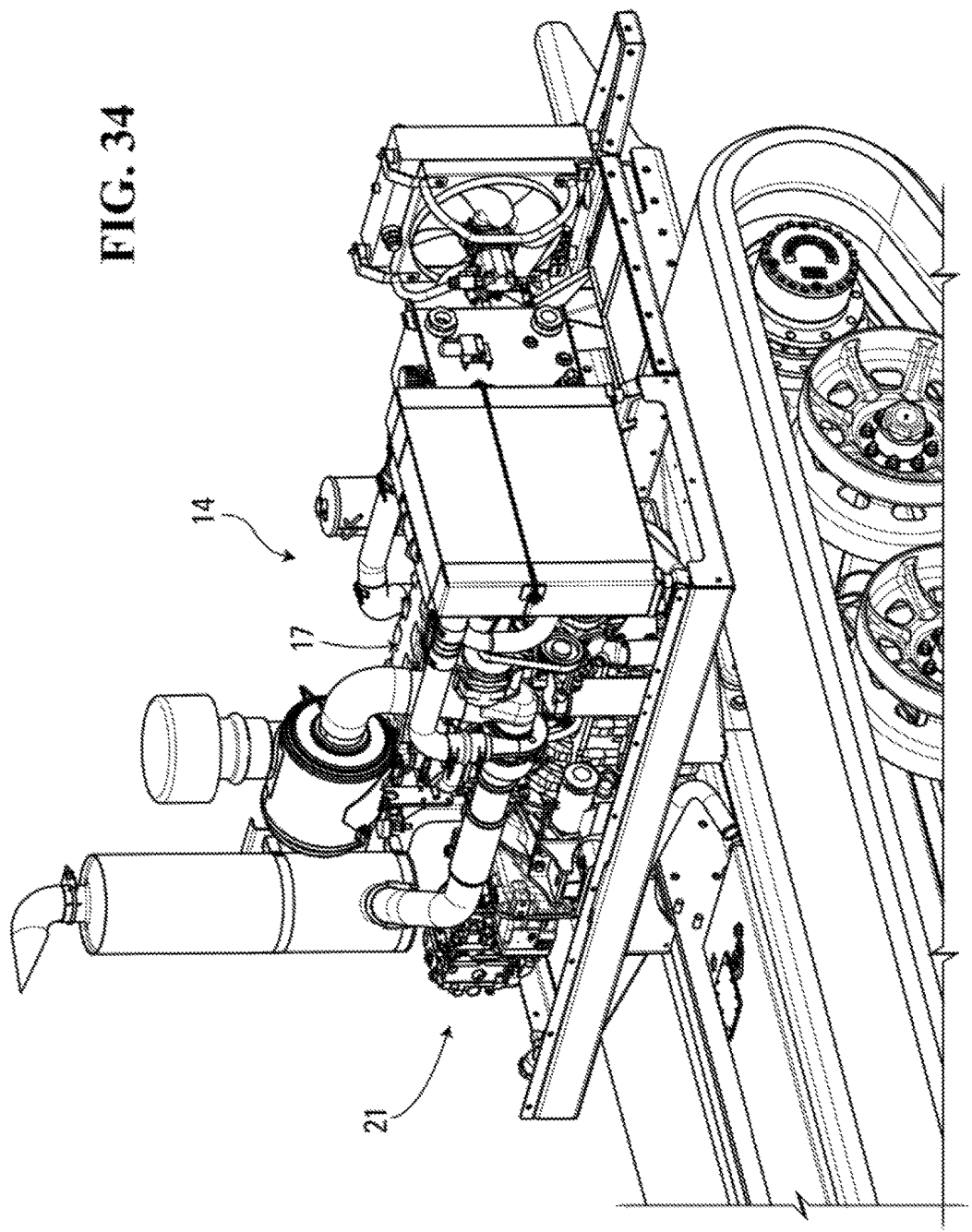

The power plant 14 is in a driving relationship with each of the track assemblies $16_1$, $16_2$. That is, power derived from the power plant 14 is transmitted to each of the track assemblies $16_1$, $16_2$ in order to drive the track assemblies $16_1$, $16_2$. In this embodiment, with additional reference to FIG. 33, power from the power plant 14 is transmitted to the track assemblies $16_1$, $16_2$ via a hydraulic drive system 21. For instance, in this example, the hydraulic drive system 21 comprises, for each of the track assemblies $16_1$, $16_2$, a hydraulic pump 26 driven by the prime mover 17 and connected to a hydraulic motor (not shown) which drives that track assembly. Power from the power plant 14 may be transmitted to the track assemblies $16_1$, $16_2$ in various other ways in other embodiments.

In this embodiment, the power plant 14 includes a housing 46 which houses the prime mover 17 and other components of the power plant 14. More particularly, in this embodiment, the housing 46 houses: hydraulic components including each hydraulic pump 26 of the hydraulic drive system 21 and a hydraulic fluid reservoir; a cooling system for cooling the prime mover 17 and hydraulic fluid of the hydraulic drive system 21; batteries; components of an exhaust system; pipes; and cables. Other components of the power plant 14 may be housed in the housing 46 in other embodiments.

The housing 46 and the components of the power plant 14 that it houses are mounted on top of the chassis 12. More particularly, in this embodiment, the housing 46 comprises a back housing portion $47_1$ which houses a first portion of the power plant 14 and is located above the chassis 12 behind the operator cabin 20 and a side housing portion $47_2$ which houses a second portion of the power plant 14 and is located above the chassis 12 on a right side of the operator cabin 20. Thus, in this embodiment, the housing 46 has a generally L-shaped configuration that extends behind and next to the operator cabin 20, with the back housing portion $47_1$ being elongated in the widthwise direction of the vehicle 10 and the side housing portion $47_2$ being elongated in the longitudinal direction of the vehicle 10.

Mounting of the housing 46 and the components of the power plant 14 that it houses above the chassis 12 may facilitate installation and servicing of the power plant 14. For example, maintenance or other servicing activities may be performed by accessing components of the power plant 14 without being obstructed by the work equipment 41.

Also, components of the power plant 14, including the prime mover 17, the hydraulic pumps of the hydraulic drive system 21, and the housing 46, may secured to one another to constitute a "power plant module" that can be installed on and removable from the chassis 12 together as a unit. This may allow the tracked utility vehicle 10 to be easily equipped with a particular one of a plurality of different power plant modules during manufacturing of the vehicle 10 depending on an application or environment in which the vehicle 10 will be used. For example, in some embodiments, the plurality of different power plant modules may comprise different types of prime movers. For instance, in some cases, the different types of prime movers may be different types of internal combustion engines, such as different types of engines that conform to requirements of different engine tiers (e.g., an engine conforming to requirements of a T3 engine tier and an engine conforming to requirements of a T4 engine tier). In such examples of implementation, a controller controlling the prime mover 17 (e.g., an engine control unit (ECU) may comprise software that can control the different types of engines and receives an input indicating a particular type of engine to which the prime mover 17 corresponds to control it accordingly.

Furthermore, mounting of the housing 46 and the components of the power plant 14 that it houses above the chassis 12 may allow the height $H_v$ of the tracked utility vehicle 10 to be kept small. This may be beneficial in various cases.

For example, in this embodiment, the operator cabin 20 can seat two individuals (i.e., can comprise two seats) as further discussed later on, and the tracked utility vehicle 10 carrying the work equipment 41 can travel on a public road infrastructure. The vehicle 10 may travel on the public road infrastructure by self-propulsion or by being transported on another vehicle (e.g., on a flatbed truck). The vehicle 10 may therefore respect a vehicle height limit (i.e., a maximum vehicle height allowable) for travel on the public road infrastructure. The vehicle height limit is normally set by a government responsible for the public road infrastructure. For example, in some cases, the vehicle height limit for travel on the public road infrastructure may be between 13.5 feet (4.1 m) and 14 feet (4.3 m). The vehicle height limit for travel on the public road infrastructure may have any other suitable value in other cases. An overall height $H_{v\text{-}o}$ of the vehicle 10, measured with the work equipment 41 in a retracted nonworking state, may thus be designed taking into account the vehicle height limit and a height of a trailer on which the vehicle 10 may be transported on the public road infrastructure. For example, if a trailer having a height of 24 inches is expected to be used for transporting the vehicle 10, the overall height $H_{v\text{-}o}$ of the vehicle 10 may be no more than 11.5 feet (3.5 m) if the vehicle height limit is 13.5 feet or no more than 12 feet (3.7 m) if the vehicle height limit is 14 feet. As another example, if a trailer having a height of 18 inches is expected to be used for transporting the vehicle 10, the overall height $H_{v\text{-}o}$ of the vehicle 10 may be no more than 12 feet if the vehicle height limit is 13.5 feet or no more than 12.5 feet if the vehicle height limit is 14 feet. Thus, in various examples the overall height $H_{v-o}$ of the vehicle 10 may be no more than 12.5 feet, in some cases no more than 12 feet, and in some cases no more than 11.5 feet.

More particularly, in this embodiment, when the work equipment 41 is in a retracted nonworking state (i.e., a state in which it is retracted onto the vehicle 10 and not performing any work operation, as opposed to an extended working state in which it is extended outwardly from the vehicle 10 to perform a work operation), the work equipment 41 is arranged such that it extends frontward in the longitudinal direction of the vehicle 10 beyond a rear side 114 of the operator cabin 20. In this example of implementation, the work equipment 41 extends frontward in the longitudinal direction of the vehicle 10 beyond a front side 112 of the operator cabin 20, next to a right side $116_2$ of the operator cabin 20, above the side housing portion $47_2$. The work equipment 41 also extends above a roof 118 of the operator cabin 20. Mounting part of the power plant 14, including the prime mover 17, on top of the chassis 12 and behind the operator cabin 20 (e.g., as opposed to within an internal space or "tub" defined by the chassis 12) allows the operator cabin 20, which can comprise two seats, to be low enough for installing the work equipment 41 in this manner. For example, in some embodiments, the height $H_v$ of the vehicle 10 to the roof 118 of the operator cabin 20 may be no more than 2.8 m, in some cases no more than 2.7 m, and in some cases no more than 2.6 m. For instance, in this embodiment, the height $H_v$ of the vehicle 10 may be about 2.5 m.

As another example, the tracked utility vehicle 10, without the work equipment 41 installed thereon, may fit in a closed shipping container for transport (e.g., overseas). For instance, in some examples, a maximum height for a shipping container may be no more than 3 m, in some cases no more than 2.8 m, and in some cases no more than 2.6 m, and the vehicle 10 may fit in that shipping container.

As yet another example, keeping the height $H_v$ of the tracked utility vehicle 10 small may permit a vertical distance between a top of the operator cabin 20 and the chassis 12 to be identical or similar to a corresponding distance in trucks to allow work equipment such as the work equipment 41 possibly designed primarily for mounting on trucks to be easily mountable on the vehicle 10.

In addition to generating motive power to propel the tracked utility vehicle 10, in some embodiments, the power plant 14 may power the work equipment 41 carried by the vehicle 10. For instance, in some cases, the prime mover 17 may be used to supply power to the work equipment 41. In other cases, the power plant 14 may comprise another prime mover for to supply power to the work equipment 41.

b) Track Assemblies

The track assemblies $16_1$, $16_2$ are used to propel the tracked utility vehicle 10 on the ground. The track assembly $16_1$ is on a first lateral side of the vehicle 10, while the track assembly $16_2$ is on a second lateral side of the vehicle 10. Each of the track assemblies $16_1$, $16_2$ supports a portion of a weight of the vehicle 10 in use. In this example, the track assemblies $16_1$, $16_2$ are similarly configured and are disposed symmetrically relative to the chassis 12 and thus the portion of the weight of the vehicle 10 supported by each of the track assemblies $16_1$, $16_2$ is about half of the weight of the vehicle 10. In other examples, the portion of the weight of the vehicle 10 supported by each of the track assemblies $16_1$, $16_2$ may be other than one-half of the weight of the vehicle 10.

With additional reference to FIGS. 14 to 18, in this embodiment, each track assembly $16_i$ comprises a plurality of wheels, which includes a drive wheel 24, an idler wheel 23, and a plurality of support wheels $28_1$-$28_4$, and an endless track 22 disposed around the wheels 24, 23, $28_1$-$28_4$. The track assembly $16_i$ has a length $L_{ta}$, a width $W_{ta}$, and a height $H_{ta}$. A longitudinal direction of the track assembly $16_i$ is generally parallel to the longitudinal direction of the tracked utility vehicle 10. The track assembly $16_i$ also has transversal directions, including a widthwise direction which is generally parallel to the widthwise direction of the tracked vehicle 10, and a height direction which is generally parallel to the height direction of the vehicle 10.

The endless track 22 engages the ground to provide traction. The endless track 22 is disposed around the wheels 24, 23, $28_1$-$28_4$ and includes a top run 40 and a bottom run 42. The top run 40 and the bottom run 42 of the endless track 22 are generally parallel to one another and extend along the longitudinal direction of the tracked utility vehicle 10. The top run 40 of the endless track 22 is generally horizontal and has a length that is generally defined by the distance between the drive wheel 24 and the idler wheel 23. The bottom run 42 of the endless track 22 is that portion of the endless track 22 which is beneath the support wheels $28_1$-$28_4$ and which engages the ground. The bottom run 42 of the endless track 22 has a length that is generally defined by the distance between a frontmost one of the support wheel $28_1$-$28_4$, in this case, the support wheel $28_1$, and a rearmost one of the support wheel $28_1$-$28_4$, in this case, the support wheel $28_4$.

The drive wheel 24 is in a driven relationship with the power plant 14 to impart movement of the endless track 22 in order to propel the vehicle 10 on the ground. The drive wheel 24 is rotatable about an axis of rotation which is transverse to the longitudinal direction of the vehicle 10 by power derived from the power plant 14 to impart movement of the endless track 22. In this embodiment, the drive wheel 24, which is located in a front region of the chassis 12, comprises a sprocket that engages the endless track 22. The drive wheel 24 may be configured in various other ways in other embodiments.

The idler wheel 23 does not convert power derived from the power plant 14 to motive force for movement of the endless track 22, but rather guides the endless track 22 and maintains it under tension as it is driven by the drive wheel 24. The idler wheel 23 is rotatable about an axis of rotation which is transverse to the longitudinal direction of the tracked utility vehicle 10. In this embodiment, the idler wheel 23, which is located in a rear region of the chassis 12, may comprise a sprocket or any other type of wheel that engages the endless track 22.

The support wheels $28_1$-$28_4$ are arranged in an in-line configuration extending along the longitudinal direction of tracked utility vehicle 10 and roll on the bottom run 42 of the endless track 22 as the vehicle 10 moves on the ground. The support wheels $28_1$-$28_4$ do not convert power derived from the power plant 14 to motive force for movement of the endless track 22, but rather support and distribute onto the ground via the endless track 22 the portion of the weight of the vehicle 10 that is supported by the track assembly $16_i$. The support wheels $28_1$-$28_4$ may also maintain the shape and position of the endless track 22, as well as keep the track 22 generally aligned with the general direction of vehicular movement.

Each of the support wheels $28_1$-$28_4$ occupies most of the height $H_{ta}$ of the track assembly $16_i$. That is, each of the support wheels $28_1$-$28_4$ has a diameter $D_{sw}$ corresponding to at least half, in some cases at least two-thirds, and in some cases at least three-quarters of the height $H_{ta}$ of the track assembly $16_i$. In this case, the diameter $D_{sw}$ of each of the support wheels $28_1$-$28_4$ corresponds to about 65% of the height $H_{ta}$ of the track assembly $16_i$. In some embodiments, the diameter $D_{sw}$ of each of the support wheels $28_1$-$28_4$ may be such that the top run 40 of the endless track 22 can contact the support wheels $28_1$-$28_4$ in use. In other embodiments, the support wheels $28_1$-$28_4$ may be made smaller such that there is no contact between the top run 40 of the endless track 22 and the support wheels $28_1$-$28_4$ in use.

The support wheel $28_1$-$28_4$ are carried by a plurality of wheel-carrying assemblies $50_1$, $50_2$ of the track assembly $16_i$. Each of the wheel-carrying assemblies $50_1$, $50_2$ carries at least two of the support wheels $28_1$-$28_4$ and, since it is an assembly carrying wheels, will be referred to as a "bogie". More particularly, in this embodiment, the bogie $50_1$ carries the support wheels $28_1$, $28_2$ and the bogie $50_2$ carries the support wheels $28_3$, $28_4$.

The bogie $50_1$ comprises a link 70 interconnecting the support wheels $28_1$, $28_2$ and pivotable relative to the chassis 12 about a pivot 71 which defines a pivot axis. The link 70 is a connecting structure that may have any suitable form (e.g., a single member or a plurality of members connected to one another by one or more fasteners, welding, etc.). The support wheels $28_1$, $28_2$ are rotatably mounted to the link 70 via respective axles which define respective axes of rotation of the support wheels $28_1$, $28_2$. In this embodiment, the pivot axis of the link 70 lies closer to the axis of rotation of the support wheel $28_1$ than that of the support wheel $28_2$ and above the axes of rotation of the support wheels $28_1$, $28_2$. The pivot axis of the link 70 and the axes of rotation of the support wheels $28_1$, $28_2$ may be positioned differently in relation to one another in other embodiments (e.g., the pivot axis of the link 70 may lie equidistant between the axes of rotation of the support wheels $28_1$, $28_2$). The bogie $50_2$ is configured similarly to the bogie $50_1$ and will thus not be further discussed.

Figure 35:
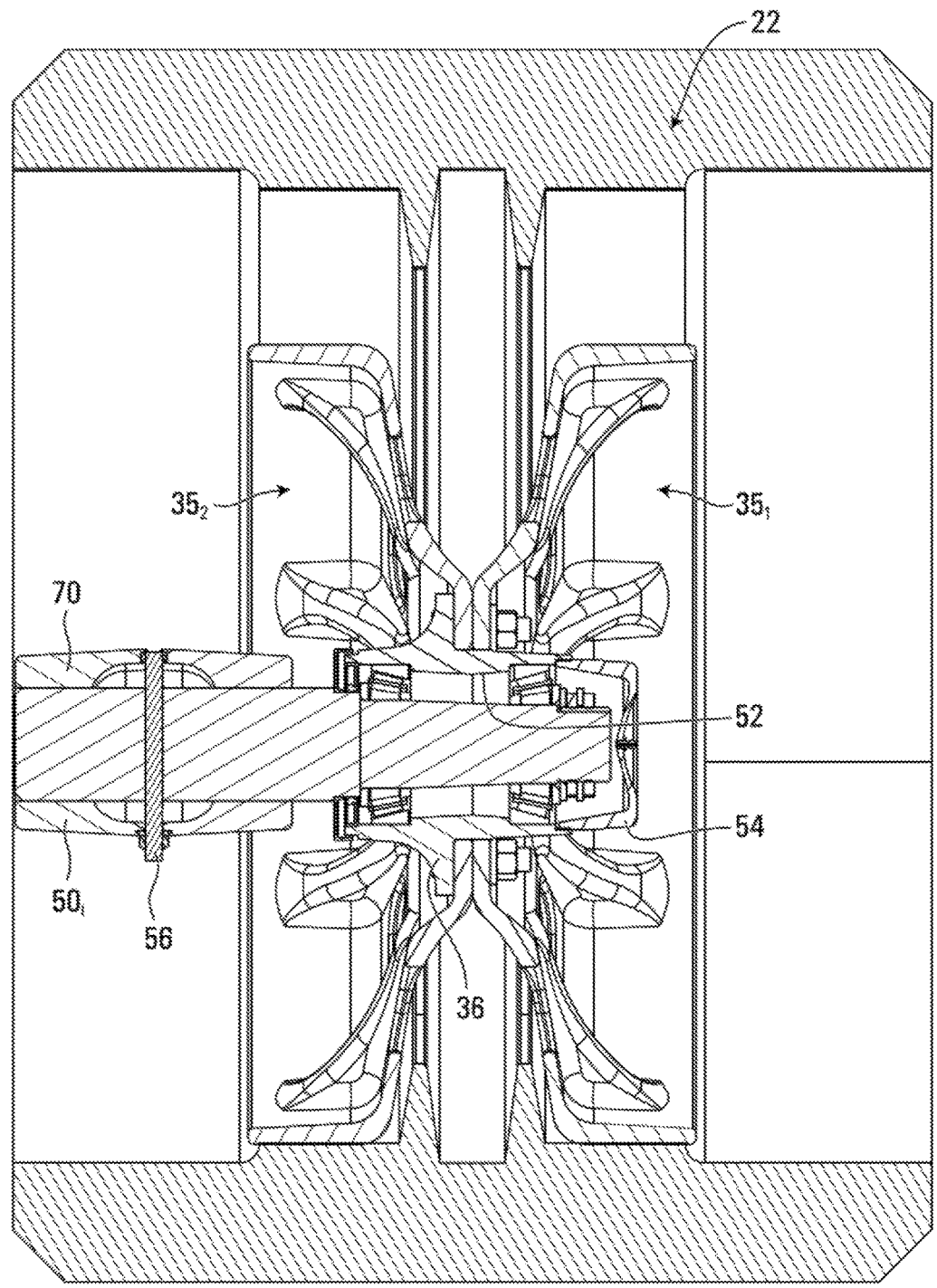
FIGS. 35 and 36 show cross-sectional views of a support wheel of a track assembly with and without the endless track.
Figure 36:
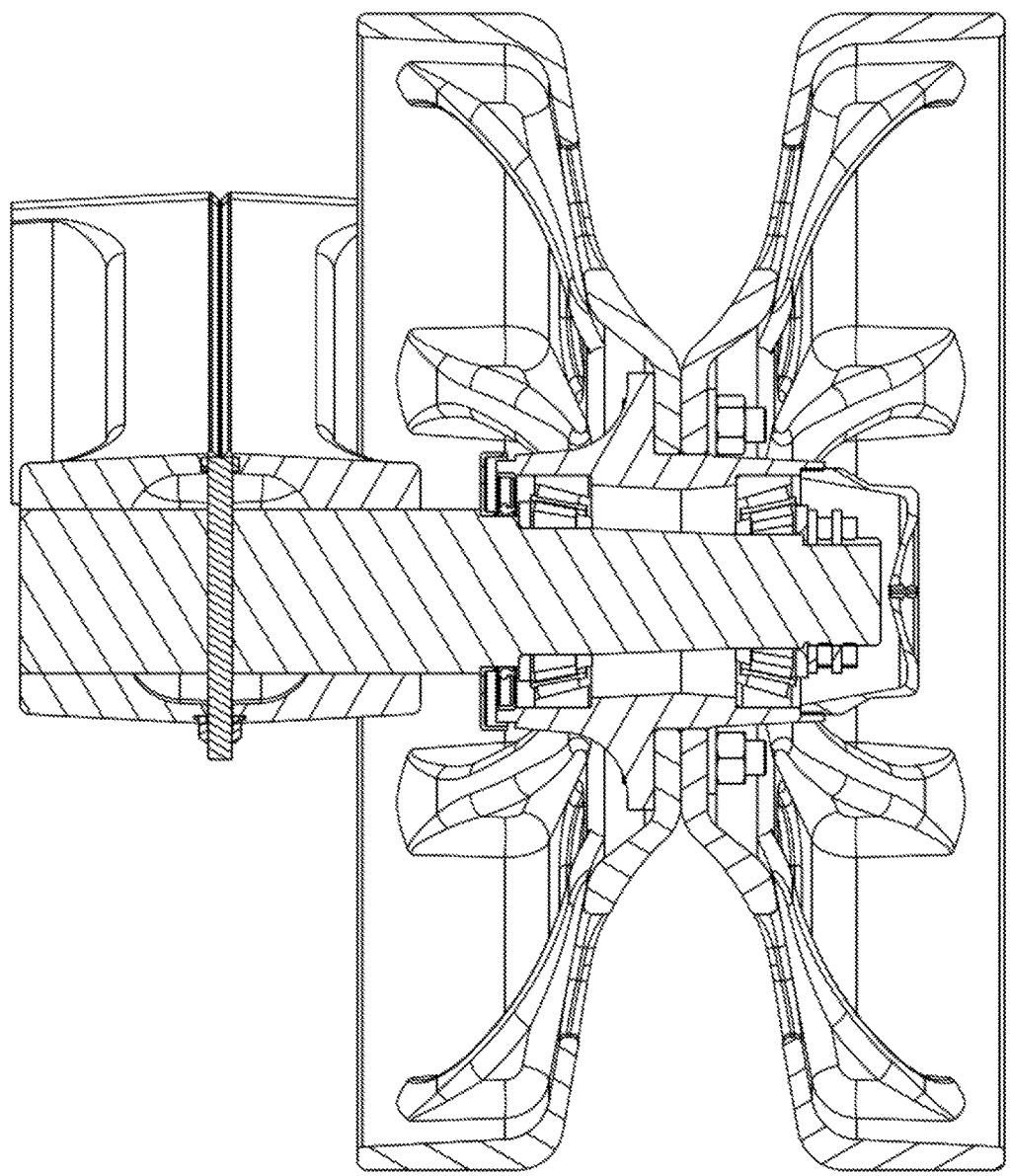

In this embodiment, each support wheel $28_i$ facilitates installation of the endless track 22. More particularly, in this embodiment, with additional reference to FIGS. 35 and 36, the support wheel 28 comprises a first support wheel member $35_1$ and a second support wheel member $35_2$ which each have a circumference of the support wheel $28_i$, are rotatable about the axle of support wheel $28_i$, and are installable in and removable from the track assembly $16_i$ separately from one another. The support wheel member $35_1$, which is farthest from a centerline of the vehicle 1, can be viewed as an "outboard" support wheel member while the support wheel member $35_2$, which is nearest to the centerline of the vehicle 10, can be viewed as an "inboard" support wheel member. The endless track 22 can be installed while the inboard support wheel member $35_2$ is in place but before placement of the outboard support wheel member $31_1$, which is put in place after installation of the endless track 22. This makes it easier to install or replace the endless track 22.

More particularly, in this embodiment, the outboard and inboard support wheel members $35_1$, $35_2$ are secured to a hub 36 by fasteners $48_1$-$48_F$ (e.g., bolts and nuts). The hub 36 includes an opening 52 that receives the axle of the support wheel $28_i$. In this embodiment, bearings (e.g., tapered bearings) are positioned in the opening 52 of the hub 36 and receive the axle of the support wheel $28_i$. A cap 54 covers an end of the axle of the support wheel $28_i$. The axle of the support wheel $28_i$ extends and is fixed to the link 70 of the bogie $50_i$. In this case, a fastener 56 (e.g., a bolt) extends transversally to the axle of the support wheel $28_i$ and through the link 70 to fix the axle to the link 70. The outboard and inboard support wheel members $35_1$, $35_2$ may be mounted in any other suitable way in other embodiments.

As further discussed later, in this embodiment, the outboard and inboard support wheel members $35_1$, $35_2$ define in between them a guiding space 38 for receiving a wheel guide of the endless track 22 to guide the endless track 22 as it moves around the wheels 24, 23, $28_1$-$28_4$.

In this embodiment, each support wheel member $35_i$ comprises a rim portion 57, a hub portion 58, and a radially-extending portion 61 therebetween. The rim portion 57 is in rolling contact with the bottom run 42 of the endless track 22. The hub portion 58 is a central portion of the support wheel member $35_i$ which receives the axle of the support wheel $28_i$. In this example, the hub portion 58 engages the hub 36 and is secured thereto by the fasteners $48_1$-$48_F$. The radially-extending portion 61 extends from the rim portion 57 to the hub portion 58. In this example, the radially-extending portion 61 comprises a plurality of spokes $63_1$-$63_8$ and a plurality of interspoke openings $67_1$-$67_8$ between adjacent ones of the spokes $63_1$-$63_8$.

More particularly, in this embodiment, the rim portion 57, the hub portion 58, and the radially-extending portion 61 are configured such that the support wheel member $35_i$ is a concave support wheel member defining a concavity 69. Each of the spokes $63_1$-$63_8$ tapers radially towards the hub portion 58. The support wheel member $35_i$ may have any other suitable shape in other embodiments.

In this example of implementation, the support wheel member $35_i$ is a metallic support wheel member (e.g., a steel support wheel member) that has been cast into shape. The support wheel member $35_i$ may be made of any other suitable material and/or using any other suitable manufacturing process in other examples of implementation.

Figure 39:
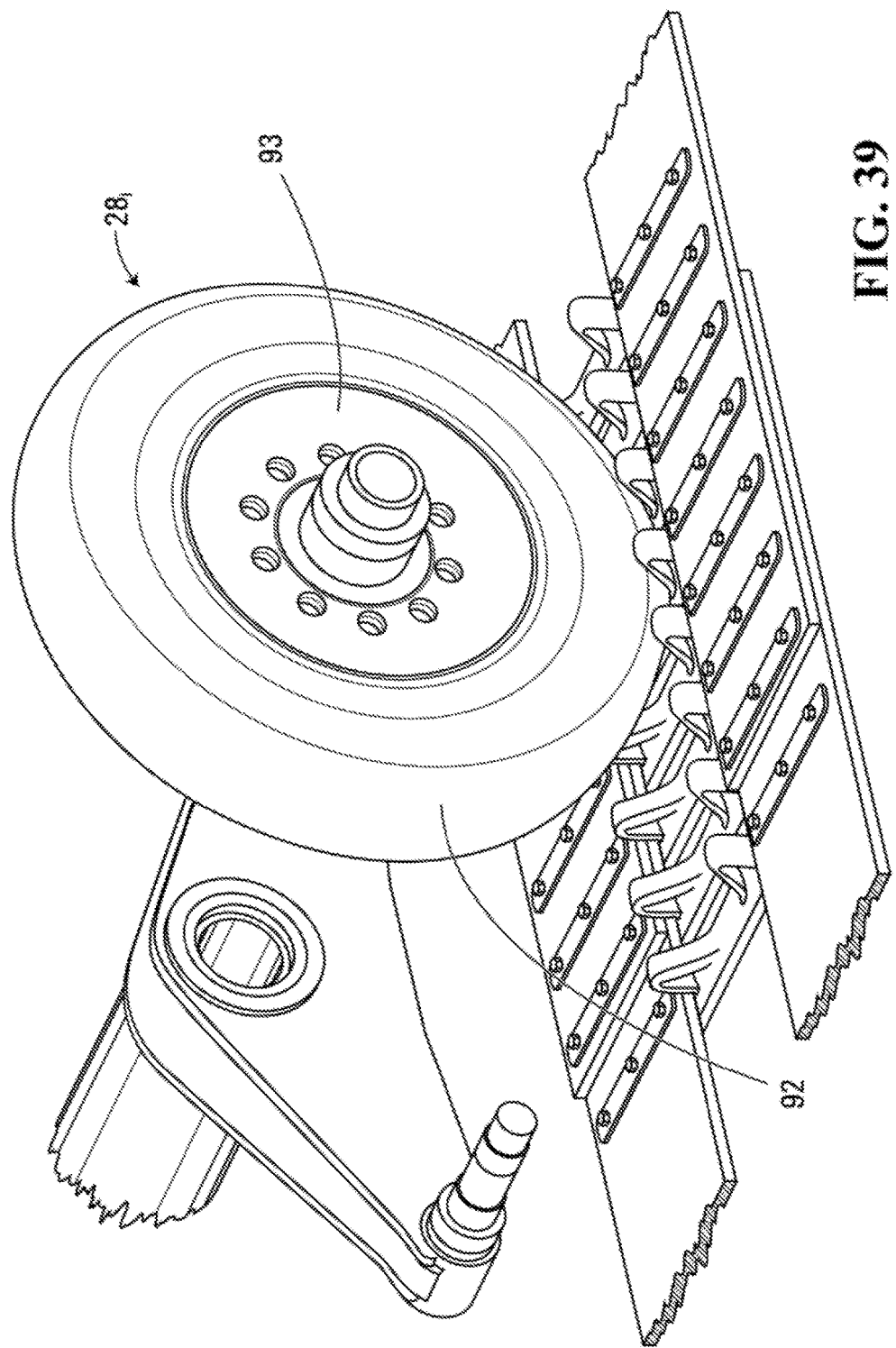
FIGS. 39 and 40 show a perspective view and a cross-sectional view of a support wheel of a track assembly in accordance with another embodiment of the invention.
Figure 40:
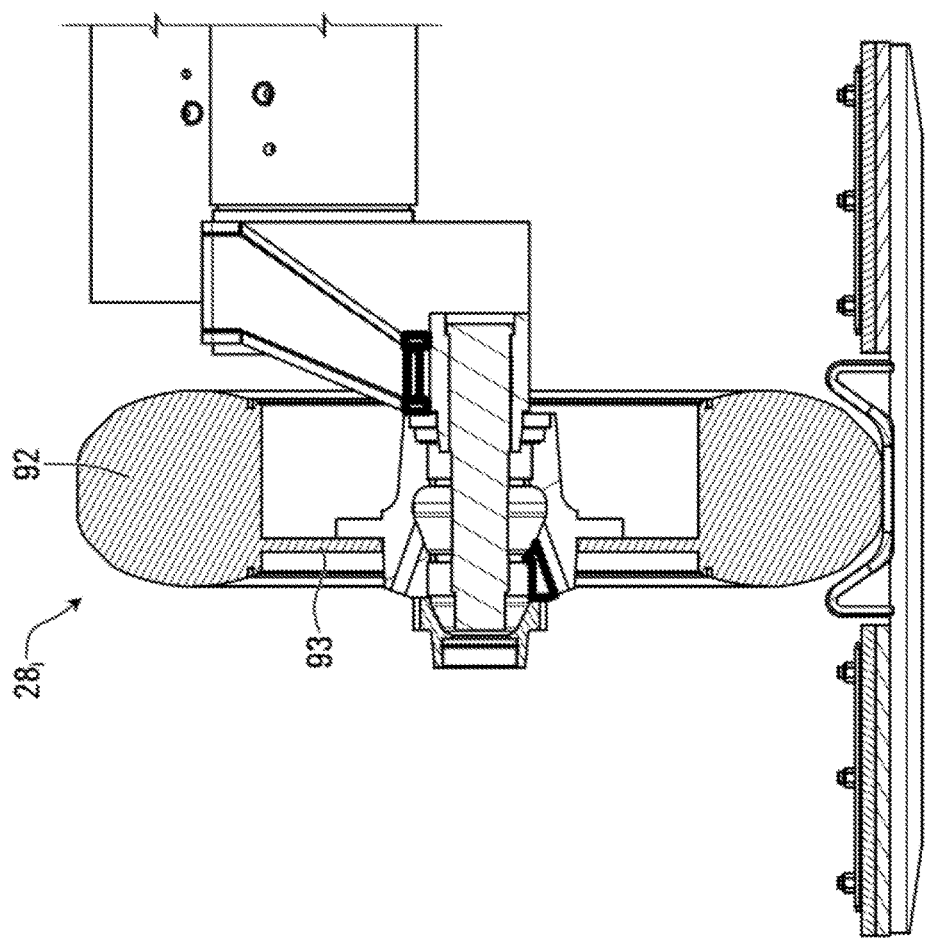

The support wheels $28_1$-$28_4$ may be configured in various other ways in other embodiments. For example, in other embodiments, a support wheel member $35_i$ of a support wheel $28_i$ may comprise a rubber or other elastomeric covering on its rim portion 57 to be in rolling contact with the bottom run 42 of the endless track 22. As another example, in other embodiments, a support wheel $28_i$ may be a unitary support wheel which does not comprise separate outboard and inboard support wheel members as discussed above. For instance, in some embodiments, as shown in FIGS. 39 and 40, a support wheel $28_i$ may be a unitary support wheel which comprises a metallic wheel body 93 on which is mounted a tire 91 that is in rolling contact with the bottom run 42 of the endless track 22.

In this embodiment, as shown in FIGS. 3, 9, 15 and 20, the idler wheel 23 overlaps the rearmost support wheel $28_4$ in the longitudinal direction of the tracked utility vehicle 10. This may be beneficial for stability of the vehicle 10 when the work equipment 41 applies a significant load in a rear end region of the chassis 12 (e.g., when a drill, dump bucket or other piece of equipment is raised in the rear end region of the chassis 12). The longitudinal overlap between the idler wheel 23 and the support wheel $28_4$ allows the longitudinal distance between the pivot axis defined by the pivot 71 of the bogie $50_2$ and the rear end region of the chassis 12 to be less than if there was no longitudinal overlap between the idler wheel 23 and the support wheel $28_4$. This smaller longitudinal distance results in a smaller moment arm and, consequently, a smaller moment associated with the load applied by the work equipment 41 in the rear end region of the chassis 12.

More particularly, in this embodiment, the idler wheel 23 longitudinally overlaps the support wheel $28_4$ by being located in the guiding space 38 between the inboard and outboard wheel members $35_1$, $35_2$ of the support wheel $28_4$. The longitudinal overlap between the idler wheel 23 and the support wheel $28_4$ may be achieved in various ways in other embodiments. For example, in embodiments in which the support wheel $28_4$ is a unitary support wheel which does not comprise separate outboard and inboard support wheel members (e.g., as shown in FIGS. 39 and 40), the idler wheel 23 may comprise an inboard idler wheel member and an outboard idler wheel member that define a space therebetween in which the support wheel $28_4$ may be located such that the idler wheel 23 and the support wheel $28_4$ longitudinally overlap.

The endless track 22 engages the ground to provide traction to the tracked utility vehicle 10. More particularly, as the drive wheel 24 is rotated by power derived from the power plant 14, the drive wheel 24 imparts motion to the endless track 22 for traction of the vehicle 10 on the ground. The endless track 22 has an inner side 32 facing the wheels 24, 23, $28_1$-$28_4$ and a ground-engaging outer side 33, opposite the inner side 32, for engaging the ground.

Figure 29:
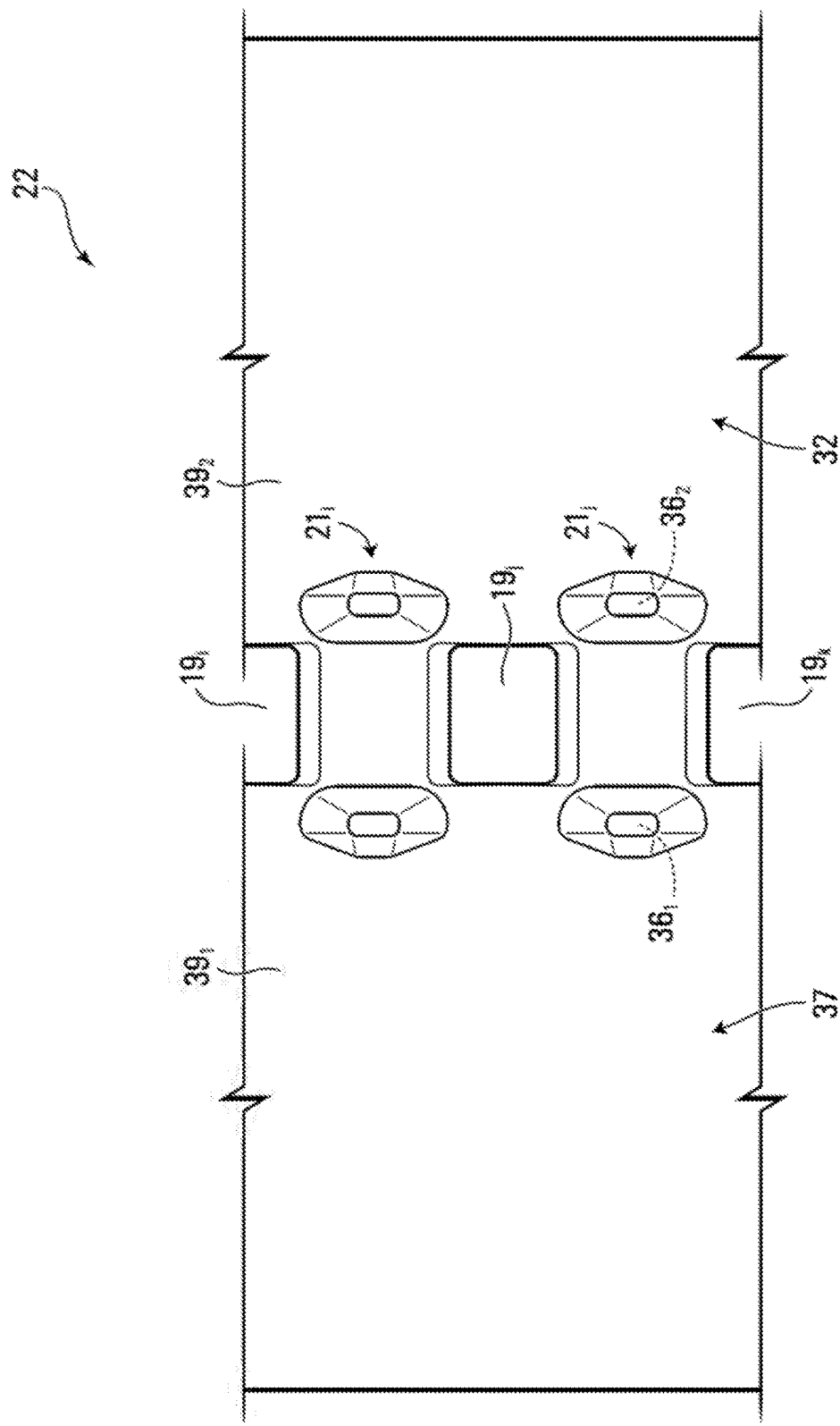
FIGS. 29 and 30 show a top view of an inner side, and a cross-sectional view, of an endless track in accordance with an embodiment of the invention.
Figure 30:
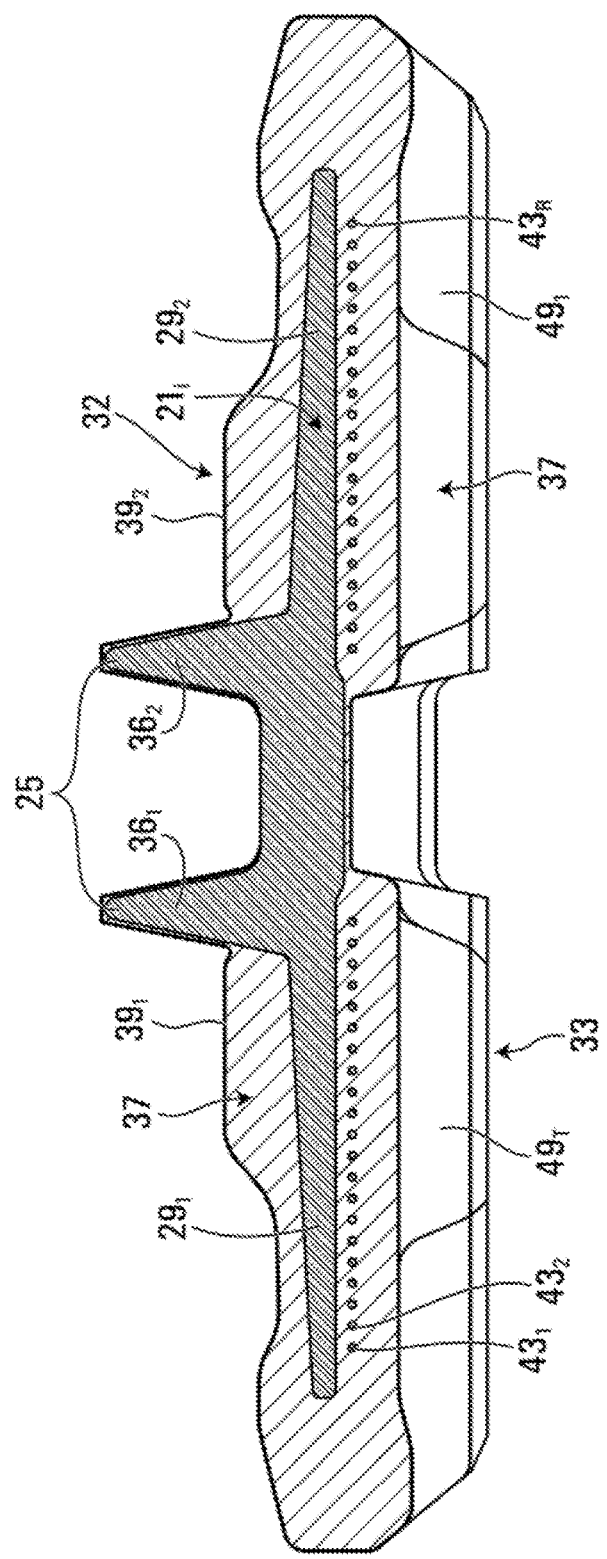

In this embodiment, as shown in FIGS. 29 and 30, the endless track 22 comprises an elastomeric body 37 underlying its inner side 32 and its ground-engaging outer side 33. The body 37 is elastomeric in that it comprises elastomeric material which allows the track 22 to elastically change in shape as it is in motion around the wheels 24, 23, $28_1$-$28_4$. The elastomeric material of the body 37 can be any polymeric material with suitable elasticity. In this embodiment, the elastomeric material includes rubber. Various rubber compounds may be used and, in some cases, different rubber compounds may be present in different areas of the track 22. In other embodiments, the elastomeric material may include another elastomer in addition to or instead of rubber (e.g., polyurethane elastomer).

A plurality of cores $21_1$-$21_C$ are embedded in the elastomeric material of the body 37 of the endless track 22, spaced apart along the longitudinal direction of the track 22, and extending transversally to the longitudinal direction of the track 22 to impart transverse rigidity to the track 22. The cores $21_1$-$21_C$ are made of rigid material. For instance, in this embodiment, the cores $21_1$-$21_C$ are metallic (e.g., steel) cores. This type of track can thus sometimes be referred to as a "metal-embedded rubber track" (MERT).

The cores $21_1$-$21_C$ interact with the wheels 24, 23, $28_1$-$28_4$ to impart and/or guide motion of the endless track 22. For example, in this embodiment, the track 22 has a plurality of drive openings $19_1$-$19_O$ for receiving teeth of the drive wheel 24 such that the drive wheel 24 can engage parts of the track 22 where are located individual ones of the cores $21_1$-$21_C$ in order to apply motive force to the track 22. The cores $21_1$-$21_C$ also guide motion of the track 22 as it is driven by the drive wheel 24. More particularly, each core $21_i$ comprises a pair of wings $29_1$, $29_2$ and a wheel guide 25 between the wings $29_1$, $29_2$. The wheel guide 25 comprises at least one, in this case, two guide projections $36_1$, $36_2$ projecting on the inner side 32 of the endless track 22. In this embodiment, when its teeth enter the drive openings $19_1$-$19_O$ of the track 22, the drive wheel 24 engages the wheel guide 25 of the core $21_i$ between the guide projections $36_1$, $36_2$ to drive the track 22, while the guide projections $36_1$, $36_2$ pass in the guiding space 38 defined by each of the support wheels $28_1$-$28_4$ in order to guide the track 22 relative to the support wheels $28_1$-$28_4$.

One or more reinforcements may be embedded in the elastomeric material of the body 37 of the endless track 22. For instance, a reinforcement may be a layer of reinforcing cables $43_1$-$43_R$ that are adjacent to one another and that extend in the longitudinal direction of the track 22 to enhance strength in tension of the track 22 along its longitudinal direction. In some cases, a reinforcing cable $43_i$ may be a cord or wire rope including a plurality of strands or wires. In other cases, a reinforcing cable $43_i$ may be another type of cable and may be made of any material suitably flexible longitudinally (e.g., fibers or wires of metal, plastic or composite material). Various other types of reinforcements may be provided in other embodiments.

The ground-engaging outer side 33 of the endless track 22 comprises a tread pattern to enhance traction on the ground. The tread pattern comprises a plurality of traction projections $49_1$-$49_T$, which can be referred to as "traction lugs", spaced apart along the longitudinal direction of the track 22 and engaging the ground to enhance traction.

The inner side 32 of the endless track 22 comprises the guide projections $36_1$, $36_2$ of each of the cores $21_1$-$21_C$. In addition, the inner side 32 of the track 22 comprises rolling surfaces $39_1$, $39_2$ on which the support wheels $28_1$-$28_4$ roll to apply the track 22 onto the ground.

The endless track 22 may be configured in various other ways in other embodiments.

For example, in some embodiments, as shown in FIGS. 31 and 32, the endless track 22 may comprise a pair of belts $30_1$, $30_2$ spaced apart to accommodate the wheels 24, 23, $28_1$-$28_4$ and a series of cross-links $31_1$-$31_N$ distributed longitudinally along the track 22 and extending transversally to interconnect the belts $30_1$, $30_2$.

Each belt $30_i$ is elastomeric in that it comprises rubber and/or other elastomeric material. The belt $30_i$ may comprise one or more reinforcements such as a layer of cables embedded in its rubber and/or other elastomeric material. In this case, the belt $30_i$ is made up of a series of belt sections connected to one another. In other cases, the belt $30_i$ may be a one-piece belt.

The cross-links $31_1$-$31_N$ interconnect the belts $30_1$, $30_2$ and interact with the wheels 24, 23, $28_1$-$28_4$ as the endless track 22 moves around these wheels. For example, in this embodiment, as the drive wheel 24 rotates, individual ones of the cross-links $31_1$-$31_N$ engage recesses between the teeth of the drive wheel 24, thereby causing the track 22 to be driven. Also, the cross-links $31_1$-$31_N$ help to guide motion of the track 22 by contacting the support wheels $28_1$-$28_4$. More particularly, each cross-link $31_i$ comprises a wheel guide 44 including a pair of guide projections $45_1$, $45_2$ projecting on the inner side 32 of the endless track 22. In this embodiment, when its teeth enter gaps between the cross-links $31_1$-$31_N$, the drive wheel 24 engages the wheel guide 44 of the cross-links $28_1$-$28_4$ between the guide projections $45_1$, $45_2$ to drive the track 22, while the support wheels $28_1$-$28_4$ pass between the guide projections $45_1$, $45_2$ in order to guide the track 22 relative to the support wheels $28_1$-$28_4$. In such embodiments, each of the support wheels $28_1$-$28_4$ may be a unitary support wheel as shown in FIGS. 39 and 40.

Each cross-link $31_i$ comprises an elongated member 73 extending transversally to the longitudinal direction of the endless track 22 to interconnect the belts $30_1$, $30_2$. The elongated member 73 is made of rigid material, in this case metallic material (e.g., steel). The elongated member 73 is secured to the belts $30_1$, $30_2$ by fasteners which extend through the elongated member 73, the belts $30_1$, $30_2$, and backing plates $75_1$, $75_2$ disposed on the inner side 32 of the track 22. In this embodiment, the cross-link $31_1$ comprises a polymeric sole 77 mounted to the elongated member 73. The polymeric sole 77 can be used when the vehicle 10 is to travel on a hard surface (e.g., a paved surface) in order to minimize an impact of the cross-link $31_i$ on that surface. In other embodiments, the cross-link $31_i$ may not include any polymeric sole.

As another example, in some embodiments, the endless track 22 may comprises an endless elastomeric body underlying its inner side 32 and its ground-engaging outer side 33, similar to the elastomeric body 37 discussed above in respect of FIGS. 29 and 30, but without cores embedded in the elastomeric body (e.g., an "all-rubber" track).

In this embodiment, the track assembly $16_i$ comprises a plurality of wheel mounting structures for mounting the wheels 24, 23, $28_1$-$28_4$ to the chassis 12, including a drive wheel mounting structure $88_1$, a pair of support wheel mounting structures $88_2$, $88_3$, and an idler wheel mounting structure $88_4$, which are secured to the chassis 12 and spaced apart in the longitudinal direction of the tracked utility vehicle 10. Each of the wheel mounting structures $88_1$-$88_4$ supports at least one of the wheels 24, 23, $28_1$-$28_4$. Specifically, in this case, the drive wheel mounting structure $88_1$ supports the drive wheel 24, the support wheel mounting structures $88_2$, $88_3$ support the bogies $50_1$, $50_2$ carrying the support wheels $28_2$-$28_4$, and the idler wheel mounting structure $88_4$ supports the idler wheel 23.

The track assembly $16_i$ comprises a track tensioner 85 for maintaining tension of the endless track 22. In this embodiment, the track tensioner 85 is connected between the support wheel mounting structure $88_3$ and axle of the idler wheel 23 to urge the idler wheel 23 in a direction to maintain the tension of the endless track 22. Also, in this embodiment, the track tensioner 68 is a fluidic tensioning system, e.g., a hydraulic or pneumatic tensioning system, which comprises a piston-cylinder tensioning actuator 79 connected to a fluid reservoir. In this example of implementation, the tensioning actuator 79 is a hydraulic piston-cylinder actuator.

Figure 37:
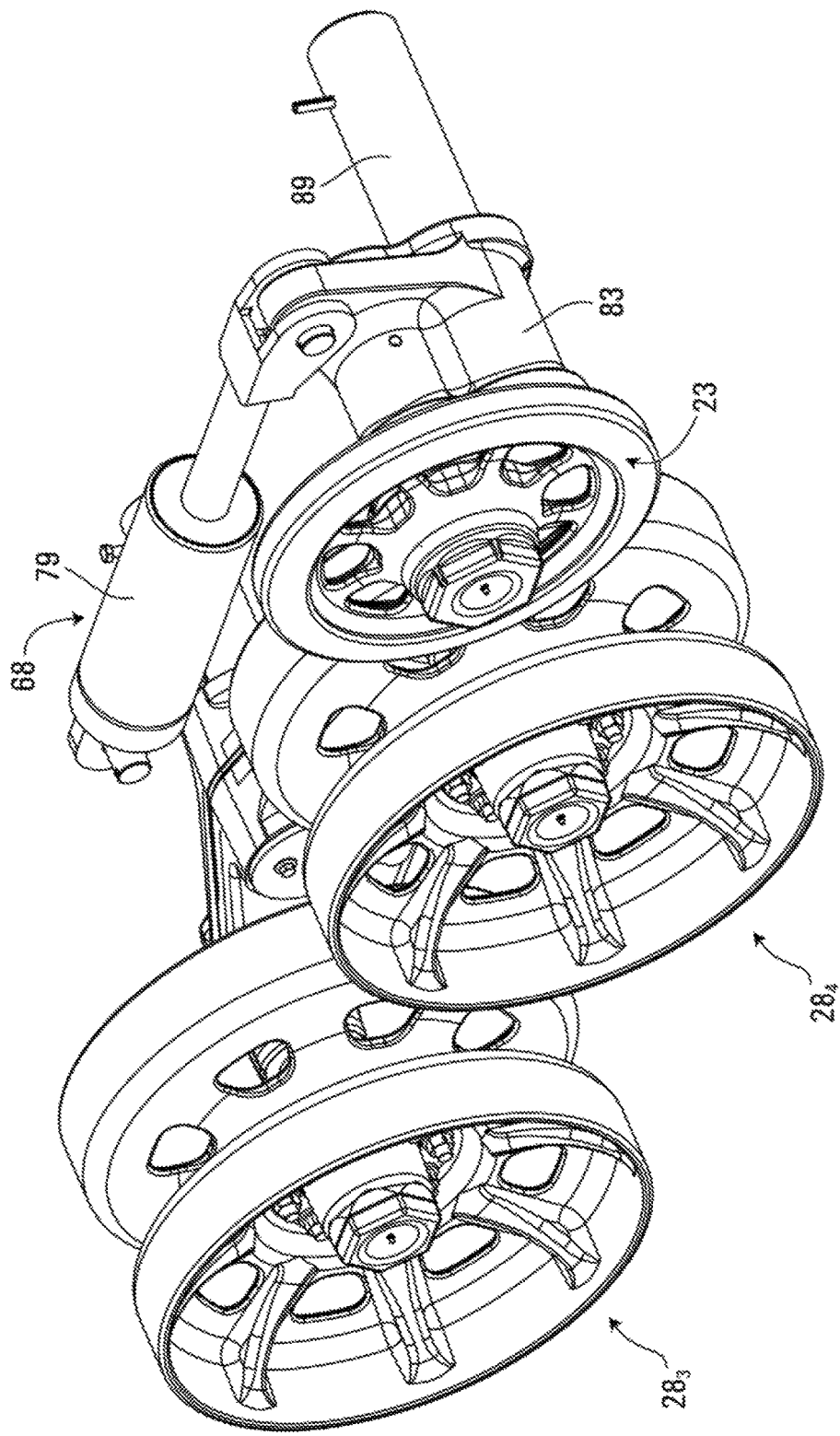
FIGS. 37 and 38 show a perspective view and a cross-sectional view of a track tensioner in relation to wheels of a track assembly.
Figure 38:
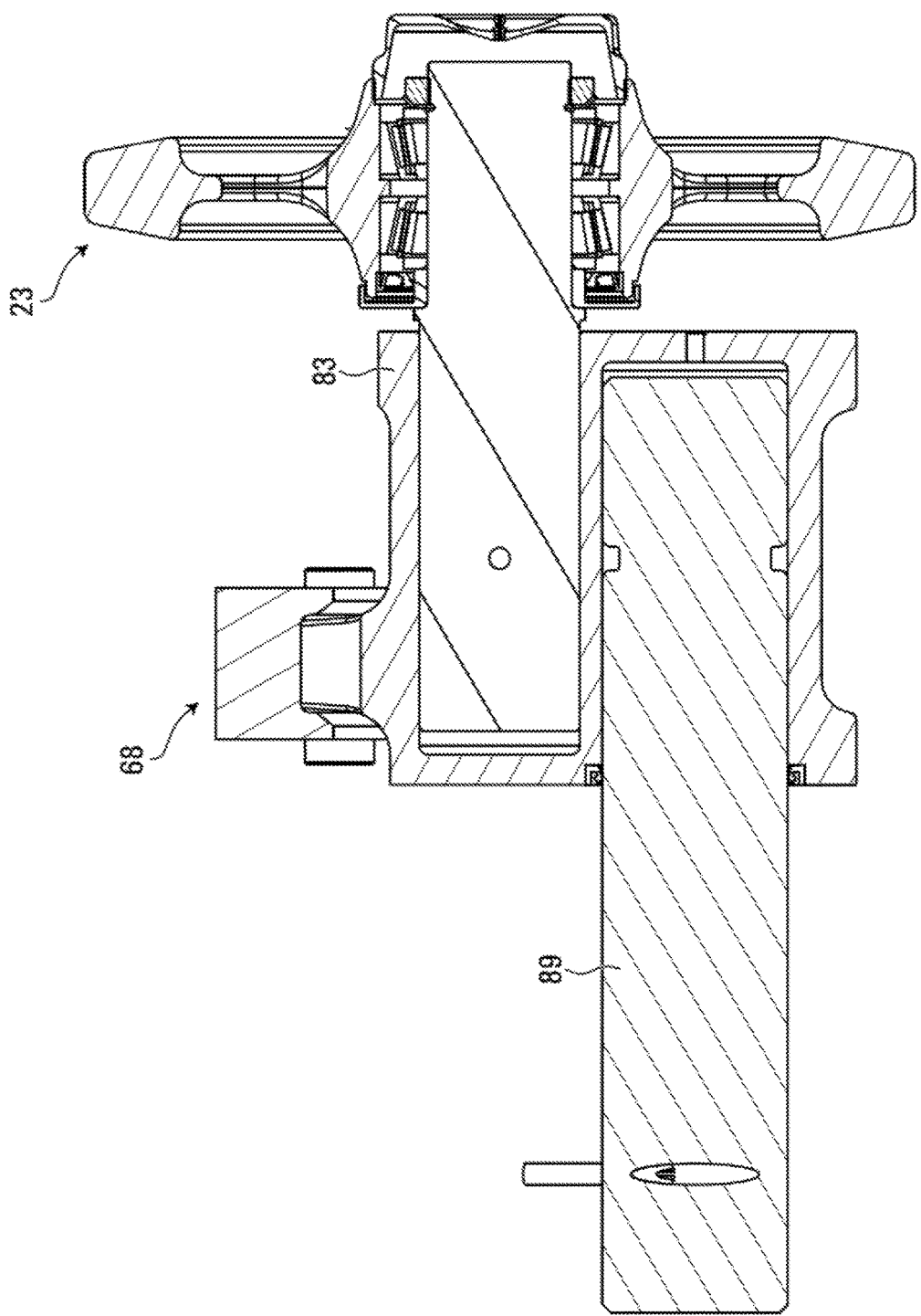

More particularly, in this embodiment, with additional reference to FIGS. 37 and 38, the tensioning actuator 79 is connected to the support wheel mounting structure $88_3$ and to an idler wheel support arm 83 which is pivotable about an axle 89 that is fixed to the idler wheel mounting structure $88_4$. The axle of the idler wheel 23 is fixed to the idler wheel support arm 83. The tensioning actuator 79 can apply the tension in the track 22 by extending or retracting to turn the idler wheel support arm 83 about the axle 89 and thus move the idler wheel 23 further or closer to the drive wheel 24.

In this embodiment, the track tensioner 85 becomes active when the tracked utility vehicle 10 is started. That is, the track tensioner 85 applies a force to generate the tension in the endless track 22 when the prime mover 17 of the vehicle 10 is started.

Figure 48:
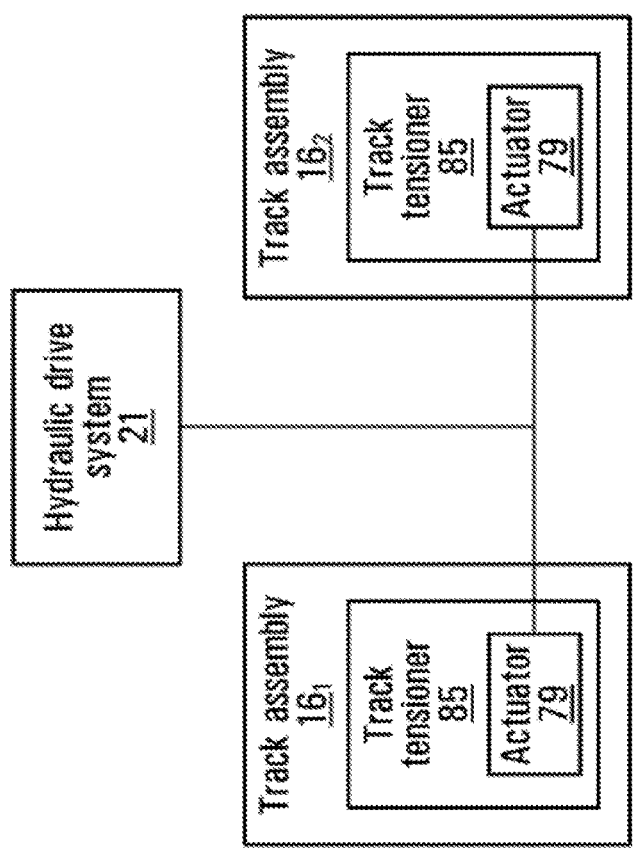
FIGS. 48 to 50 show track tensioners of the track assemblies hydraulically connected to a hydraulic drive system of the tracked vehicle.

With additional reference to FIG. 48, in this embodiment, the track tensioner 85 is hydraulically connected to the hydraulic drive system 21 of the vehicle 10 such that the tension in the endless track 22 is generated by the hydraulic fluid of the hydraulic drive system 21. The tensioning actuator 79 is in hydraulic communication with the hydraulic drive system 21 such that, when the prime mover 17 is started and starts to power the hydraulic drive system 21, the hydraulic fluid of the hydraulic drive system 21 acts on the tensioning actuator 79, which applies a force to generate the tension in the endless track 22.

Figure 49:
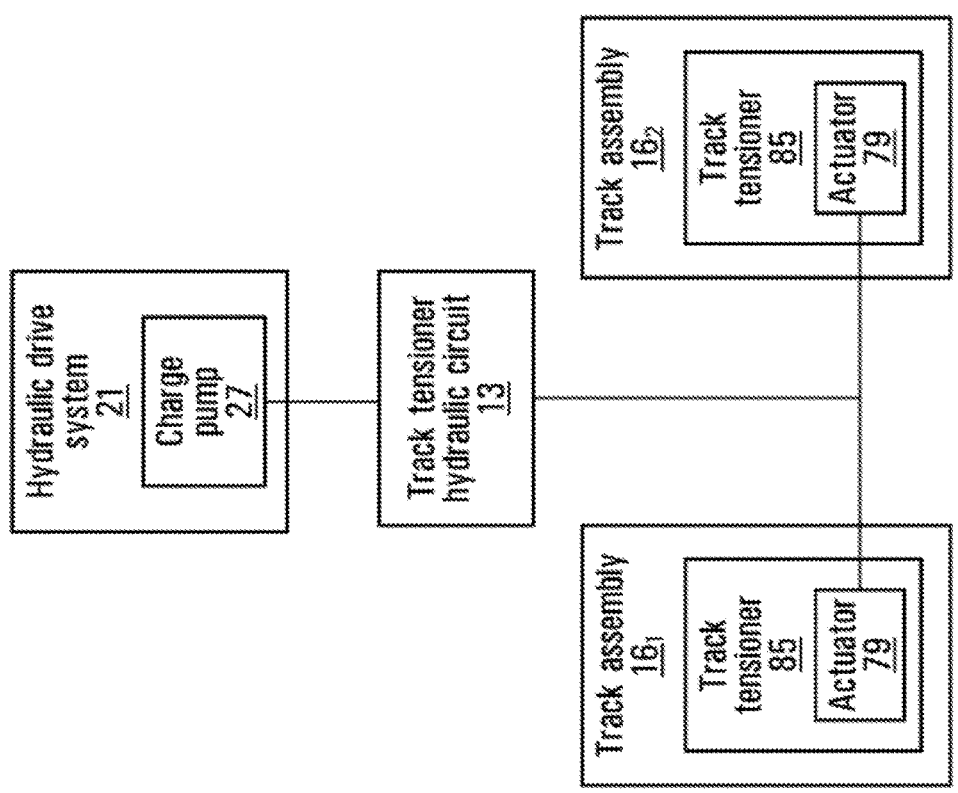

More particularly, as shown in FIG. 49, in this embodiment, the hydraulic drive system 21 comprises a charge pump 27 hydraulically connected to the tensioning actuator 79 via a track tensioner hydraulic circuit 13.

The charge pump 27 is operative to maintain a minimum pressure in the hydraulic drive system 21 when the vehicle 10 is turned on. For example, in some embodiments, the minimum pressure may be at least 300 psi, in some cases at least 325 psi, and in some cases at least 350 psi. For instance, in this embodiment, the minimum pressure is about 375 psi.

The minimum pressure in the hydraulic drive system 21 may have any other suitable value in other embodiments. In this example of implementation, the charge pump 27 is a fixed displacement pump. For instance, the charge pump 27 may be a gear pump, a gerotor pump or any other suitable type of pump.

The hydraulic fluid from the charge pump 27 causes the tensioning actuator 79 to apply a force to generate the tension in the endless track 22. This force corresponds to the pressure of the hydraulic fluid in the tensioning actuator 79 multiplied by a cross-sectional area of the piston-cylinder arrangement of the tensioning actuator 79. For example, in some embodiments, the force may be at least 5000 pounds, in some cases at least 6000 pounds, in some cases at least 7000 pounds, and in some cases even more (e.g., up to 10000 pounds). For instance, in this embodiment, the piston-cylinder arrangement of the tensioning actuator 79 may have an internal diameter of 5 inches such that its internal cross-sectional area is approximately 19.6 square inches and, at the minimum pressure of 375 psi, the force applied by the tensioning actuator 79 is about 7363 pounds. The force may have any other value in other embodiments.

Figure 50:
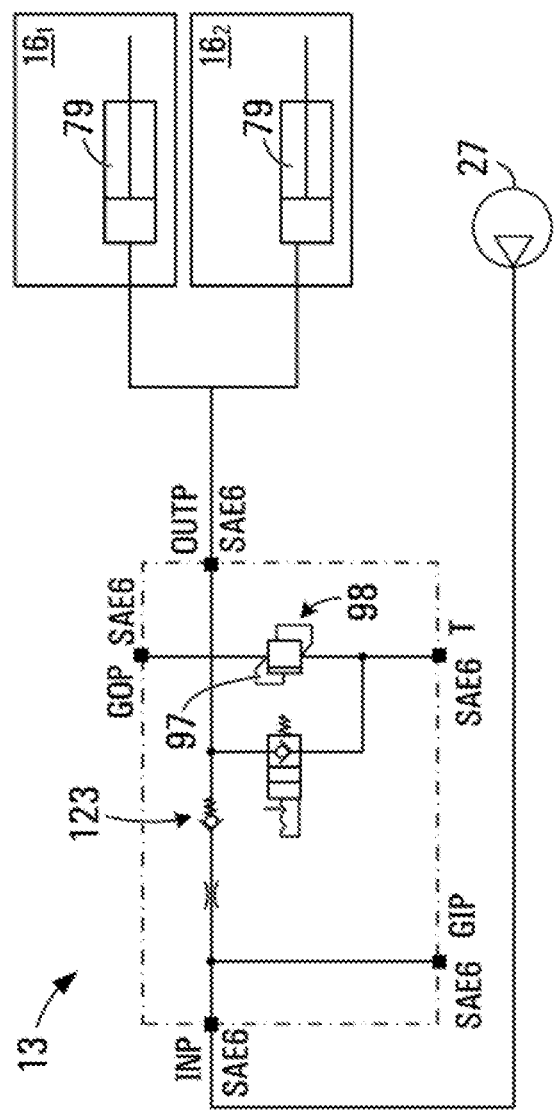

The track tensioner hydraulic circuit 13 regulates flow of hydraulic fluid between the charge pump 27 and the tensioning actuator 79. For example, in this embodiment, the track tensioner hydraulic circuit 13 limits a maximum pressure that is applicable to the tensioning actuator 79. This may be useful, for instance, to prevent situations (e.g., hard debris becoming stuck between the drive wheel 24 and the endless track 22) where the tension in the endless track 22 would become too high. More particularly, with additional reference to FIG. 50, in this embodiment, the track tensioner hydraulic circuit 13 comprises a pressure limiter 98 to limit the maximum pressure that is applicable to the tensioning actuator 79. In this example of implementation, the pressure limiter 79 comprises a valve 97 (e.g., a relief valve) which opens at a preset pressure which corresponds to the maximum pressure that is not to be exceeded in the tensioning actuator 97. For example, in some embodiments, the preset pressure at which the valve 97 opens, which corresponds to the maximum pressure allowable in the tensioning actuator 79, may be at least 1000 psi, in some cases at least 1200 psi, in some cases at least 1400 psi, and in some cases even more. For instance, in this embodiment, the preset pressure at which the valve 97 opens is 1400 psi such that the pressure in the tensioning actuator 79 can vary between 375 psi and 1400 psi. The maximum pressure may have any other suitable value in other embodiments In this embodiment, the track tensioner hydraulic circuit 13 is arranged such that, if the vehicle 10 is momentarily turned off (e.g., for a few minutes) the tension in the endless track 22 is maintained by the tensioning cylinder 79. For example, in this embodiment, the track tensioner hydraulic circuit 13 comprises a check valve 123 arranged for that purpose.

Although in this embodiment the track tensioner 85 is hydraulically connected to the hydraulic drive system 21 of the vehicle 10 via the charge pump 27 such that the tension in the endless track 22 is generated when the prime mover 17 is started and starts to power the hydraulic drive system 21, the track tensioner 85 may be connected in other ways such that it would become active when the vehicle 10 is started (e.g., there may be a dedicated pump for the track tensioner 85).

The track assembly $16_i$ may be configured in various other ways in other embodiments. For example, although in this embodiment it comprises four (4) support wheels $28_1$-$28_4$, the track assembly $16_i$ may comprise more than four support wheels (e.g., five (5) support wheels) in other embodiments. As another example, while in this embodiment the drive wheel 24 is located in a front region of the chassis 12 and the idler wheel 23 is located in a rear region of the chassis 12, this may be reversed in other embodiments such that the drive wheel 24 is located in a rear region of the chassis 12 and the idler wheel 23 of the track assembly $16_i$ is located in a front region of the chassis 12. As yet another example, while in this embodiment the idler wheel 23 is not in a driven relationship with the power plant 14, in other embodiments, the idler wheel 23 may be replaced by another drive wheel that is in a driven relationship with the power plant 14.

c) Operator Cabin

The operator cabin 20 is where an operator sits and controls the tracked utility vehicle 10. In this embodiment, the operator cabin 20 comprises a front side 112, a rear side 114, a pair of lateral sides $116_1$, $116_2$, a roof 118, and a floor 120. The lateral side $116_1$ of the operator cabin 20 defines an access opening 122 that can be closed by a door 124 and that allows the operator to enter or exit the operator cabin 20. A plurality of windows $126_1$-$126_W$ are provided to allow the operator to see outside of the vehicle 10.

Figure 41:
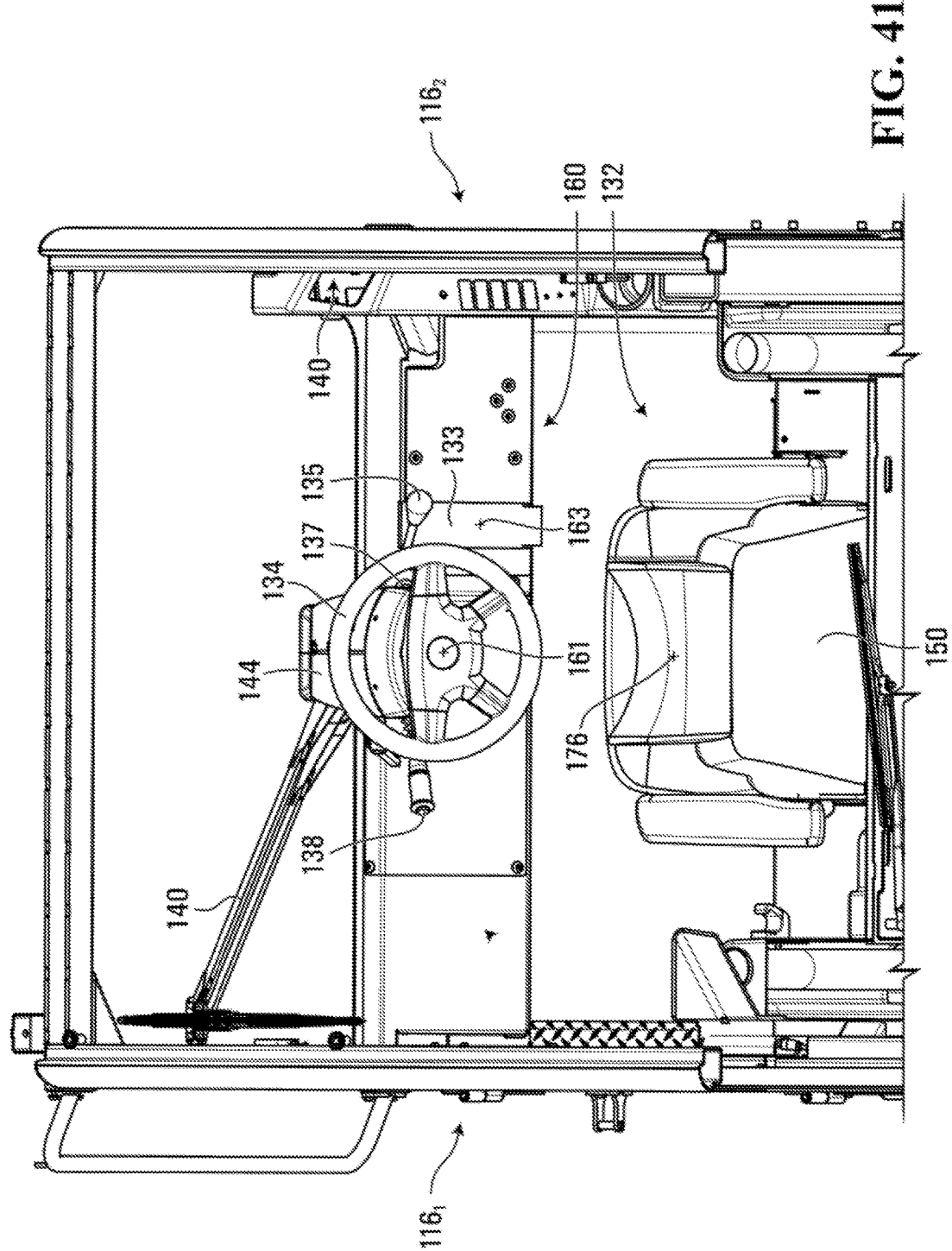
FIG. 41 shows an operator cabin of the tracked vehicle configured in a one-person configuration.

With additional reference to FIG. 41, the operator cabin 20 comprises a seating area 132 and a user interface 130. As further discussed later on, in this embodiment, the operator cabin 20 is configurable in a plurality of cabin configurations in which the seating area 132 and the user interface 130 are configured differently.

The user interface 130 enables the operator to interact with the tracked utility vehicle 10. For example, the user interface 130 comprises controls allowing the operator to move the tracked utility vehicle 10 on the ground. In some cases, the user interface 130 may also include controls for controlling the work equipment 41 carried by the vehicle 10. The user interface 130 comprises an input portion to allow the operator to input commands for execution by the vehicle 10 and an output portion to convey information to the operator.

In this embodiment, the input portion of the user interface 130 comprises an accelerator 133, a steering device 134, a transmission state selector 135, a starter switch 137, and a control lever 138. More particularly:

The accelerator 133 allows the operator to control a speed of the vehicle 10 on the ground. In this example, the accelerator 133 comprises a speed pedal operated by a foot of the operator. The accelerator 133 may be implemented in other ways in other examples (e.g., a hand-operated accelerator).

The steering device 134 allows the operator to steer the vehicle 10 on the ground. In this example, the steering device 134 comprises a steering wheel that is rotatable relative to a steering column 144 about a steering axis. In addition to the steering wheel 134, in this example of implementation, the steering column 144 supports the transmission state selector 135, the starter switch 137, and the control lever 138. The steering device 134 may be implemented in other ways in other embodiments (e.g., a joystick).

The transmission state selector 135 allows the operator to control a state of power transmission to the track assemblies $16_1$, $16_2$. For instance, in this example, the transmission state selector 135 comprises a proportional front-neutral-reverse selector to control whether power is transmitted to the track assemblies $16_1$, $16_2$ to move in a forward or reverse direction or not transmitted to the track assemblies $16_1$, $16_2$. The transmission state selector 135 may be implemented in other ways in other embodiments.

The starter switch 137 allows the operator to start the prime mover 17 of the vehicle 10. For instance, in this example, the starter switch 137 comprises a key-receiving unit to receive a key to start the prime mover 17 of the vehicle 10. The starter switch 137 may be implemented in other ways in other embodiments (e.g., a start button, a code entry device, a biometric authentication device, etc.).

The control lever 138 allows the operator to control various devices of the vehicle 10. For instance, in this example, the control lever 138 includes a wiper control which allows the operator to control a wiper 140 of the front window $126_1$ of the operator cabin 20, a washer fluid control which allows the operator to control outflow of washer fluid from a washer fluid nozzle onto the front window $126_1$, and a turning indicator 141 control which allows the operator to control a turning indicator of the vehicle 10. The control lever 138 may include any other suitable control in other examples.

The input portion of the user interface 130 may comprise any other input device (e.g., a set of buttons, a joystick, a trackball, etc.) in other embodiments.

In this embodiment, the output portion of the user interface 130 comprises a display 140 to visually convey information to the operator. The display 140 may be any suitable type of electronic display (e.g., a liquid-crystal display (LCD), etc). Various information can be conveyed to the operator on the display 140. For example, in some embodiments, the display 140 may implement an instrument panel that provides: a speedometer indicator which conveys information indicative of the speed at which the vehicle 10 is moving as measured by a speedometer of the vehicle 10; a tachometer indicator which conveys information indicative of the speed at which the prime mover 17 is running as measured by a tachometer of the vehicle 10; an odometer indicator which conveys information indicative of a distance traveled by the vehicle 10 as measured by an odometer of the vehicle 10; a fuel gauge indicator which conveys information indicative of a quantity of fuel remaining in the vehicle 10; and/or any other indicator conveying information to the user. Each of the speedometer indicator, the tachometer indicator, the odometer indicator, and/or other indicators may comprise a digital numerical reading, a digital dial, a digital bar graph, a digital symbol, and/or any other element displayable on the display 140 to convey information to the operator.

The output portion of the user interface 130 may comprise any other output device (e.g., one or more mechanical dials (e.g., a speedometer dial, a fuel gauge dial, etc.) or other mechanical indicators (e.g., a mechanical odometer); one or more light indicators (e.g., low fuel light indicator, etc.); a speaker; etc.) in other embodiments.

Figure 45:
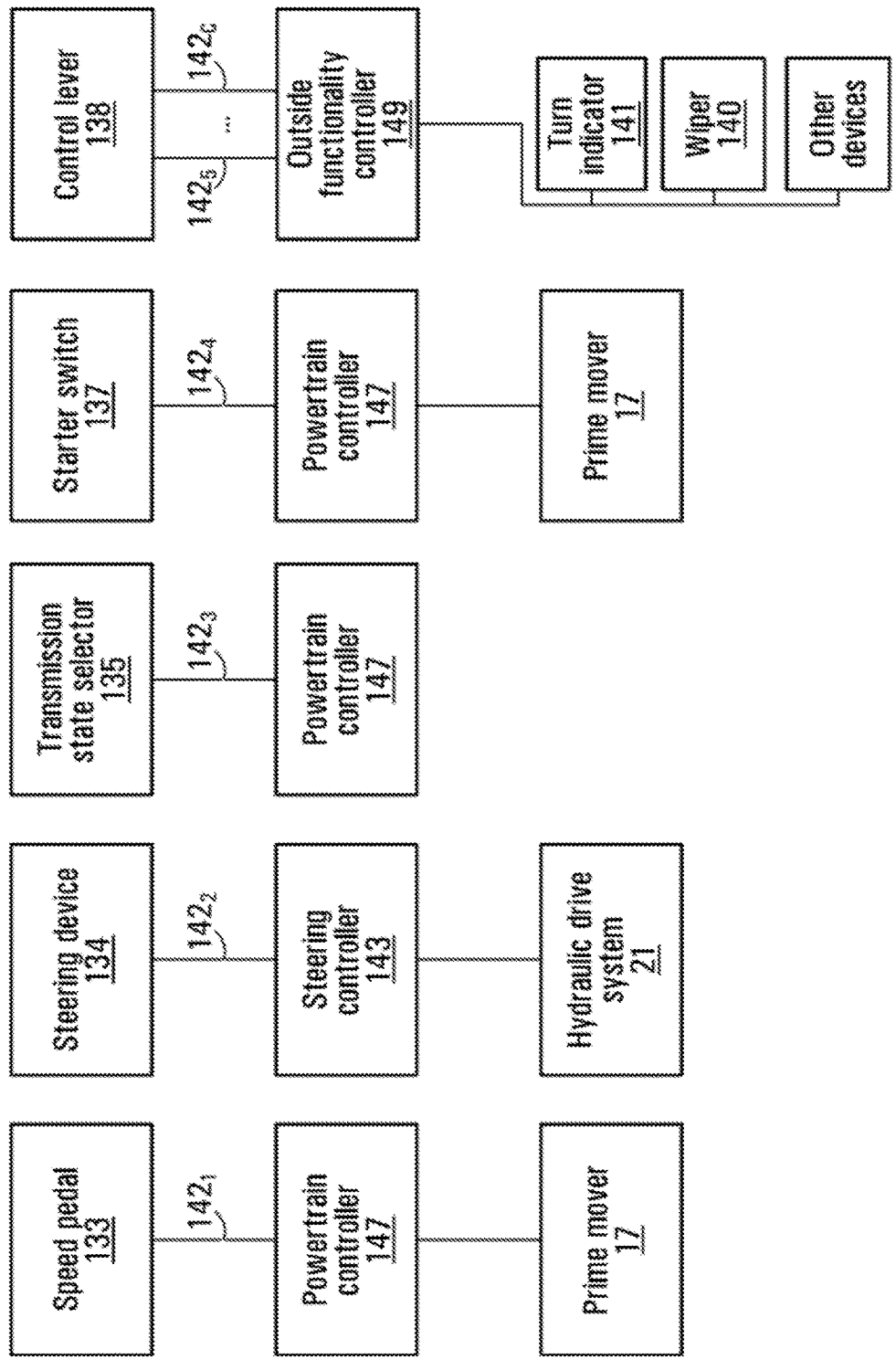
FIG. 45 shows components of the user interface connected to other components of the tracked vehicle.

The user interface 130 is connected to other components of the tracked utility vehicle 10 to cause execution of commands provided by the operator and to present information to the operator. More particularly, in this embodiment, there are a plurality of connections $142_1$-$142_C$ between the user interface 130 and other components of the vehicle 10. These connections $142_1$-$142_C$ may comprise one or more mechanical links, wires, cables, wireless links, and/or other connecting elements depending on how the user interface 130 is connected to other components of the vehicle 10 (e.g., via mechanical control systems and/or via electromechanical systems (e.g., "drive-by-wire" systems)). For example, with additional reference to FIG. 45, in this embodiment:

- The connection $142_1$ is between the speed pedal 133 and the prime mover 17. For instance, in this embodiment, the connection $142_1$ may comprise a wire connected to a pedal position sensor (e.g., comprising a potentiometer) for sensing a position of the speed pedal 133 and transmitting a signal indicative of this position to a powertrain controller 147 controlling the prime mover 17 (e.g., an engine control unit (ECU)). In other embodiments, the connection $142_1$ may comprise a mechanical link between the speed pedal 133 and a throttle for the prime mover 17.
- The connection $142_2$ is between the steering wheel 134 and a steering controller 143 which controls a steering direction of the vehicle 10 by controlling the hydraulic motors of the hydraulic drive system 21 to cause the endless track 22 of one of the track assemblies $16_1$, $16_2$ to move faster than the endless track 22 of the other one of the track assemblies $16_1$, $16_2$ when the vehicle 10 turns. For instance, in this embodiment, the connection $142_2$ comprises a steering device angle sensor for sensing an angle in which the steering wheel 134 is positioned and transmitting a signal indicative of this angle to the steering controller 143.
- The connection $142_3$ is between the proportional front-neutral-reverse selector 135 and the powertrain controller 147. For instance, in this embodiment, the connection $142_3$ may comprise a wire transmitting a signal indicative of the state of the selector 135 to the powertrain controller 147.
- The connection $142_4$ is between the starter switch 137 and the prime mover 17. For instance, in this embodiment, the connection $142_4$ may comprise a wire between the starter switch 137 and the powertrain controller 147.
- The connections $142_5$-$142_C$ are between the control lever 138 and the wiper 140, the washer fluid nozzle, the turning indicator 141 and/or any other device of the vehicle 10 which can be controlled via inputs at the control lever 138. For instance, in this embodiment, the connections $142_6$-$142_N$ may comprise wires between the control lever 138 and an outside functionality controller 149 of the vehicle 10 which sends signals to these devices of the vehicle 10 to control these devices. In other embodiments, the connections $142_6$-$142_N$ may comprise wires directly connected to these devices.

Controllers of the tracked utility vehicle 10, such as the powertrain controller 147, the steering controller 143 and the outside functionality controller 149, with which the user interface 130 may interact may be implemented in various manners. A controller comprises suitable hardware and/or software (e.g., firmware) implementing: an interface for receiving and transmitting signals to other components of the vehicle 10 to which it is connected; a processing portion comprising one or more processors for performing processing operations, where a processor may be a general-purpose processor executing program code stored in the controller or a specific-purpose processor comprising one or more pre-programmed hardware or firmware elements (e.g., application-specific integrated circuits (ASICs), electrically erasable programmable read-only memories (EEPROMs), etc.); and a memory portion comprising one or more memories for storing program code executed by the processing portion and/or data used during operation of the processing portion, where a memory may be a semiconductor memory (e.g., read-only memory (ROM) and/or random-access memory (RAM)), a magnetic storage medium, an optical storage medium, and/or any other suitable type of memory. In some embodiments, two (2) or more (e.g., all) controllers of the vehicle 10 may be physically distinct from one another and may be connected to one another via a bus (e.g., a controller-area network (CAN) bus or other suitable bus). In other embodiments, two (2) or more (e.g., all) controllers of the vehicle 10 may be functional entities of a single physical control unit (e.g., a vehicle controller).

The seating area 132 comprises a seat 150 for the operator of the tracked utility vehicle 10. The seat 150, which will be referred to as an "operator seat", is positioned relative to the user interface 130 to allow the operator to easily interact with the user interface 130.

Figure 42:
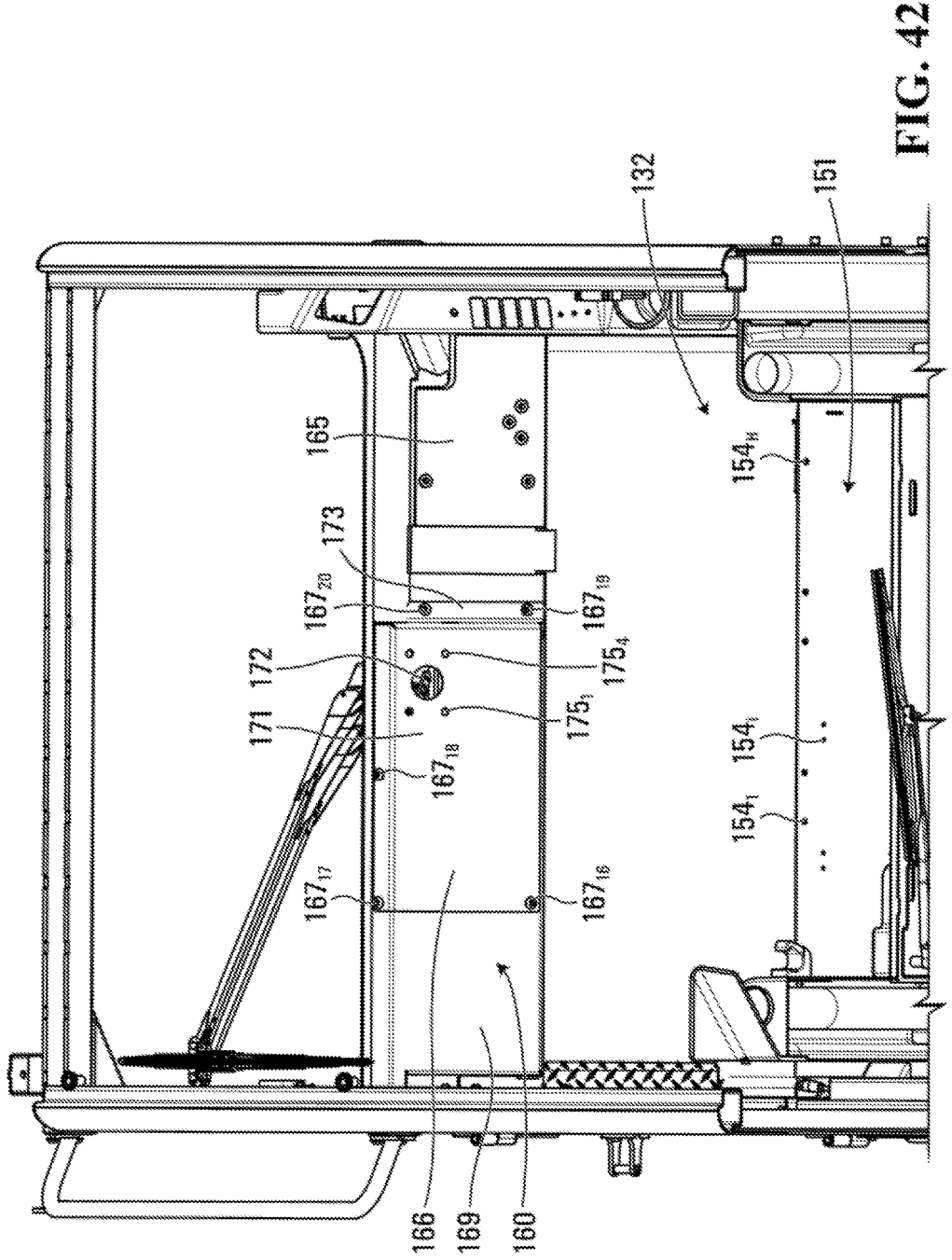
FIG. 42 shows the operator cabin in the one-person configuration with a seat and components of a user interface removed.

As mentioned previously, in this embodiment, the operator cabin 20 is configurable into a plurality of cabin configurations in which the seating area 132 and the user interface 130 are configured differently. More particularly, in this embodiment, the plurality of cabin configurations in which the operator cabin can be configured includes a first cabin configuration, which is shown in FIGS. 41 and 42 and will be referred to as a "one-person cabin configuration", and a second cabin configuration, which will be referred to as a "two-person cabin configuration" and is shown in FIGS. 43 and 44.

As shown in FIG. 41, the operator cabin 20 can be configured in the one-person cabin configuration when only the operator is to sit therein. More particularly, in this embodiment, the operator seat 150 is a sole seat of the seating area 132 and is located in an operator seat position 176 which, in this example, is generally in a center of a width of an interior of the operator cabin 20. Various devices of the user interface 130, including the steering wheel 134 and its steering column 144, the speed pedal 133, the front-neutral reverse selector 135, the starter switch 137, and the control lever 138, are also located in respective user device positions which, in this example, are generally in the center of the width of the interior of the operator cabin 20.

Figure 43:
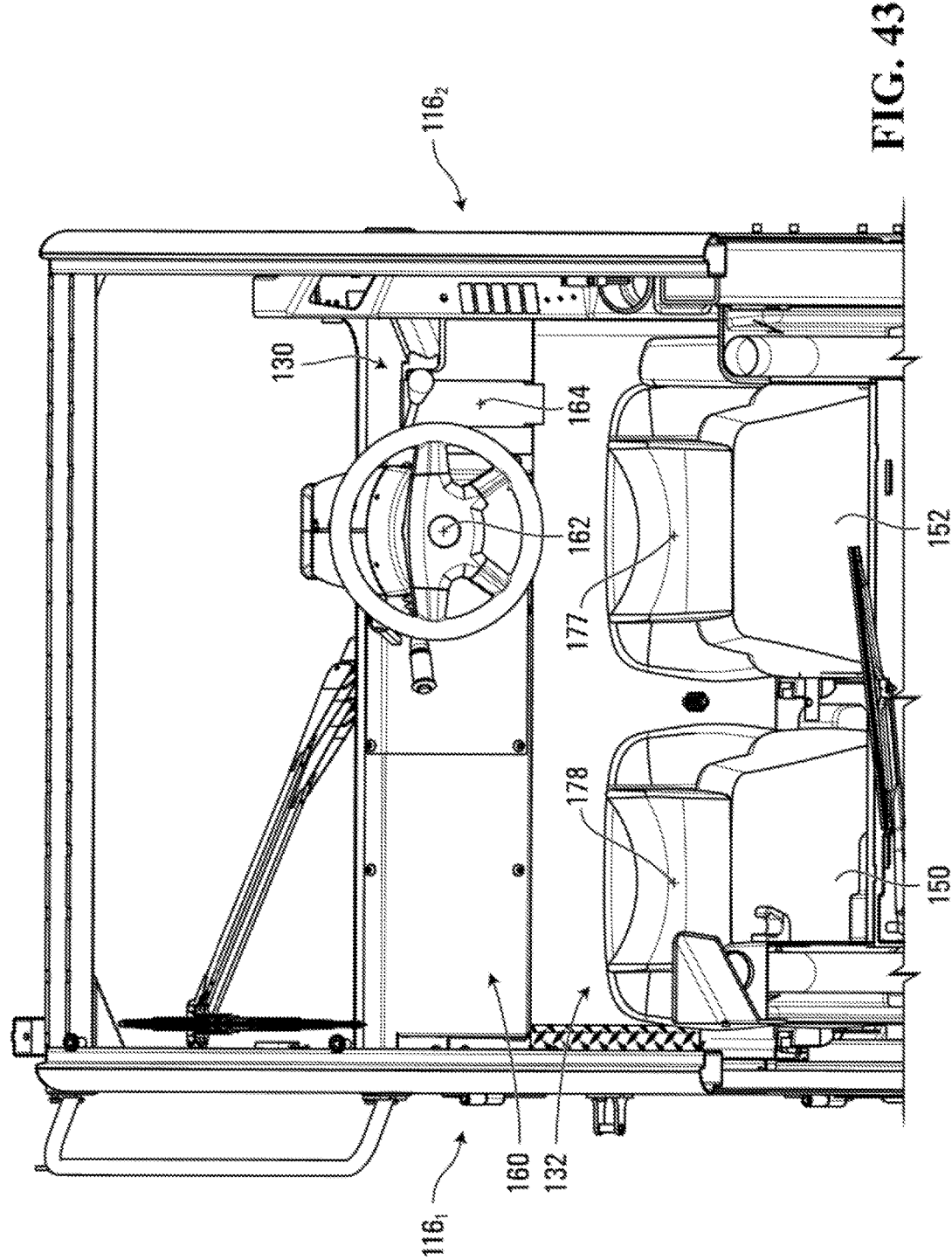
FIG. 43 shows the operator cabin configured in a two-person configuration.
Figure 44:
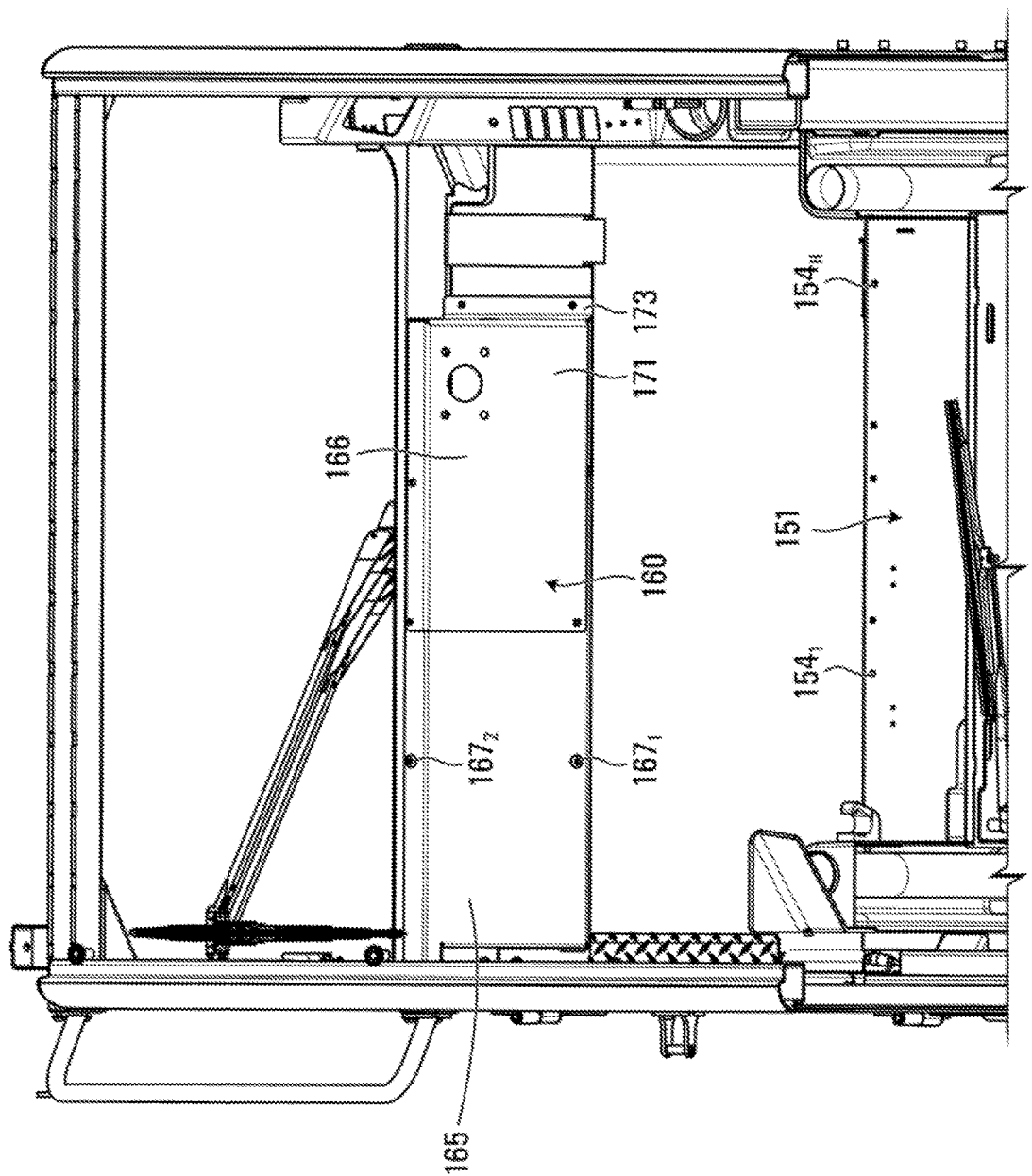
FIG. 44 shows the operator cabin in the two-person configuration with seats and components of the user interface removed.

As shown in FIG. 43, the operator cabin 20 can be configured in the two-person cabin configuration when the operator and a second person are to sit therein. More particularly, in this embodiment, the operator cabin 20 is sized such that it allows the second person, who will be referred to as a "passenger", to sit in the seating area 132 with the operator. To that end, the seating area 132 allows a second seat 152 to be provided for the passenger. The seat 152, which will be referred to as a "passenger seat", is located adjacent to the operator seat 150 such that the operator and the passenger sit side-by-side.

The seating area 132 and the user interface 130 in the one-person cabin configuration are configured differently than in the two-person cabin configuration. More particularly, in this embodiment, the operator seat 150 and devices of the user interface 130 in the two-person cabin configuration are located in respective positions that are different from those in which they are located in the one-person cabin configuration.

An operator seat position 177 of the operator seat 150 in the two-person cabin configuration is different from the operator seat position 176 of the operator seat 150 in the one-person cabin configuration. In this example, the operator seat position 177 of the operator seat 150 in the two-person cabin configuration is displaced in the widthwise direction of the vehicle 10 such that the operator seat 150 is closer to the right side $116_2$ of the operator cabin 20 in the two-person cabin configuration than in the one-person cabin configuration. The passenger seat 152 is located at a passenger seat position 178 that is between the left side $116_1$ of the operator cabin 20 than the operator seat 150.

The seating area 132 thus defines a plurality of seat positions along the widthwise direction of the vehicle 10, including the operator seat position 176 in the one-person cabin configuration, the operator seat position 177 in the two-person cabin configuration, and the passenger seat position 178 in the two-person cabin configuration. In this embodiment, the seating area 132 comprises a seat support 151 for mounting the operator seat 150 in its operator seat positions 176, 177 in the one-person cabin configuration and the two-person cabin configuration and for mounting the passenger seat 152 in its passenger seat position 178 adjacent to the operator seat 150 in the two-person cabin configuration. More particularly, in this embodiment, the seat support 151 comprises mounting holes $154_1$-$154_H$ in the floor 120 of the operator cabin 20 to receive fasteners (e.g., bolts) for mounting the operator seat 150 or the passenger seat 152 to the seat support 151 (e.g., four bolts in four corners of the seat's base). In other embodiments, the seat support 151 may comprise mounting projections, mounting brackets, and/or other mounting structures to mount the operator seat 150 or the passenger seat 152 to the seat support 151. Also, in this embodiment, a seatbelt for the operator seat 150 remains the same in the one-person cabin configuration and the two-person cabin configuration, while an additional seatbelt is installed on the passenger's side in the two-person cabin configuration.

User device positions of devices of the user interface 130, including the steering wheel 134 and its steering column 144, the speed pedal 133, the front-neutral reverse selector 135, the starter switch 137, and the control lever 138, in the two-person cabin configuration are different from the user device positions of these devices in the one-person cabin configuration. In this example, the positions of the steering wheel 134 and its steering column 144, the speed pedal 133, the front-neutral reverse selector 135, the starter switch 137, and the control lever 138 in the two-person cabin configuration are displaced in the widthwise direction of the vehicle 10 such that these devices are closer to right side $116_2$ of the operator cabin 20 in the two-person cabin configuration than in the one-person cabin configuration.

The operator cabin 20 comprises a user interface support 160 for mounting devices of the user interface 130, including the steering wheel 134 and its steering column 144, the speed pedal 133, the front-neutral reverse selector 135, the starter switch 137, and the control lever 138, such that these devices are movable between the one-person cabin configuration and the two-person cabin configuration. More particularly, in this embodiment, the speed pedal 133 and the steering column 144, which supports the steering wheel 134, the front-neutral reverse selector 135, the starter switch 137, and the control lever 138, are mounted to the user interface support 160 such that they are movable in the widthwise direction of the vehicle 10 to change the operator cabin 20 between the one-person cabin configuration and the two-person cabin configuration.

Figure 46:
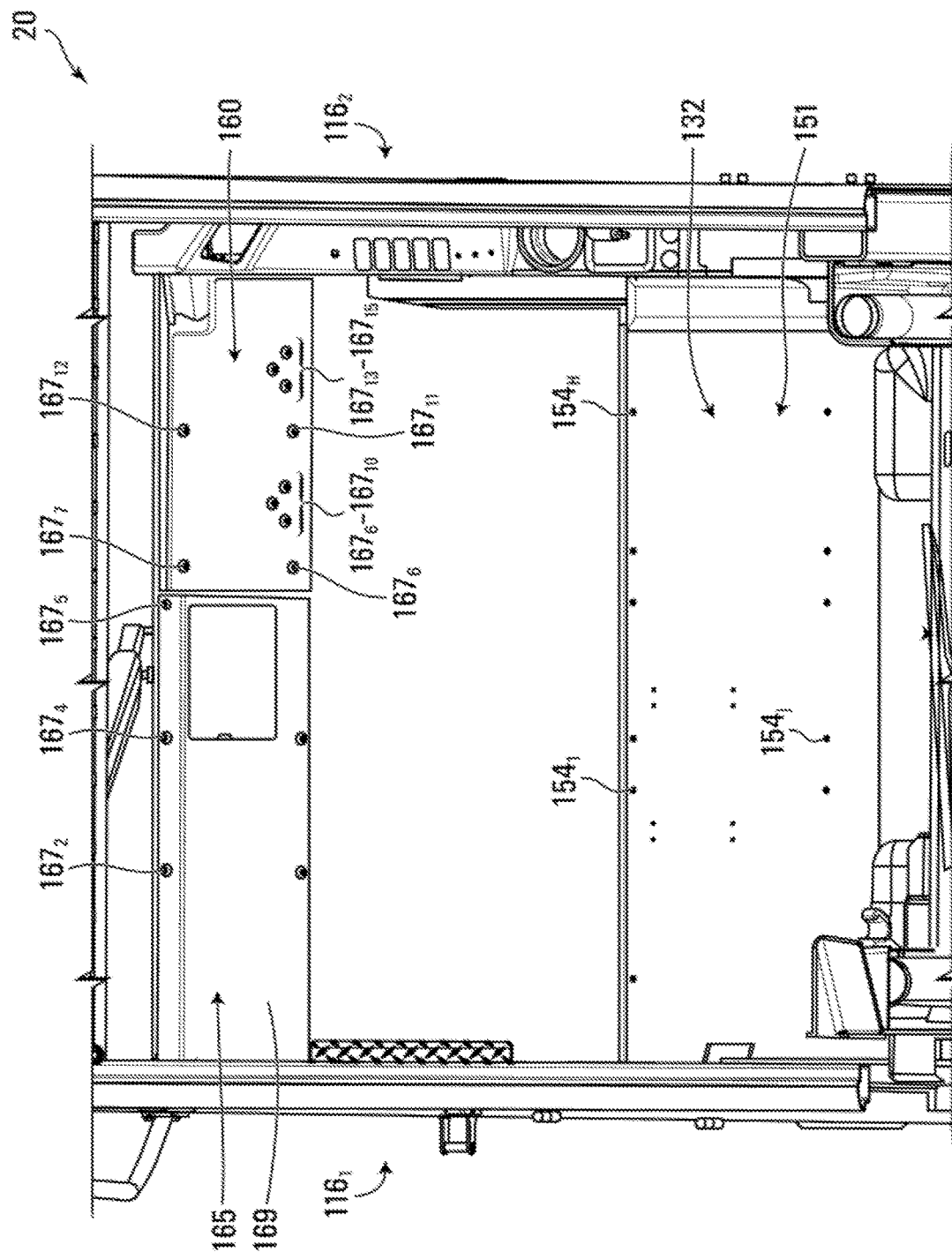
FIG. 46 shows a seat support and part of a user interface support of the operator cabin.
Figure 47:
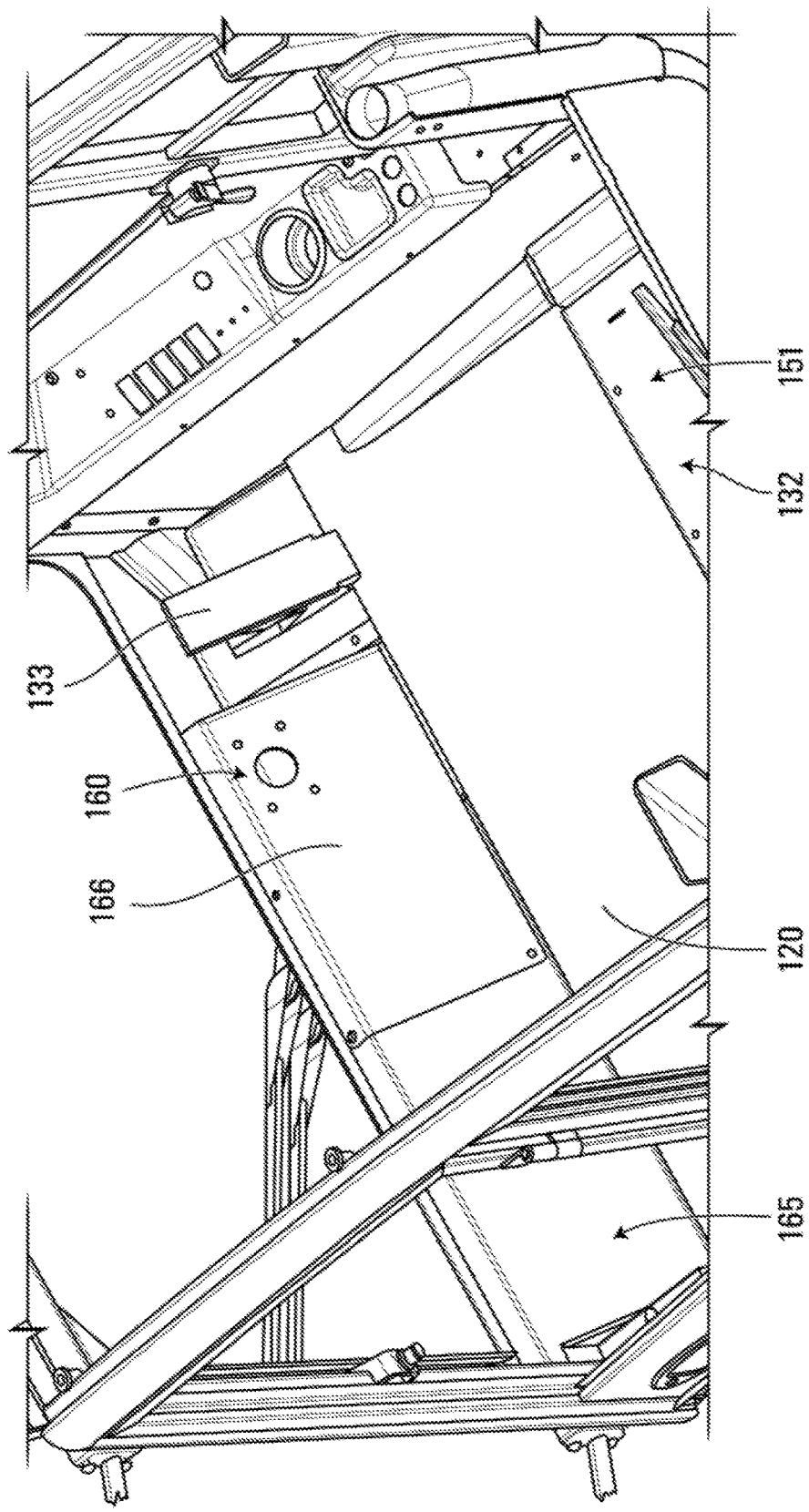
FIG. 47 shows the seat support and the user interface support of the operator cabin.

The user interface support 160 defines a plurality of steering device positions for the steering wheel 134 and its steering column 144 along the widthwise direction of the vehicle 10, including a central steering device position 161 in the one-person cabin configuration and a side steering device position 162 in the two-person cabin configuration. The user interface support 160 also defines a plurality of accelerator positions for the speed pedal 133 along the widthwise direction of the vehicle 10, including a central accelerator position 163 in the one-person cabin configuration and a side accelerator position 164 in the two-person cabin configuration. In this embodiment, with additional reference to FIG. 46, the user interface support 160 comprises mounting holes $167_1$-$167_{20}$ for receiving fasteners (e.g., bolts) to fasten the steering column 144 and the speed pedal 133 to the user interface support 160 in respective ones of their central and side steering device positions 161, 162 and central and side accelerator positions 163, 164 in the one-person cabin configuration and the two-person cabin configuration. In other embodiments, the user interface support 160 may comprise mounting projections, mounting brackets, and/or other mounting structures to mount the steering column 144 and the speed pedal 133 to the user interface support 160.

More particularly, in this embodiment, the user interface support 160 comprises a fixed support structure 165 and a movable support structure 166 that can be moved relative to the fixed support structure 165. The support structures 165, 166 define respective ones of the mounting holes $167_1$-$167_{20}$ which can be aligned with one another to receive fasteners.

In this example of implementation, the fixed support structure 165 comprises a fixed plate 169 which extends obliquely to a horizontal surface of the floor 120 and another fixed plate 170 which also extends obliquely to the horizontal surface of the floor 120 but at a lesser angle than the fixed plate 169. The fixed plates 169, 170 define the mounting holes $167_1$-$167_{15}$. The movable support structure 166 comprises a movable plate 171 and another movable plate 173 which respectively overlap the fixed plates 169, 170 and define the mounting holes $167_{16}$-$167_{20}$. The movable plate 171 also comprises a steering column opening 172 through which wires from the steering column 144 extend and mounting holes $175_1$-$175_4$ to receive fasteners fastening the steering column 144 to the user interface support 160.

The steering column 144 can be moved from its central steering device position 161 in the one-person cabin configuration to its side steering device position 162 in the two-person cabin configuration by: releasing fasteners (e.g., unscrewing bolts) received in the mounting holes $167_1$, $167_2$, $167_4$, $167_6$, $167_7$ of the fixed plates 169, 170 and the mounting holes $167_{16}$-$167_{20}$ of the movable plates 171, 173; moving the movable support structure 166 relative to the fixed support structure 165 in the widthwise direction of the vehicle 10 toward the right such that the mounting holes $167_{16}$-$167_{20}$ of the movable support structure 166 align with the mounting holes $167_3$, $167_4$, $167_5$, $167_{11}$, $167_{12}$ of the fixed support structure 165; and using fasteners in these aligned ones of the mounting holes $167_1$-$167_{20}$ to re-fasten the movable support structure 166 to the fixed support structure 165. Wires from the steering column 144 can be disconnected, moved, and reconnected to move the steering column 144 between its central steering device position and side steering device position.

The speed pedal 133 can be moved from its central accelerator position 163 in the one-person cabin configuration to its side accelerator position 164 in the two-person cabin configuration by: releasing fasteners (e.g., unscrewing bolts) received in the mounting holes $167_8$-$167_{10}$ of the fixed plate 170 and holes of the speed pedal 133; moving the speed pedal 133 relative to the fixed support structure 165 in the widthwise direction of the vehicle 10 toward the right such that the holes of the speed pedal 133 align with the mounting holes $167_{13}$-$167_{15}$ of the fixed support structure 165; and using fasteners in these aligned holes to re-fasten the speed pedal 133 to the fixed support structure 165.

The steering column 144 and the speed pedal 133 can be moved from their side steering device position 162 and side accelerator position 164 in the two-person cabin configuration to their central steering device position 161 and central accelerator position 163 in the one-person cabin configuration using a procedure that is reverse to that described above.

The seat support 151 and/or the user interface support 160 may be constructed in various other ways in other embodiments to provide the different seat positions 176, 177, 178, steering device positions 161, 162, and/or accelerator positions 163, 164. For example, in other embodiments, the seat support 151 and/or the user interface support 160 may provide the different seat positions 176, 177, 178, steering device positions 161, 162, and/or accelerator positions 163, 164 by allowing the operator seat 150, the steering column 144, and/or the speed pedal 133 to be moved between such different positions without having to untighten bolts or other fasteners (e.g., a rail mechanism which allows the steering column 144 and/or the speed pedal 133 to be unlocked, slid on a rail to a desired position, and locked in place; an electromechanical system comprising an actuator that can be activated to cause the steering column 144 and/or the speed pedal 133 to automatically move to a desired position; etc.).

The operator cabin 20 thus allows a user of the tracked utility vehicle 10, who may be the operator or another user (e.g., an owner of the vehicle 10 or an employee of an entity owning the vehicle 10), to select a desired one of the one-person cabin configuration and the two-person cabin configuration and readily configure the operator cabin 20 in that selected configuration. This can enhance a versatility of the vehicle 10 depending on an application or environment in which it is used.

While in this embodiment the plurality of cabin configurations in which the operator cabin 20 can be configured include the one-person cabin configuration and the two-person cabin configuration, in other embodiments, the plurality of cabin configurations in which the operator cabin 20 can be configured may include any number of different cabin configurations. For example, in other embodiments, the plurality of cabin configurations in which the operator cabin 20 can be configured may include two (2) or more one-person cabin configurations that are different from one another, and may or may not include a two-person cabin configuration. For instance, in some embodiments, the operator cabin 20 may be configured in a first one-person cabin configuration in which the operator seat 150 is in a first operator seat position (e.g., the operator seat position 176 in the cabin configuration shown in FIG. 41) and in a second one-person cabin configuration in which the operator seat 150 is in a second operator seat position different from the first operator seat position (e.g., the operator seat position 177 in the cabin configuration shown in FIG. 43), without including the passenger seat 152. This may allow the operator of the vehicle 10 to sit and operate the vehicle 10 in different positions in the operator cabin 20 depending on a need or preference of the operator and/or an application or environment in which the vehicle 10 is used.

The operator cabin 20, including the user interface 130 and the seating area 132, may be constructed in various other ways in other embodiments. For example, in other embodiments, the operator cabin 20 may not be configurable in different cabin configurations, but may rather have only a single cabin configuration. For instance, in some cases, the operator cabin 20 may always comprise only the operator seat 150, i.e., always have a one-person cabin configuration, or both the operator seat 150 and the passenger seat 152, i.e., always have a two-person cabin configuration.

d) Chassis

The chassis 12 comprises a frame 15 extending along the longitudinal axis 59 of the tracked utility vehicle 10 and supporting various components of the vehicle 10, including the power plant 14, the track assemblies $16_1$, $16_2$, and the operator cabin 20. The frame 15 also supports the work equipment 41 carried by the vehicle 10.

As further discussed below, in this embodiment, the frame 15 is "truck-like" in that at least part of it is configured like a truck frame. This enables the work equipment 41 to be mounted to the frame 15 like on a truck frame. In particular, the frame 15 is configured such that the work equipment 41 can be supported on an area like that standardly supporting such work equipment in truck frames and can be secured to the frame 15 using attachment devices (e.g., attachment plates or attachment threaded rod assemblies) standardly used for securing such work equipment to truck frames. As a result, work equipment such as the work equipment 41 may be as easily installable on the tracked utility vehicle 10 as on trucks. Work equipment such as the work equipment 41 which may be primarily designed for trucks due to a potentially larger market for trucks can therefore also be easily installed on the tracked utility vehicle 10.

With additional reference to FIGS. 19 to 25, in this embodiment, the frame 15 comprises an upper frame structure 60 and a lower frame structure 62.

The upper frame structure 60 is that portion of the frame 15 on which rests and to which is secured the work equipment 41 carried by the tracked utility vehicle 10. To that end, the upper frame structure 60 includes an equipment mounting area 99 for mounting the work equipment 41 above the frame 15. In this embodiment, the upper frame structure 60 comprises a pair of side rails $64_1$, $64_2$ extending along the longitudinal direction of the vehicle 10 and spaced apart in the widthwise direction of the vehicle 10. The upper frame structure 60 also comprises a plurality of crossmembers $66_1$, $66_2$ extending transversally to the longitudinal direction of the vehicle 10 between the side rails $64_1$, $64_2$. The upper frame structure 60 can thus be viewed as being a type of "ladder frame" construction.

In this embodiment, each side rail $64_i$ is a C-shaped channel including a web 68 extending between a top flange $70_1$ and a bottom flange $70_2$. The side rail $64_i$ is made of metallic material, in this case steel. The side rail $64_i$ is dimensioned such that the side rails $64_1$, $64_2$ are able to support the work equipment 41. For example, in some examples of implementation: the web 68 may have a height $H_w$ of at least 10 inches, in some cases at least 14 inches, and in some cases at least 18 inches and/or a thickness $T_w$ of at least ¼ inches, in some cases at least ⅝ inches, and in some cases at least 1 inch; and/or each of the flanges $70_1$, $70_2$ may have a width $W_f$ of at least 2 inches, in some cases at least 5 inches, and in some cases at least 8 inches and/or a thickness $T_f$ of at least ¼ inches, in some cases at least ⅝ inches, and in some cases at least 1 inch. In this example, the side rail $64_i$ is made by bending a metallic plate to give it its C-shape cross-section. Dimensions of the side rails $64_1$, $64_2$ may take on various other values in other embodiments.

The side rails $64_1$, $64_2$ may be configured in various other ways in other embodiments. For example, in some embodiments, each of the side rails $64_1$, $64_2$ may be: a channel having a cross-sectional shape other than a C-shape (e.g., a U-shape); a hollow beam (e.g., a rectangular box beam); or any other suitable elongated structural member. As another example, in some embodiments, the side rails $64_1$, $64_2$ may be made of material other than steel.

The crossmembers $66_1$, $66_2$ are secured to the side rails $64_1$, $64_2$ to interconnect the side rails $64_1$, $64_2$. More particularly, in this embodiment, fasteners (e.g., bolts and/or rivets) secure the crossmembers $66_1$, $66_2$ to the side rails $64_1$, $64_2$. In other embodiments, the crossmembers $66_1$, $66_2$ may be secured to the side rails $64_1$, $64_2$ in other ways (e.g., by welding). Also, in this embodiment, the crossmember $66_1$ is connected to the side rails $64_1$, $64_2$, while the crossmember $66_2$ is connected to extension rail members $65_1$, $65_2$ that are secured to the side rails $64_4$, $64_2$. In this case, the extension rail members $65_1$, $65_2$ are C-shape channels fitted within the C-shape channels $64_1$, $64_2$.

In this embodiment, each crossmember $66_i$ is a channel-like elongated structural member including a web 72 extending between a top flange $74_1$, a bottom flange $74_2$, and opposite end flanges $74_3$, $74_4$. The crossmember $66_i$ is made of metallic material, in this case steel. A plurality of openings $76_1$-$76_5$ are provided in the web 72 for passing cables (e.g., hydraulic cables and/or electric cables) connected to components of the vehicle 10 and/or the work equipment 41.

The crossmembers $66_1$, $66_2$ may be configured in various other ways in other embodiments. For example, in some embodiments, each of the crossmembers $66_1$, $66_2$ may be a hollow beam (e.g., a rectangular box beam) or any other suitable elongated structural member. As another example, in some embodiments, the crossmembers $66_1$, $66_2$ may be made of material other than steel.

A spacing $S_r$ of the side rails $64_1$, $64_2$ in the widthwise direction of the tracked utility vehicle 10 may take on various values. In this embodiment, the spacing $S_r$ of the side rails $64_1$, $64_2$ corresponds to a standard truck frame side rail spacing. The "standard truck frame side rail spacing" refers to an industry-standard spacing of side rails of a frame of a truck chassis for trucks with a gross vehicle weight rating (GVWR) over 14000 lbs (6351 kg). A truck's GVWR corresponds to a curb weight of the truck plus a cargo and passenger weight capacity of the truck. In the United States, a GVWR over 14000 lbs would be a class 4 or higher class according to the U.S. Department of Transportation's truck classification. A truck frame side rail spacing is considered to be "standard" if a majority of truck models with a GVWR rating over 14000 lbs sold by truck manufacturers in a given year in the country where the tracked utility vehicle 10 is manufactured and/or used have that truck frame side rail spacing.

For example, in this embodiment, the standard truck frame side rail spacing is 34 inches and thus the spacing $S_r$ of the side rails $64_1$, $64_2$ is 34 inches. This may useful, for instance, in cases where the vehicle 10 is manufactured or used in the United States. The standard truck frame side rail spacing, and thus the spacing $S_r$ of the side rails $64_1$, $64_2$, may take on other values in other embodiments (e.g., 30 inches in Europe).

In other embodiments, the spacing $S_r$ of the side rails $64_1$, $64_2$ may not correspond to a standard truck frame side rail spacing, but may be selected taking into account truck frame side rail spacings. For example, in some embodiments, the spacing $S_r$ of the side rails $64_1$, $64_2$ may be no greater than 34 inches (about 0.86 m). For instance, in some embodiments, the spacing $S_r$ of the side rails $64_1$, $64_2$ may be between 30 inches and 34 inches, in some cases between 32 inches and 34 inches, and in some cases between 33 inches and 34 inches.

In yet other embodiments, the spacing $S_r$ of the side rails $64_1$, $64_2$ may be selected without considering any truck frame side rail spacing, and can thus have any suitable value.

The lower frame structure 62 is disposed below the upper frame structure 60 and provides a main structure for supporting the track assemblies $16_1$, $16_2$. In this embodiment, the lower frame structure 62 is more rigid than the upper frame structure 60. In this case, the lower frame structure 62 is the most rigid portion of the frame 15 and provides torsional rigidity. In this embodiment, the lower frame structure 62 comprises a pair of side beams $80_1$, $80_2$ extending along the longitudinal direction of the tracked utility vehicle 10 and spaced apart in the widthwise direction of the vehicle 10. The tower frame structure 62 also comprises a plurality of crossmembers $82_1$-$82_5$ extending transversally to the longitudinal direction of the vehicle 10 between the side beams $80_1$, $80_2$. The lower frame structure 62 can thus also be viewed as being a type of "ladder frame" construction. The lower frame structure 62 also comprises a base plate 81 extending between the side beams $80_1$, $80_2$ to protect a fuel tank. The lower frame structure 62 also comprises a front drawbar $87_1$ and a rear drawbar $87_2$.

In this embodiment, each of the side beams $80_1$, $80_2$ is a rectangular box beam made of metallic material, in this case steel. The side beams $80_1$, $80_2$ may be configured in various other ways in other embodiments. For example, in some embodiments, each of the side beams $80_1$, $80_2$ may be: a hollow beam having a cross-sectional shape other than rectangular (e.g., circular or otherwise curved); a channel having a C-shape, U-shape or other suitable shape; or any other suitable elongated structural member. As another example, in some embodiments, the side beams $80_1$, $80_2$ may be made of material other than steel.

The crossmembers $82_1$-$82_5$ are secured to the side beams $80_1$, $80_2$ to interconnect the side beams $80_1$, $80_2$. More particularly, in this embodiment, the crossmembers $82_1$-$82_5$ are secured to the side beams $80_1$, $80_2$ by welding. The crossmembers $82_1$-$82_5$ may be secured to the side beams $80_1$, $80_2$ in other ways in other embodiments (e.g., by fasteners such as bolts and/or rivets).

In this embodiment, the frame 15 defines an internal space 86. This internal space 86, which will be referred to as a "tub", can be used to receive components of the tracked utility vehicle 10 and/or part of the work equipment 41 carried by the tracked utility vehicle 10 (e.g., the vehicle's fuel tank, pipes, cables, a dump box's hydraulic cylinder, a crane's torque box, etc.).

Figure 20:
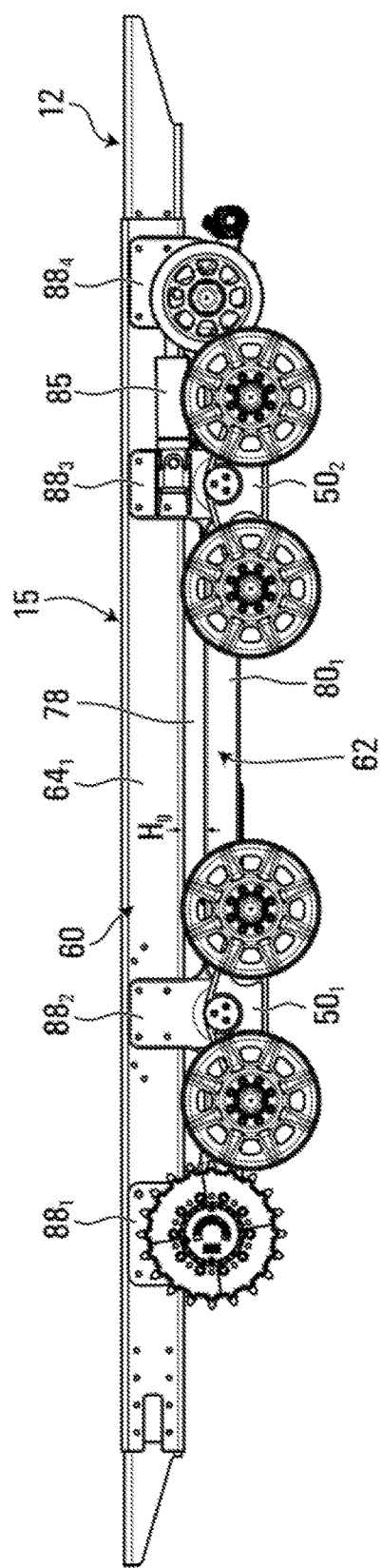
Figure 21:
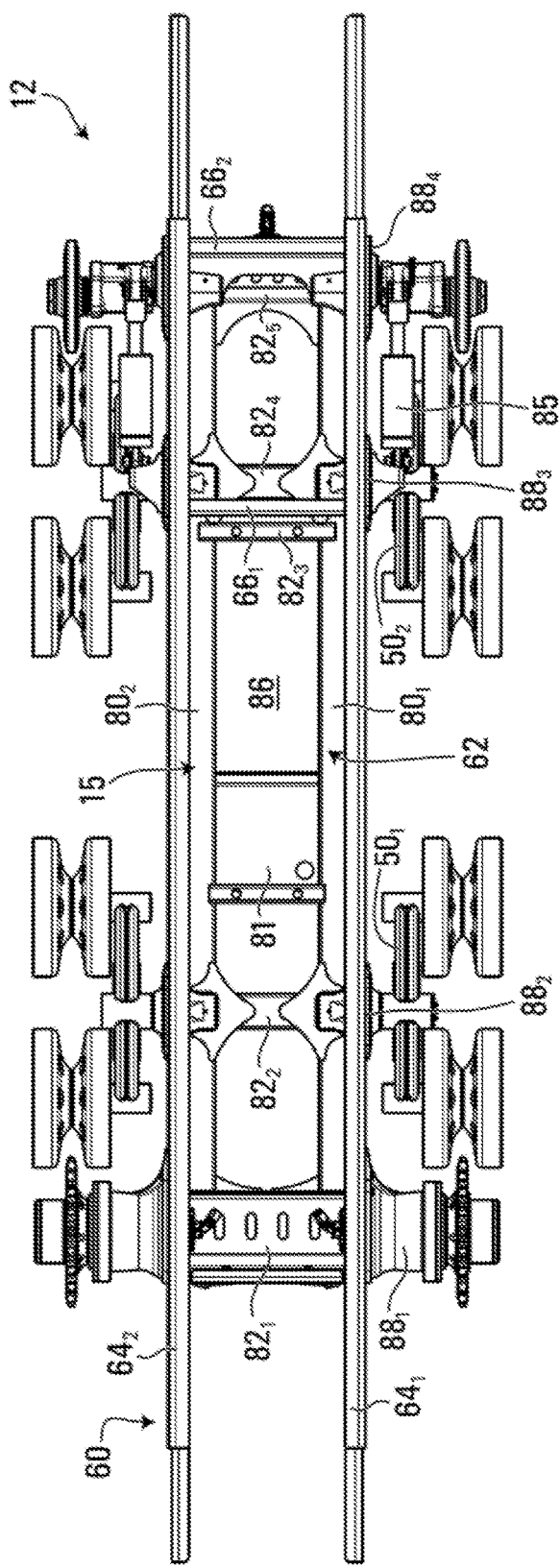
Figure 22:
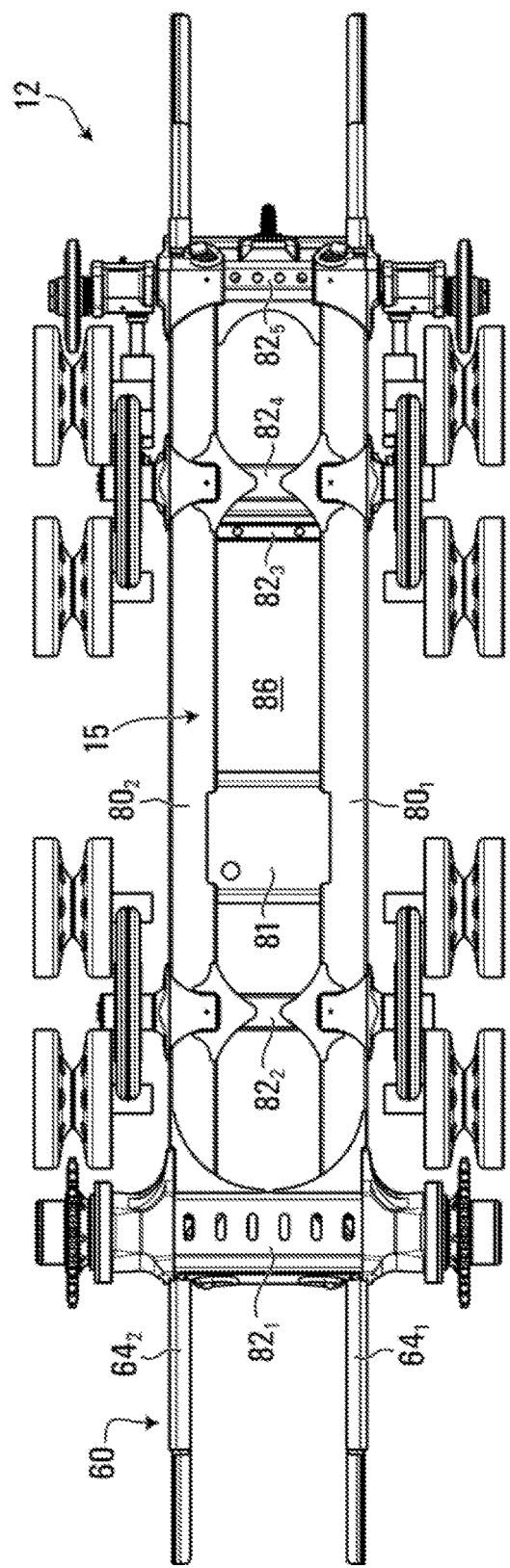
Figure 23:
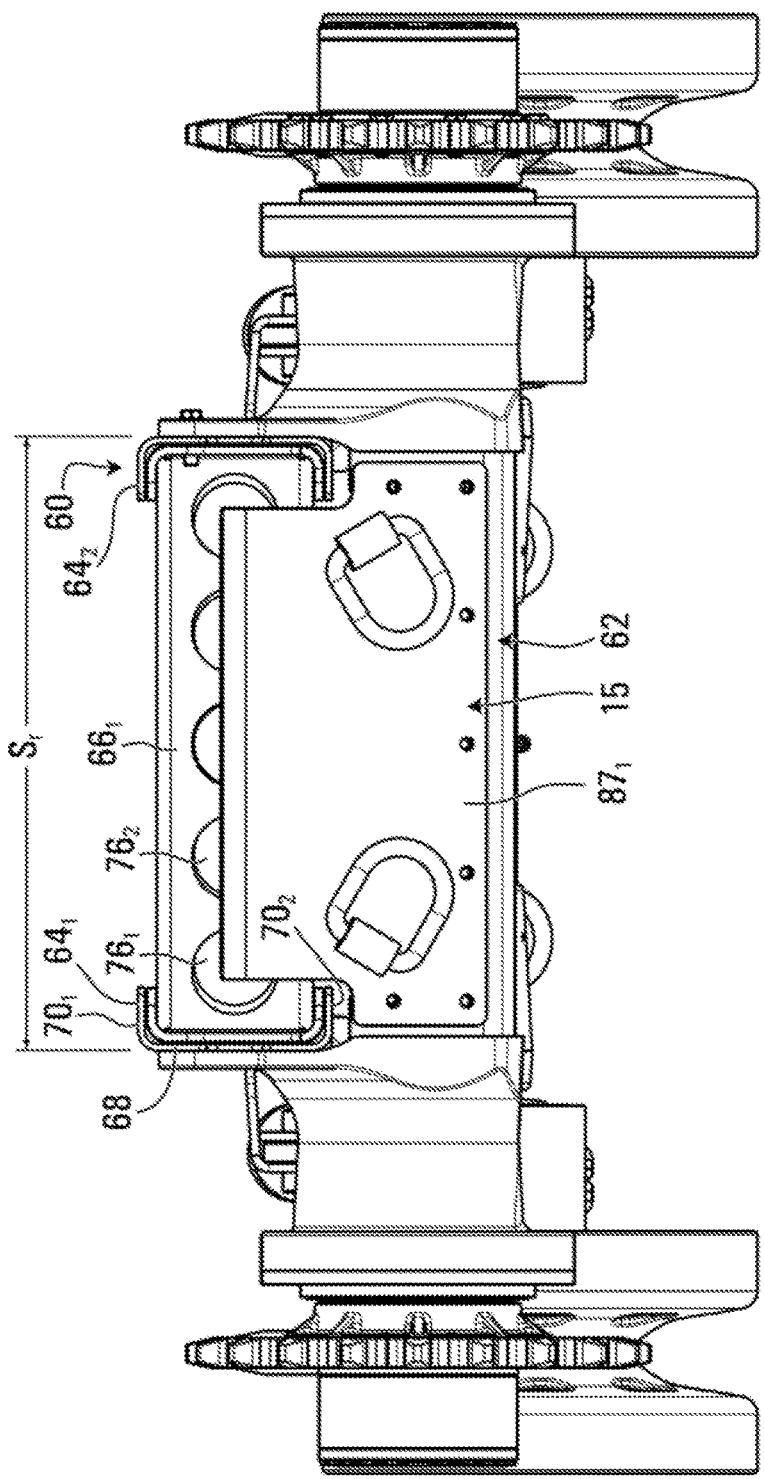
Figure 24:
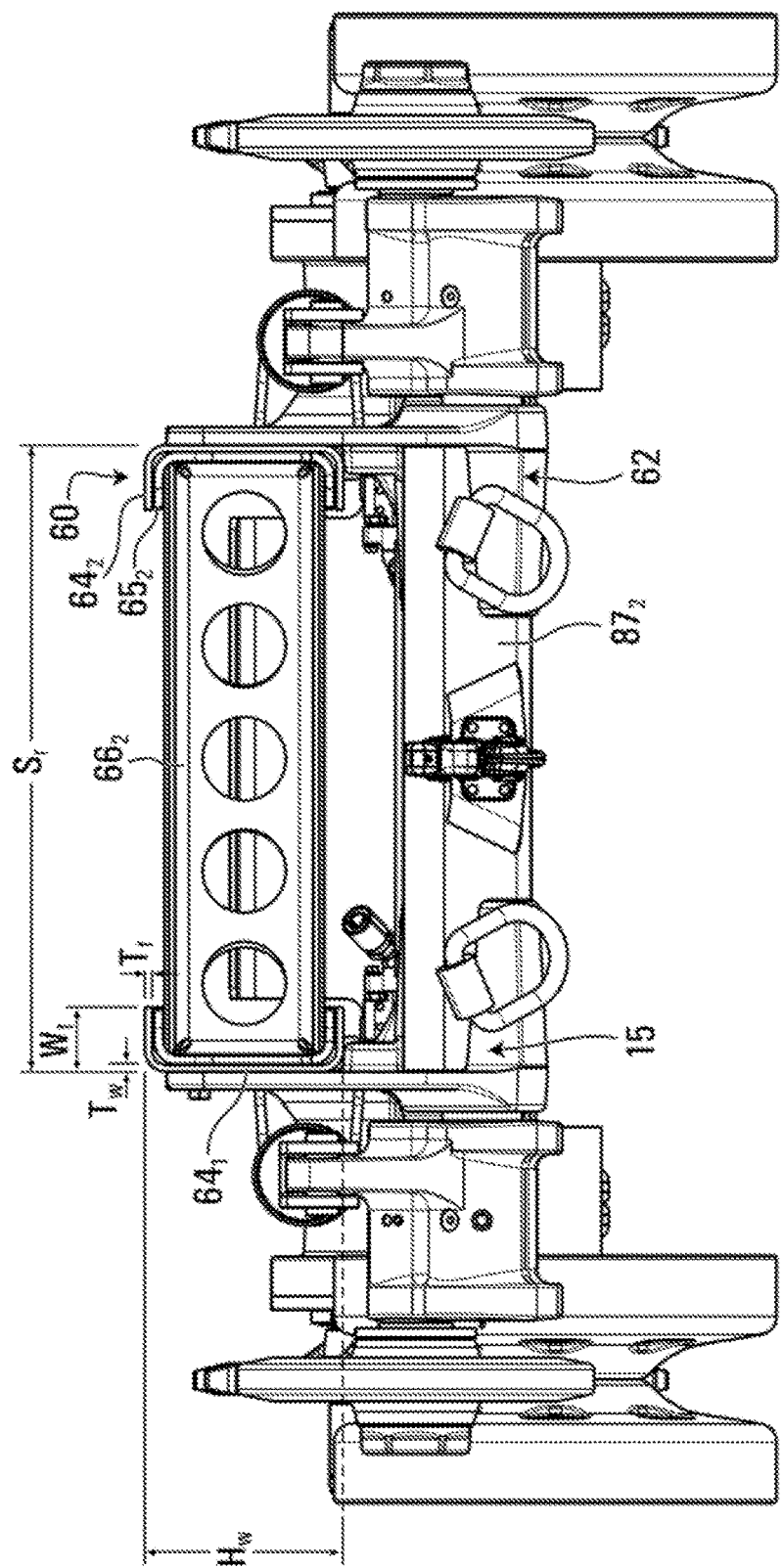
Figure 25:
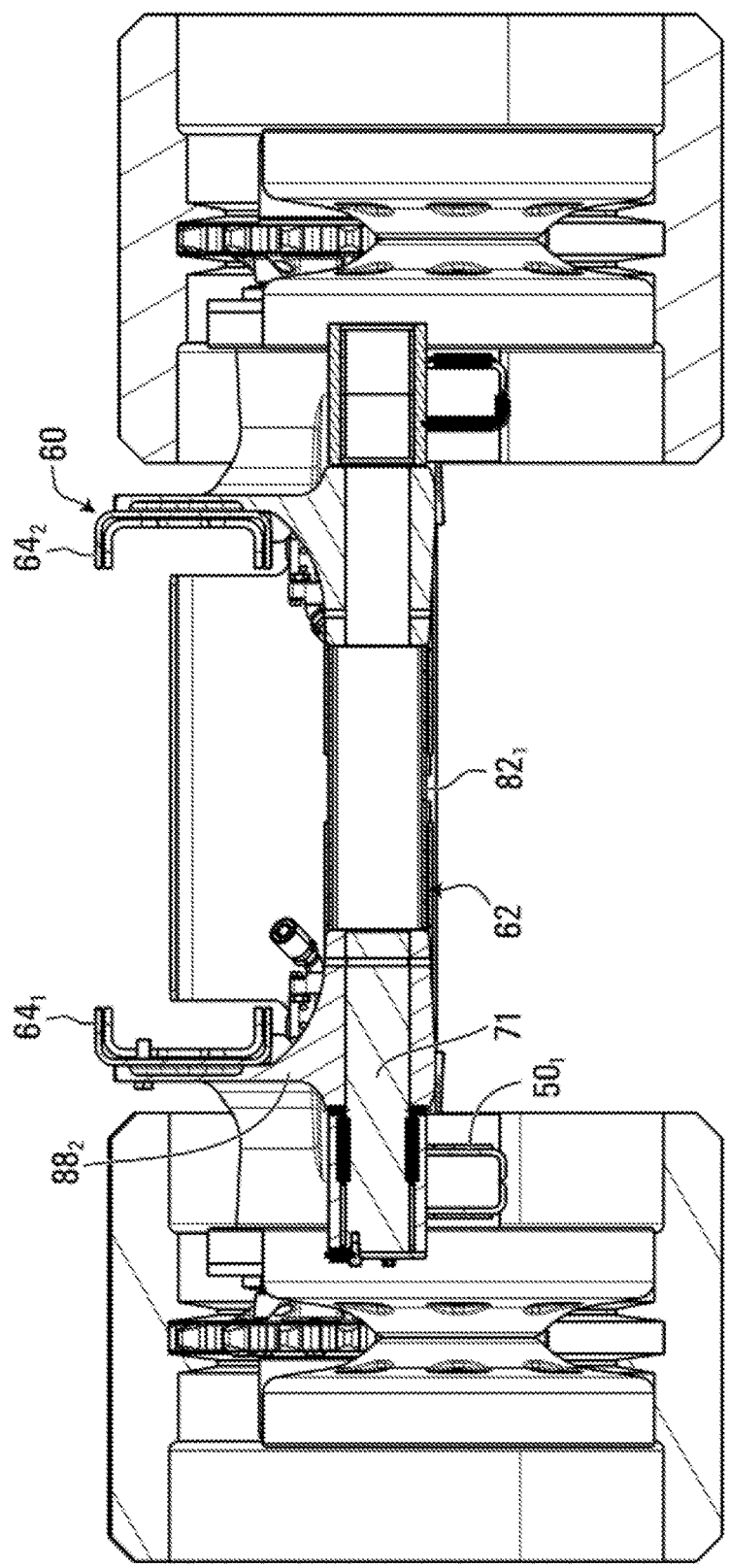

As shown in FIG. 20, in this embodiment, the frame 15 defines a vertical gap 78 between the upper frame structure 60 and the lower frame structure 62. The vertical gap 78 may facilitate use of attachment threaded rod assemblies or other attachment devices for attaching the work equipment 41 to the frame 15, as further discussed later on. For example, in some embodiments, the vertical gap 78 may have a height $H_g$ in the height direction of the tracked utility vehicle 10 of at least 0.5 inches, in some cases at least 0.75 inches, in some cases at least inch, in some cases 1.25 inches, and even more in some cases (e.g., 2 inches or more). In other embodiments, the upper frame structure 60 and the lower frame structure 62 may be contiguous such that there is no such vertical gap between them.

The track assemblies $16_1$, $16_2$ are mounted to the frame 15. In this embodiment, the track assemblies $16_1$, $16_2$ are mounted to both the lower frame structure 62 and the upper frame structure 60. More particularly, in this embodiment, each of the wheel mounting structures $88_1$-$88_4$ is secured to both the lower frame structure 62 and the upper frame structure 60. In this case, each of the wheel mounting structures $88_1$-$88_4$ is welded to the side beams $80_1$, $86_2$ of the lower frame structure 62 and fastened to the side rails $64_1$, $64_2$ of the upper frame structure 60 by fasteners (e.g., bolts and/or rivets). In other cases, each of the wheel mounting structures $88_1$-$88_4$ may be fastened to the side beams $80_1$, $80_2$ of the lower frame structure 62 by fasteners (e.g., bolts and/or rivets) and/or welded to the side rails $64_1$, $64_2$ of the upper frame structure 60. In this embodiment, the support wheel mounting structures $88_2$, $88_3$ are also welded to the crossmembers $82_1$, $82_4$.

The work equipment 41 is mounted to the frame 15. In this embodiment, the work equipment 41 is mounted to the upper frame structure 60. More particularly, in this embodiment, the work equipment 41 rests on and is secured to the side rails $64_1$, $64_2$. Since the side rails $64_1$, $64_2$ are C-shape channels standardly used in truck frames and since the spacing $S_r$ of the side rails $64_1$, $64_2$ corresponds to the standard truck frame side rail spacing, work equipment such as the work equipment 41 may be as easily installable on the tracked utility vehicle 10 as on trucks, even if it was primarily designed for trucks.

Figure 26:
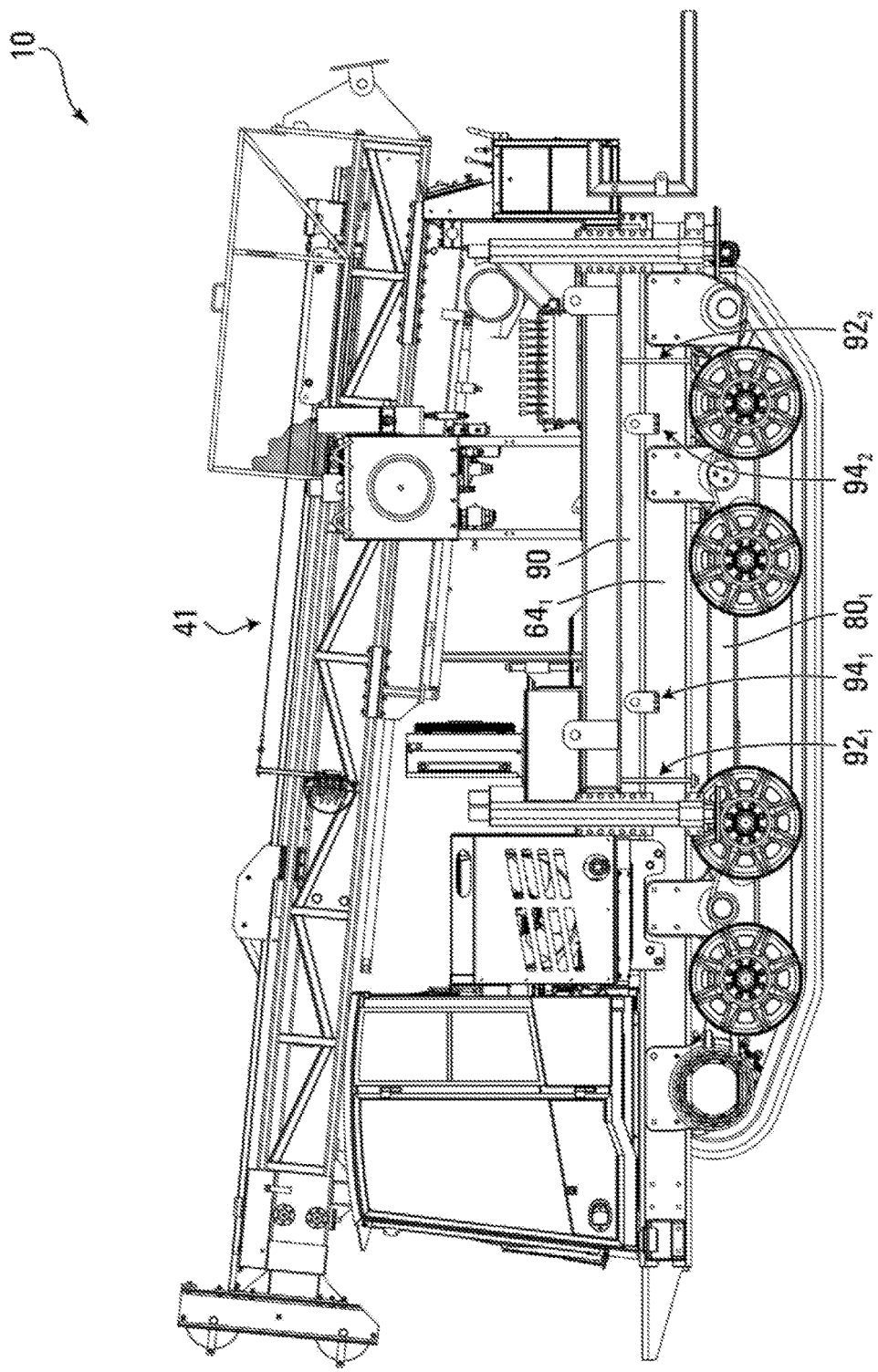
FIGS. 26 to 28 show examples of attachment devices which secure the work equipment to the frame of the tracked vehicle.
Figure 27:
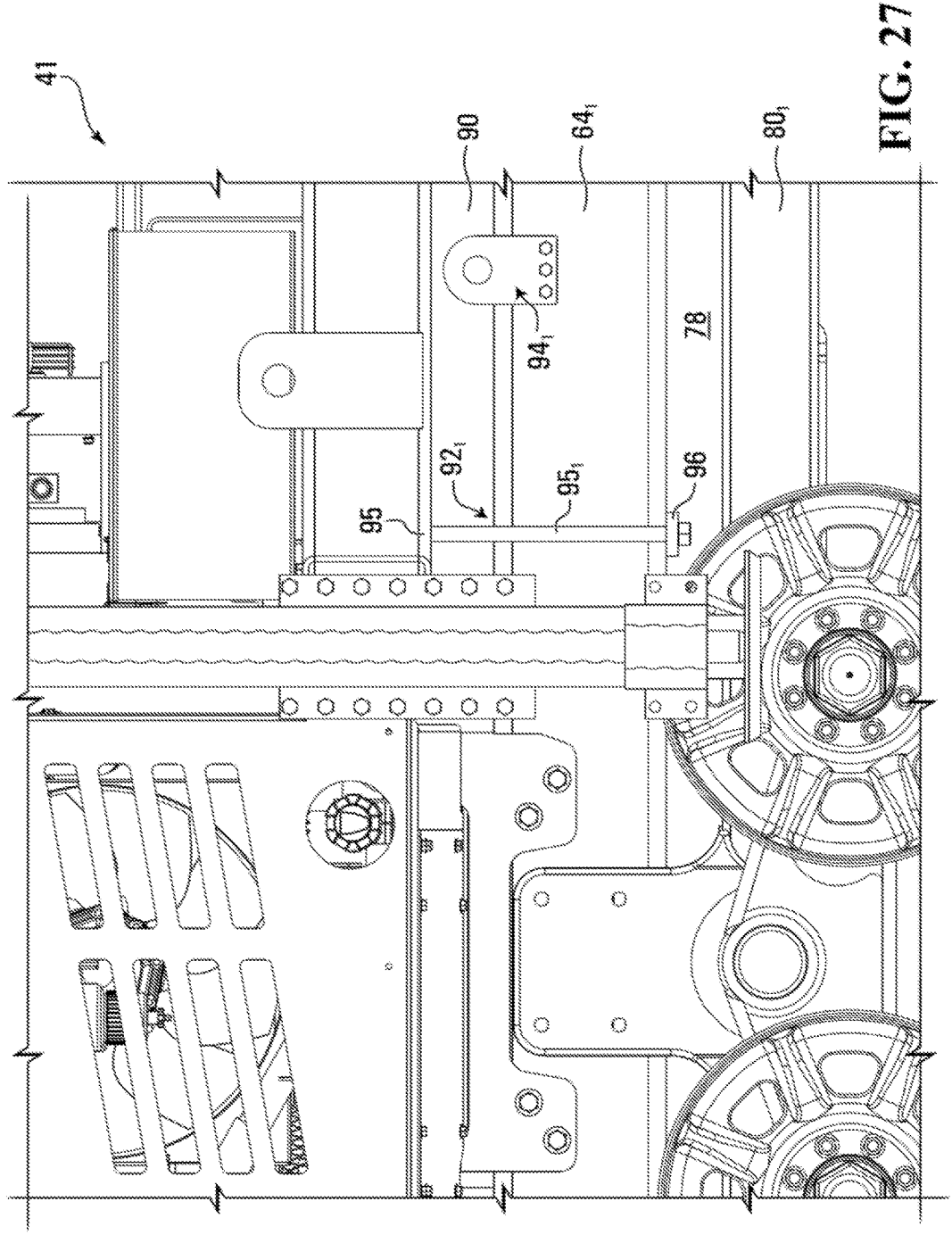
Figure 28:
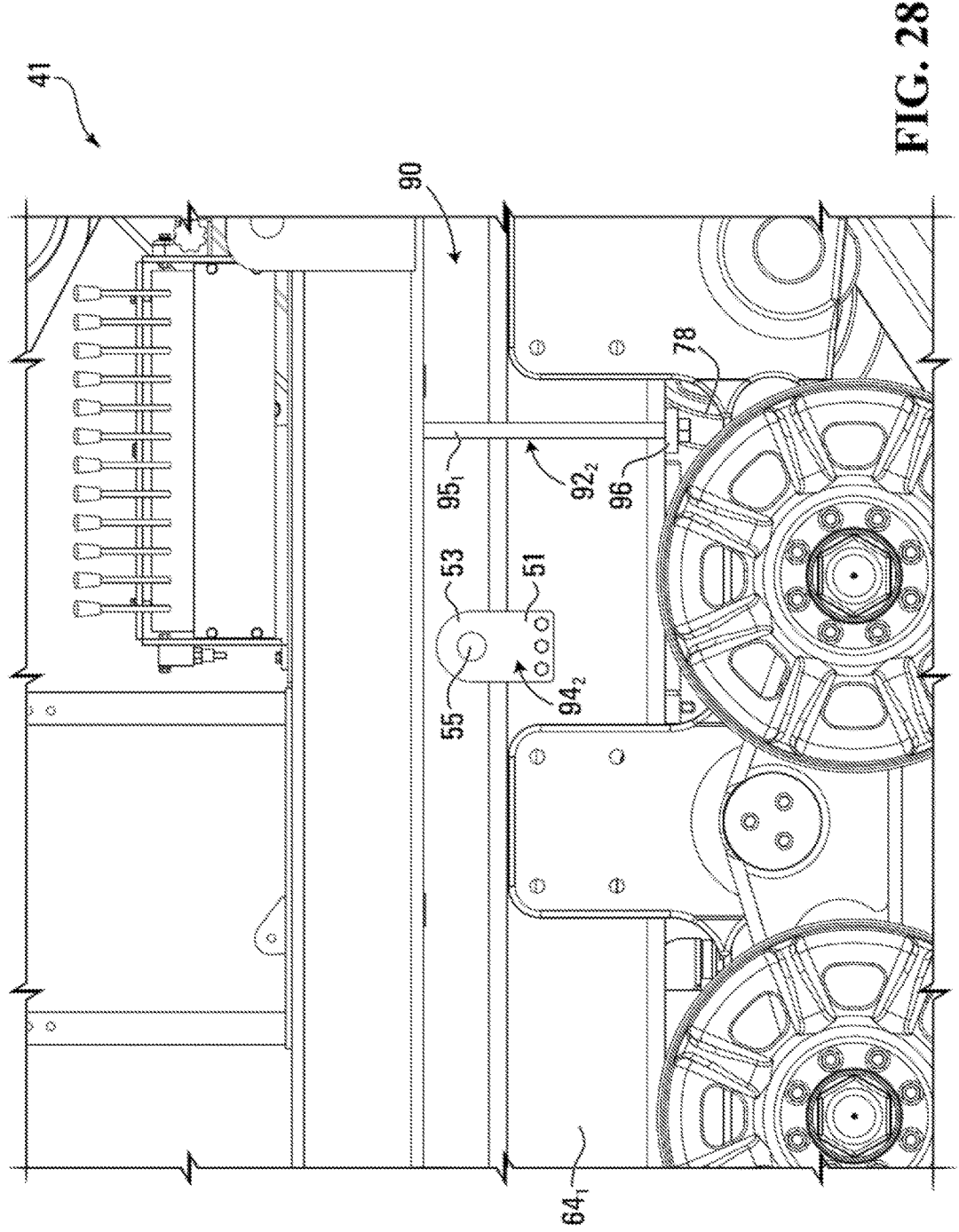

With additional reference to FIGS. 26 to 28, in this embodiment, a base 90 of the work equipment 41 rests on the side rails $64_1$, $64_2$ of the frame 15. The base 90 of the work equipment 41 is secured to the side rails $64_1$, $64_2$ by a plurality of attachment devices $92_1$-$92_R$, $94_1$-$94_P$. For example, in this embodiment, each of the attachment devices $92_1$-$92_R$ includes an attachment threaded rod assembly, and each of the attachment devices $94_1$-$94_P$ includes an attachment plate. Such attachment threaded rod assemblies and attachment plates are standardly used for securing work equipment such as the work equipment 41 to trucks.

Each attachment threaded rod assembly $92_i$ includes a pair of threaded rods $95_1$, $95_2$ and a bottom link 96 disposed around the side rail $64_i$. The side rail $64_1$ is located between the threaded rods $95_1$, $95_2$ which are secured to the bottom link 96 and an attachment part 95 of the base 90 of the work equipment 41 with fasteners (e.g., nuts) to clamp the side rail $64_i$. In this embodiment, the vertical gap 78 between the side rail $64_i$ and the side beam $80_1$ facilitates installation of the attachment threaded rod assembly $92_i$. In particular, the gap 78 facilitates positioning of the bottom link 96 beneath the side rail 64 and tightening of the fasteners on the threaded rods $95_1$, $95_2$.

Each attachment plate $94_i$ is secured to the side rail $64_i$ and to the base 90 of the work equipment 41. More particularly, in this embodiment, the attachment plate $94_i$ is fastened to the web 68 of the side rail $64_i$ by fasteners (e.g., bolts and/or rivets) and welded to the base 90 of the work equipment 41. This type of attachment plate can sometimes be referred to as a "fish plate". The attachment plate $94_i$ may be secured to the side rail $64_i$ and to the base 90 of the work equipment 41 in other ways in other embodiments (e.g., by being fastened to the base 90 of the work equipment and/or welded to the side rail $64_i$).

In this example of implementation, the attachment plate $94_i$ includes a generally rectangular lower part 51 fastened to the side rail $64_i$ and a curved, in this case generally semi-circular, upper part 53 welded to the base 90 of the work equipment 41. The upper part 53 of the attachment plate $94_i$ includes an opening 55, which may allow a greater length of weld bead when the attachment plate $94_i$ is welded to the base 90 of the work equipment 41. The attachment plate $94_i$ may have various other shapes in other examples of implementation.

Although in this embodiment the attachment devices $92_1$-$92_R$, $94_1$-$94_P$ securing the work equipment 41 to the frame 15 are attachment threaded rod assemblies and attachment plates, various other types of attachment devices may be used in other embodiments.

While in embodiments considered above the tracked vehicle 10 is a tracked carrier vehicle carrying work equipment, in other embodiments, certain features (e.g., the track tensioner 85 connected to the hydraulic drive system 21) of the tracked vehicle 10 may be implemented in other types of industrial tracked vehicles, such as an agricultural vehicle (e.g., a tractor, a harvester, etc.) or a construction vehicle (e.g., a loader, a bulldozer, an excavator, etc.).

Any feature of any embodiment discussed herein may be combined with any feature of any other embodiment discussed herein in some examples of implementation.

Although various embodiments have been illustrated, this was for the purpose of describing, but not limiting, the invention. Various modifications will become apparent to those skilled in the art and are within the scope of this invention, which is defined by the following claims.

The invention claimed is:

1. A tracked vehicle comprising:
   a) a chassis comprising a frame extending along a longitudinal direction of the tracked vehicle;
   b) an operator cabin mounted to the frame, the frame comprising a pair of side members extending in an area behind the operator cabin in the longitudinal direction of the tracked vehicle, the pair of side members being spaced apart in a widthwise direction of the tracked vehicle for supporting work equipment carried by the tracked vehicle;
   c) a power plant mounted to the frame and comprising a prime mover; and
   d) a plurality of track assemblies for traction of the tracked vehicle, a first one of the track assemblies being on a first side of the tracked vehicle, a second one of the track assemblies being on a second side of the tracked vehicle, each track assembly of the plurality of track assemblies being mounted to the frame and comprising:
      i) a plurality of wheels including:
         a drive wheel;
         an end wheel spaced apart from the drive wheel in the longitudinal direction of the tracked vehicle; and
         a plurality of support wheels arranged in an inline configuration between the drive wheel and the end wheel;
         wherein at least one of the support wheels comprises an inboard support wheel member connected to an outboard support wheel member, the inboard and outboard support wheel members defining a guiding space therebetween;
         wherein the end wheel and a particular one of the support wheels overlap in the longitudinal direction of the tracked vehicle;
         wherein the particular one of the support wheels is at an end of the inline configuration of the support wheels;
         and
      ii) an endless track disposed around the plurality of wheels for engaging the ground, the endless track comprising:
         I. a top run extending between the drive wheel and the end wheel over the support wheels;
         II. a ground-engaging bottom run extending under the support wheels, the drive wheel being in driving engagement with the endless track to impart motion to the endless track; and
         III. a wheel guide configured to pass through the guiding space of the at least one support wheel as the endless track moves around the plurality of wheels;

wherein for each of the track assemblies, the end wheel is at least partly within the guiding space of the particular one of the support wheels.

2. The tracked vehicle defined in claim 1, wherein, for each of the track assemblies, the distance between a center of rotation of the end wheel and a center of rotation of one of the support wheels is less than a sum of the radius of the end wheel and the radius of the one of the support wheels.

3. The tracked vehicle defined in claim 1, wherein the operator's cabin is off-center along the widthwise direction of the tracked vehicle.

4. The tracked vehicle defined in claim 1, wherein the side members extend beyond the track assemblies both frontwards and rearwards of the tracked vehicle.

5. The tracked vehicle defined in claim 1, wherein the operator's cabin and the power plant are mounted above the frame.

6. The tracked vehicle defined in claim 1, wherein the side members comprise side rails.

7. The tracked vehicle defined in claim 1, wherein each of the endless tracks is a metal-embedded rubber track (MERT).

8. The tracked vehicle defined in claim 1, wherein the operator cabin comprises a floor, wherein an entirety of the floor is at a higher elevation, with respect to the bottom run of each of the track assemblies, than the uppermost surface of each of the side members, wherein the operator cabin extends in the longitudinal direction, and wherein each of the side members extends in the longitudinal direction past the operator cabin.

9. The tracked vehicle defined in claim 1, wherein at least part of the operator cabin is located directly above at least part of one of the track assemblies.

10. The tracked vehicle defined in claim 1, wherein the power plant comprises an internal combustion engine, wherein an entirety of the internal combustion engine is at a higher elevation, with respect to the bottom run of each of the track assemblies, than the uppermost surface of each of the side members, and wherein at least a portion of the internal combustion engine overlies at least a portion of at least one of the track assemblies.

11. The tracked vehicle defined in claim 10, wherein a portion of the internal combustion engine that overlies the at least a portion of at least one of the track assemblies is located in an area rearwards of the operator cabin in the longitudinal direction.

12. The tracked vehicle defined in claim 10, further comprising a housing on two sides of the operator cabin, the housing covering the internal combustion engine.

13. The tracked vehicle defined in claim 12, wherein the housing is L-shaped when viewed from above the tracked vehicle.

14. A tracked vehicle comprising:
a) a chassis comprising a frame extending along a longitudinal direction of the tracked vehicle;
b) an operator cabin mounted to the frame and located entirely within a front half of the tracked vehicle, the frame comprising a pair of side members extending in an area behind the operator cabin in the longitudinal direction of the tracked vehicle, the pair of side members being spaced apart in a widthwise direction of the tracked vehicle for supporting work equipment carried by the tracked vehicle;
c) a power plant mounted to the frame and comprising a prime mover; and
d) a plurality of track assemblies for traction of the tracked vehicle, a first one of the track assemblies being on a first side of the tracked vehicle, a second one of the track assemblies being on a second side of the tracked vehicle, each track assembly of the plurality of track assemblies being mounted to the frame and comprising:
i) a plurality of wheels including:
a first wheel at a first end and a wheel at a second end spaced apart from the first wheel in the longitudinal direction of the tracked vehicle; and
a plurality of support wheels arranged in an inline configuration between the first wheel and the second wheel;
at least the first wheel and a particular one of the support wheels overlapping in the longitudinal direction of the tracked vehicle;
wherein the particular one of the support wheels comprises an inboard support wheel member connected to an outboard support wheel member, the inboard and outboard support wheel members defining a guiding space therebetween; and
ii) an endless track disposed around the plurality of wheels for engaging the ground, the endless track comprising:
I. a top run extending between the first wheel and the second wheel over the support wheels; and
II. a ground-engaging bottom run extending under the support wheels, one of the first wheel and the second wheel being in driving engagement with the endless track to impart motion to the endless track; and
III. a wheel guide configured to pass through the guiding space of the at least one support wheel as the endless track moves around the plurality of wheels;
wherein for each of the track assemblies, the first wheel is at least partly within the guiding space of the particular one of the support wheels.

15. The tracked vehicle defined in claim 14, wherein a front of one of the track assemblies ends at a point directly underneath the operator cabin.

16. The tracked vehicle defined in claim 15, wherein the operator's cabin is off-center along the widthwise direction of the tracked vehicle.

17. The tracked vehicle defined in claim 16, wherein the cabin and the power plant are mounted above the operator's frame.

18. The tracked vehicle defined in claim 14, wherein the first wheel of each of the track assemblies is an idler wheel.

19. The tracked vehicle defined in claim 14, wherein the first wheel of each of the track assemblies is a drive wheel.

20. The tracked vehicle defined in claim 14, wherein the first wheel of each of the track assemblies is furthest to the rear of the plurality of wheels.

21. The tracked vehicle defined in claim 14, wherein, for each of the track assemblies, the distance between a center of rotation of the first wheel and a center of rotation of one of the support wheels is less than a sum of the radius of the first wheel and the radius of the one of the support wheels with which it overlaps.

22. The tracked vehicle defined in claim 14, wherein the side members extend beyond the track assemblies frontwards or rearwards of the tracked vehicle.

23. The tracked vehicle defined in claim 22, wherein the side members comprise side rails.

24. The tracked vehicle defined in claim 14, wherein each of the endless tracks is a metal-embedded rubber track (MERT).

25. The tracked vehicle defined in claim 14, wherein the operator cabin comprises a floor, wherein an entirety of the floor is at a higher elevation, with respect to the bottom run of each of the track assemblies, than the uppermost surface of each of the side members, wherein the operator cabin extends in the longitudinal direction, and wherein each of the side members extends in the longitudinal direction past the operator cabin.

26. The tracked vehicle defined in claim 14, wherein at least part of the operator cabin is located directly above at least part of one of the track assemblies.

27. The tracked vehicle defined in claim 14, wherein the power plant comprises an internal combustion engine, wherein an entirety of the internal combustion engine is at a higher elevation, with respect to the bottom run of each of the track assemblies, than the uppermost surface of each of the side members, and wherein at least a portion of the internal combustion engine overlies at least a portion of at least one of the track assemblies.

28. The tracked vehicle defined in claim 27, wherein a portion of the internal combustion engine that overlies the at least a portion of at least one of the track assemblies is located in an area rearwards of the operator cabin in the longitudinal direction.

29. The tracked vehicle defined in claim 27, further comprising a housing on two sides of the operator cabin, the housing covering the internal combustion engine.

30. The tracked vehicle defined in claim 29, wherein the housing is L-shaped when viewed from above the tracked vehicle.

* * * * *